United States Patent
Bramlet et al.

(10) Patent No.: US 11,741,846 B2
(45) Date of Patent: *Aug. 29, 2023

(54) SELECTING LESSON ASSET INFORMATION BASED ON A PHYSICALITY ASSESSMENT

(71) Applicant: Enduvo, Inc., Peoria, IL (US)

(72) Inventors: Matthew Bramlet, Peoria, IL (US); Justin Douglas Drawz, Chicago, IL (US); Steven J. Garrou, Wilmette, IL (US); Joseph Thomas Tieu, Tulsa, OK (US); Joon Young Kim, Broomfield, CO (US); Gary W. Grube, Barrington Hills, IL (US)

(73) Assignee: Enduvo, Inc., Peoria, IL (US)

( * ) Notice: Subject to any disclaimer, the term of this patent is extended or adjusted under 35 U.S.C. 154(b) by 270 days.

This patent is subject to a terminal disclaimer.

(21) Appl. No.: 17/172,137

(22) Filed: Feb. 10, 2021

(65) Prior Publication Data

US 2021/0366299 A1 Nov. 25, 2021

Related U.S. Application Data

(60) Provisional application No. 63/026,812, filed on May 19, 2020.

(51) Int. Cl.
| | |
|---|---|
| *G09B 5/06* | (2006.01) |
| *G09B 5/12* | (2006.01) |
| *G09B 7/00* | (2006.01) |
| *G09B 7/04* | (2006.01) |
| *G09B 7/02* | (2006.01) |
| *G09B 7/06* | (2006.01) |
| *G06T 19/00* | (2011.01) |
| *G06F 16/43* | (2019.01) |
| *G06F 16/438* | (2019.01) |
| *G06F 16/435* | (2019.01) |

(52) U.S. Cl.
CPC ........... *G09B 5/065* (2013.01); *G06F 16/437* (2019.01); *G06F 16/438* (2019.01); *G06T 19/003* (2013.01); *G09B 5/12* (2013.01); *G09B 7/00* (2013.01); *G09B 7/04* (2013.01); *G09B 7/02* (2013.01); *G09B 7/06* (2013.01)

(58) Field of Classification Search
CPC .... G09B 5/06; G09B 8/12; G09B 7/04; G06T 19/00
See application file for complete search history.

(56) References Cited

U.S. PATENT DOCUMENTS

| | | |
|---|---|---|
| 6,288,753 B1 | 9/2001 | Denicola |
| 7,733,366 B2 | 6/2010 | Beavers |
| 8,682,241 B2 | 3/2014 | Huerta |

(Continued)

*Primary Examiner* — Eddy Saint-Vil
(74) *Attorney, Agent, or Firm* — Gary W. Grube

(57) ABSTRACT

A method for execution by a computing entity for creating a learning tool regarding a topic includes issuing a representation of a first set of physicality assessment assets of a first learning object to a second computing entity. The method further includes obtaining a first assessment response in response to the representation of the first set of physicality assessment assets. The method further includes selecting one of the first learning object, a second learning object, and a third learning object as an active learning object based on the first assessment response.

18 Claims, 60 Drawing Sheets

(56) References Cited

U.S. PATENT DOCUMENTS

| | | | |
|---|---|---|---|
| 8,699,941 B1* | 4/2014 | Holt | G09B 7/02 |
| | | | 434/362 |
| 9,179,100 B2 | 11/2015 | Guo | |
| 2010/0005413 A1* | 1/2010 | Liang | G09B 7/00 |
| | | | 715/781 |
| 2011/0039249 A1* | 2/2011 | Packard | G09B 7/06 |
| | | | 434/362 |
| 2011/0123972 A1 | 5/2011 | Friedman | |
| 2012/0251992 A1 | 10/2012 | Huerta | |
| 2013/0314421 A1 | 11/2013 | Kim | |
| 2014/0065590 A1* | 3/2014 | Kim | G09B 7/02 |
| | | | 434/322 |
| 2015/0206448 A1 | 7/2015 | Loudermilk | |
| 2018/0232567 A1 | 8/2018 | Dolsma | |

\* cited by examiner

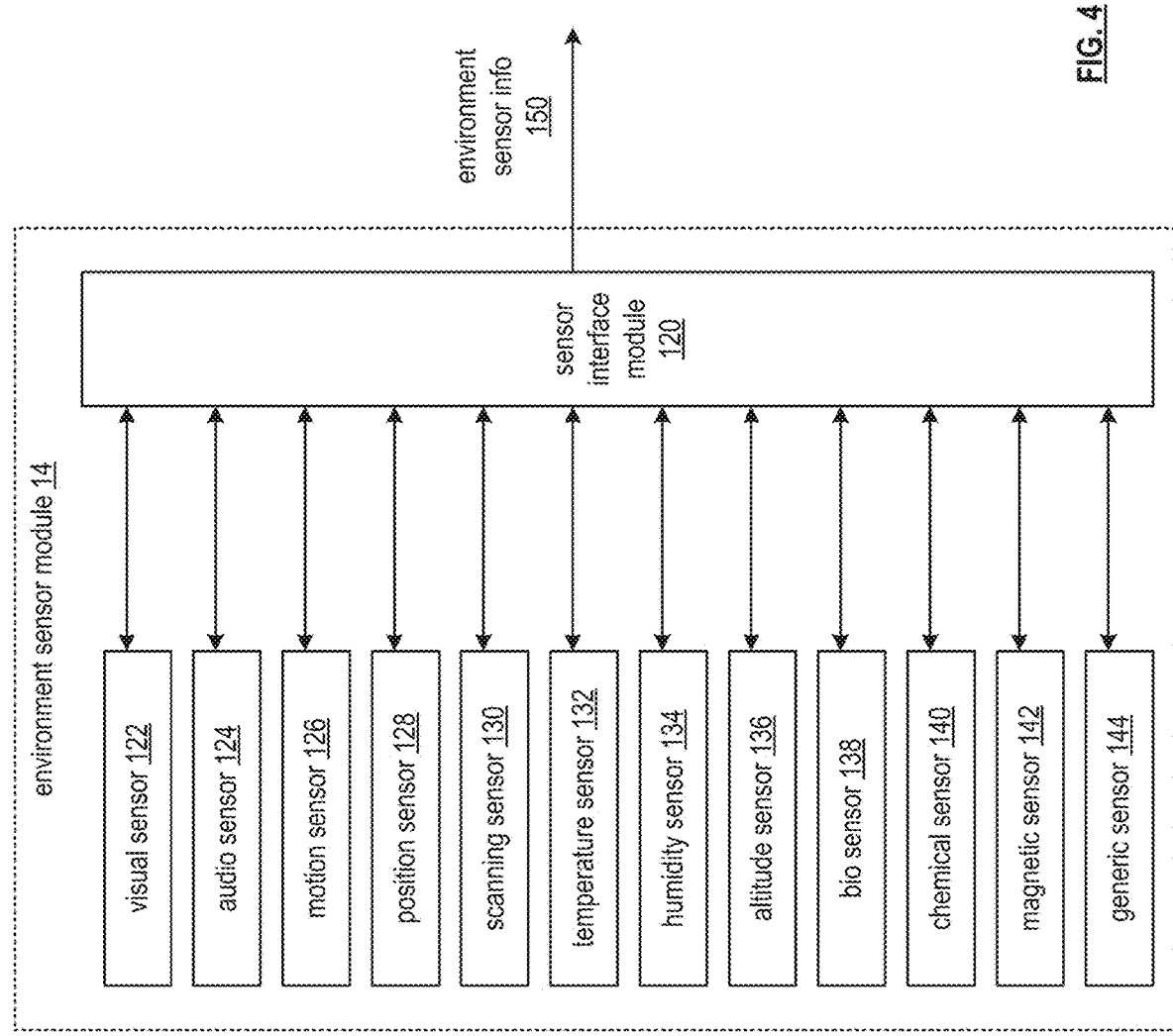

step 1 – obtain lesson asset info for a lesson

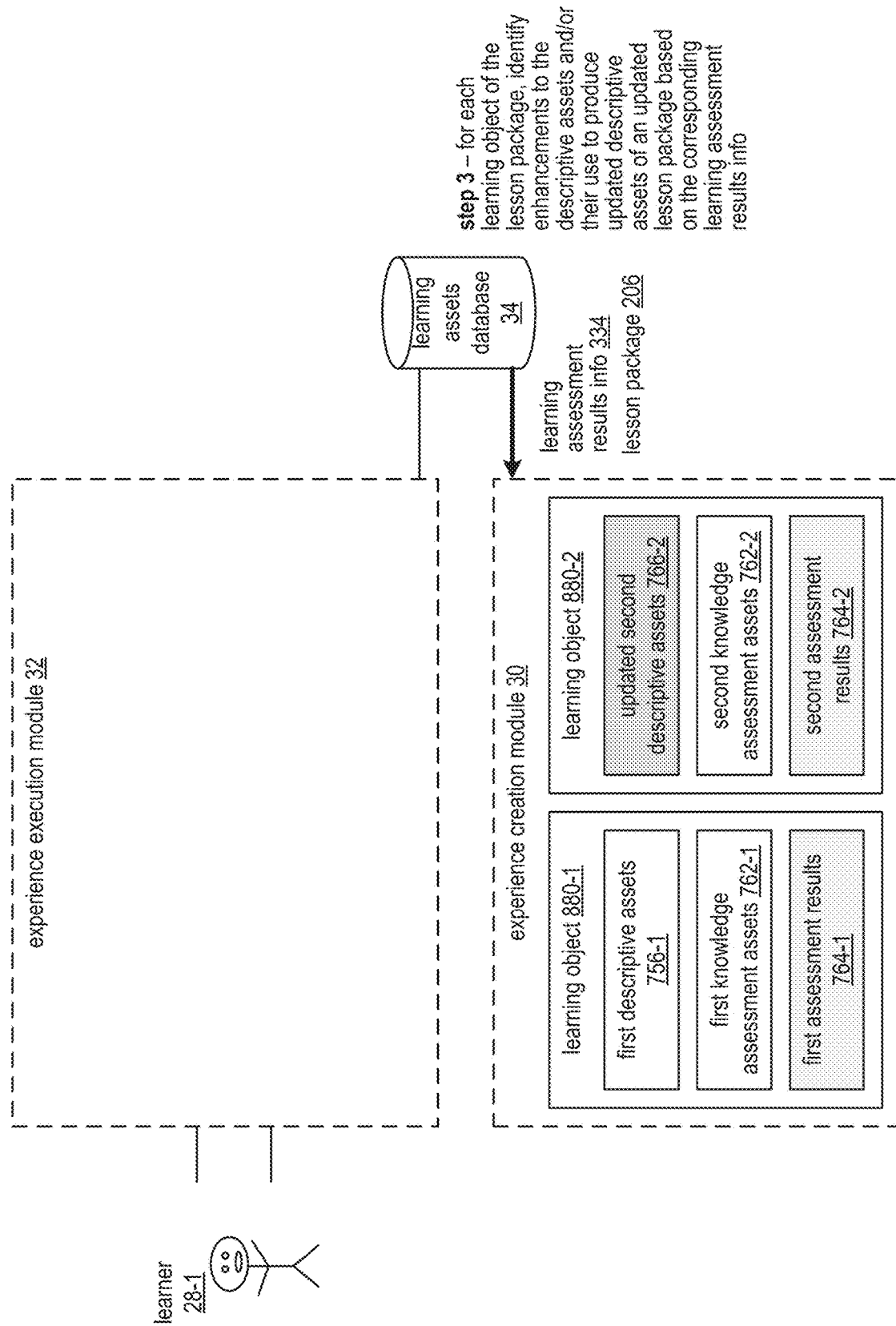

SELECTING LESSON ASSET INFORMATION BASED ON A PHYSICALITY ASSESSMENT

CROSS-REFERENCE TO RELATED APPLICATIONS

The present U.S. Utility Patent Applications claims priority pursuant to 35 U.S.C. § 119(e) to U.S. Provisional Application No. 63/026,812, entitled "CONSTRUCTING A LESSON ASSET," filed May 19, 2020, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and more particularly to computer systems providing educational, training, and entertainment content.

Description of Related Art

Computer systems communicate data, process data, and/or store data. Such computer systems include computing devices that range from wireless smart phones, laptops, tablets, personal computers (PC), work stations, personal three-dimensional (3-D) content viewers, and video game devices, to data centers where data servers store and provide access to digital content. Some digital content is utilized to facilitate education, training, and entertainment. Examples of visual content includes electronic books, reference materials, training manuals, classroom coursework, lecture notes, research papers, images, video clips, sensor data, reports, etc.

A variety of educational systems utilize educational tools and techniques. For example, an educator delivers educational content to students via an education tool of a recorded lecture that has built-in feedback prompts (e.g., questions, verification of viewing, etc.). The educator assess a degree of understanding of the educational content and/or overall competence level of a student from responses to the feedback prompts.

BRIEF DESCRIPTION OF THE SEVERAL VIEWS OF THE DRAWING(S)

FIG. 4 is a schematic block diagram of an embodiment of an environment sensor module of a computing system in accordance with the present invention;

Figure 15A:
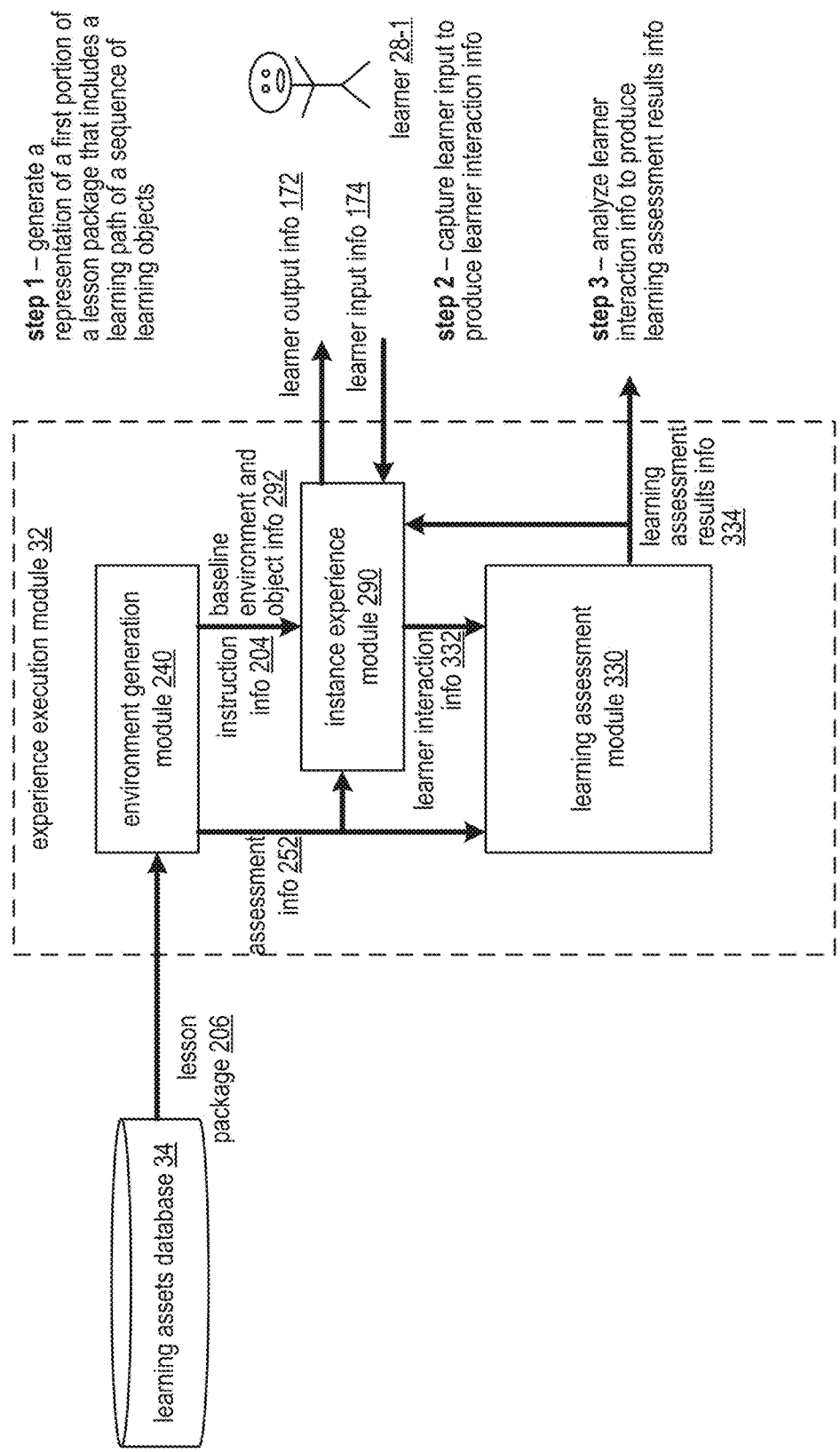
Figure 15B:
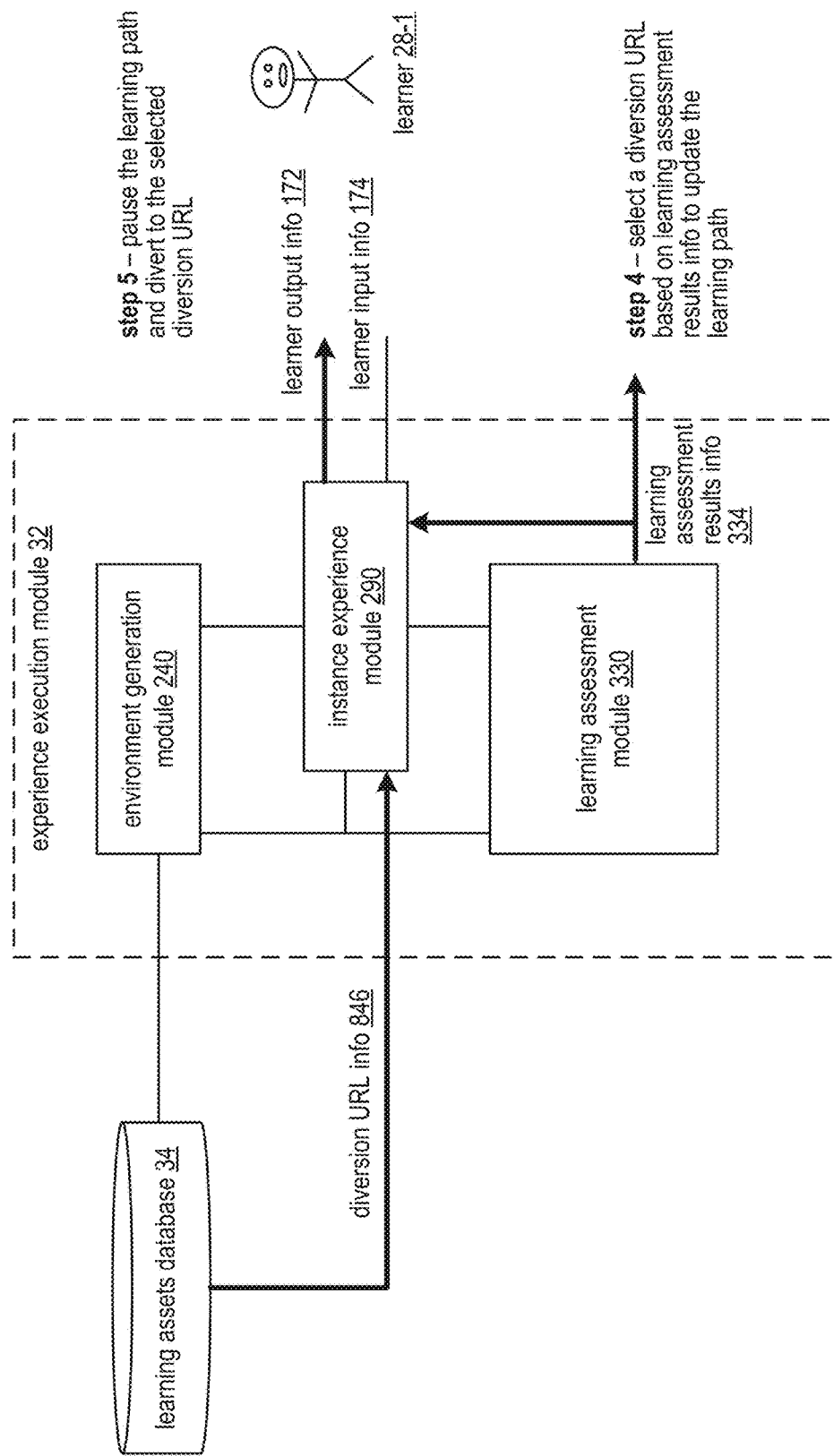
Figure 15C:
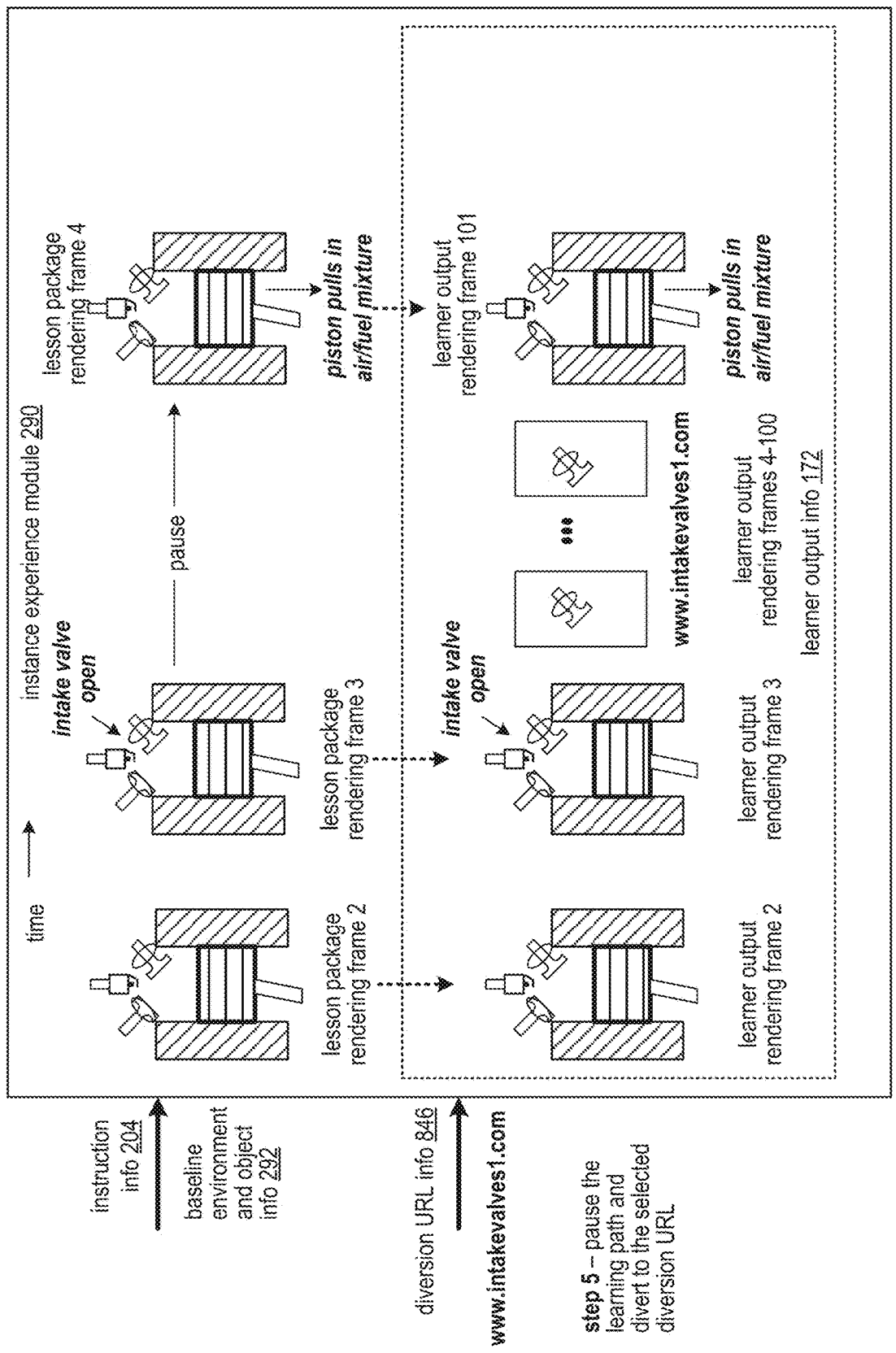

FIGS. 8E, 8F, 8G, 8H, 8J, and 8K are schematic block diagrams of another embodiment of a computing system illustrating another example of creating a learning experience in accordance with the present invention;

FIGS. 9A, 9B, 9C, 9D, and 9E are schematic block diagrams of an embodiment of a computing system illustrating an example of constructing a lesson package in accordance with the present invention;

FIGS. 10A, 10B, 10C, and 10D are schematic block diagrams of an embodiment of a computing system illustrating an example of constructing a lesson package in accordance with the present invention;

FIGS. 11A, 11B, 11C, and 11D are schematic block diagrams of an embodiment of a computing system illustrating an example of constructing a lesson package in accordance with the present invention;

FIGS. 12A, 12B, 12C, 12D, 12E, 12F, and 12G are schematic block diagrams of an embodiment of a computing system illustrating an example of creating lesson asset information in accordance with the present invention;

FIGS. 13A, 13B, 13C, and 13D are schematic block diagrams of an embodiment of a computing system illustrating an example of updating a lesson package in accordance with the present invention;

FIGS. 14A, 14B, 14C, and 14D are schematic block diagrams of an embodiment of a computing system illustrating an example of selecting lesson asset information in accordance with the present invention;

FIGS. 15A, 15B, and 15C are schematic block diagrams of an embodiment of a computing system illustrating an example of creating learning output information in accordance with the present invention;

FIGS. 16A, 16B, 16C, and 16D are schematic block diagrams of an embodiment of a computing system illustrating an example of selecting lesson asset information based on a physicality assessment in accordance with the present invention;

FIGS. 17A, 17B, 17C, and 17D are schematic block diagrams of an embodiment of a computing system illustrating an example of optimizing learning in accordance with the present invention; and FIGS. 18A, 18B, 18C, and 18D are schematic block diagrams of an embodiment of a computing system illustrating an example of optimizing learning in accordance with the present invention.

DETAILED DESCRIPTION OF THE INVENTION

Figure 1:
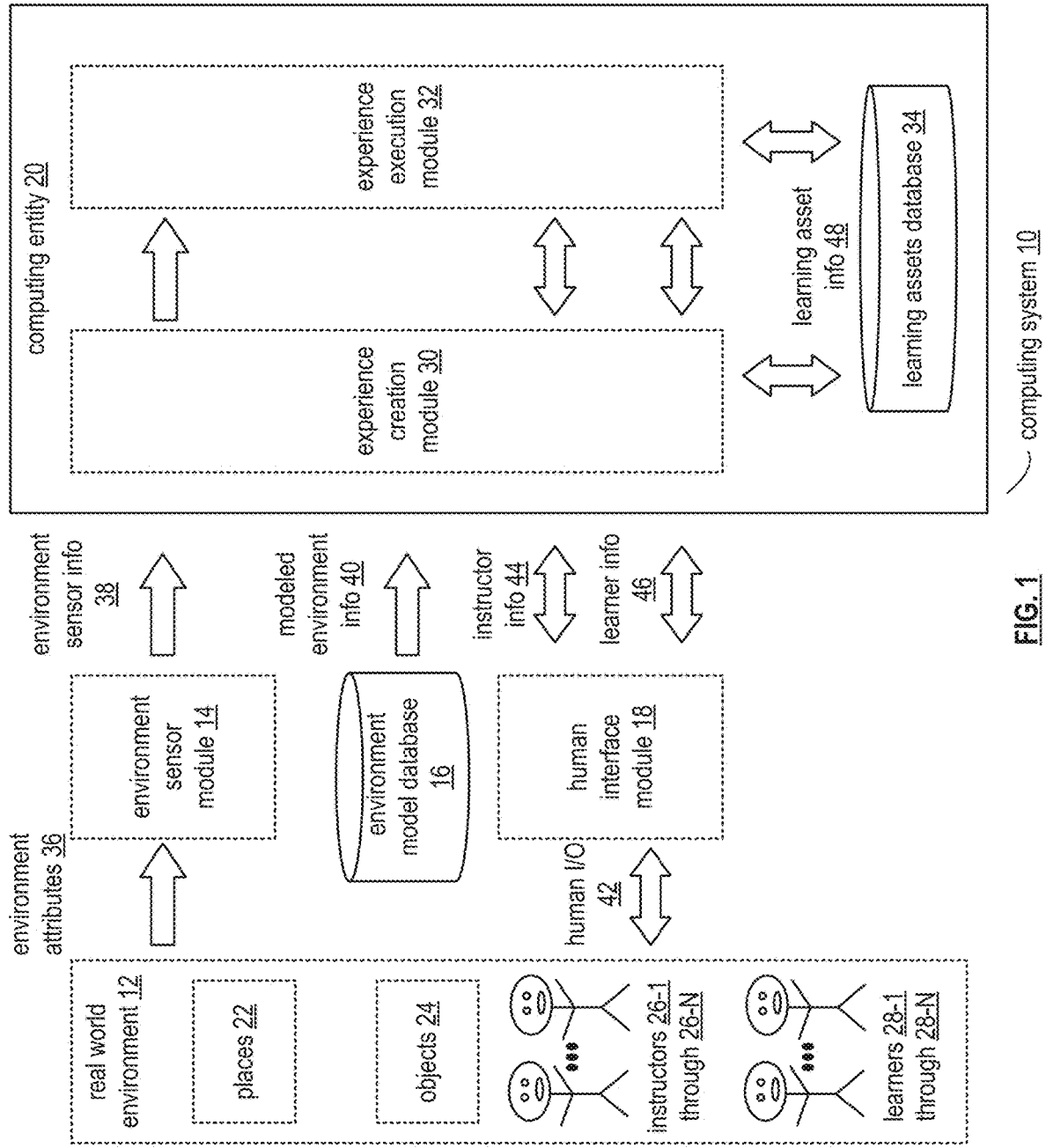
FIG. 1 is a schematic block diagram of an embodiment of a computing system in accordance with the present invention.

FIG. 1 is a schematic block diagram of an embodiment of a computing system 10 that includes a real world environment 12, an environment sensor module 14, and environment model database 16, a human interface module 18, and a computing entity 20. The real-world environment 12 includes places 22, objects 24, instructors 26-1 through 26-N, and learners 28-1 through 28-N. The computing entity 20 includes an experience creation module 30, an experience execution module 32, and a learning assets database 34.

The places 22 includes any area. Examples of places 22 includes a room, an outdoor space, a neighborhood, a city, etc. The objects 24 includes things within the places. Examples of objects 24 includes people, equipment, furniture, personal items, tools, and representations of information (i.e., video recordings, audio recordings, captured text, etc.). The instructors includes any entity (e.g., human or human proxy) imparting knowledge. The learners includes entities trying to gain knowledge and may temporarily serve as an instructor.

In an example of operation of the computing system 10, the experience creation module 30 receives environment sensor information 38 from the environment sensor module 14 based on environment attributes 36 from the real world environment 12. The environment sensor information 38 includes time-based information (e.g., static snapshot, continuous streaming) from environment attributes 36 including XYZ position information, place information, and object information (i.e., background, foreground, instructor, learner, etc.). The XYZ position information includes portrayal in a world space industry standard format (e.g., with reference to an absolute position).

The environment attributes 36 includes detectable measures of the real-world environment 12 to facilitate generation of a multi-dimensional (e.g., including time) representation of the real-world environment 12 in a virtual reality and/or augmented reality environment. For example, the environment sensor module 14 produces environment sensor information 38 associated with a medical examination room and a subject human patient (e.g., an MM). The environment sensor module 14 is discussed in greater detail with reference to FIG. 4.

Having received the environment sensor information 38, the experience creation module 30 accesses the environment model database 16 to recover modeled environment information 40. The modeled environment information 40 includes a synthetic representation of numerous environments (e.g., model places and objects). For example, the modeled environment information 40 includes a 3-D representation of a typical human circulatory system. The models include those that are associated with certain licensing requirements (e.g., copyrights, etc.).

Having received the modeled environment information 40, the experience creation module 30 receives instructor information 44 from the human interface module 18, where the human interface module 18 receives human input/output (I/O) 42 from instructor 26-1. The instructor information 44 includes a representation of an essence of communication with a participant instructor. The human I/O 42 includes detectable fundamental forms of communication with humans or human proxies. The human interface module 18 is discussed in greater detail with reference to FIG. 3.

Having received the instructor information 44, the experience creation module 30 interprets the instructor information 44 to identify aspects of a learning experience. A learning experience includes numerous aspects of an encounter between one or more learners and an imparting of knowledge within a representation of a learning environment that includes a place, multiple objects, and one or more instructors. The learning experience further includes an instruction portion (e.g., acts to impart knowledge) and an assessment portion (e.g., further acts and/or receiving of learner input) to determine a level of comprehension of the knowledge by the one or more learners. The learning experience still further includes scoring of the level of comprehension and tallying multiple learning experiences to facilitate higher-level competency accreditations (e.g., certificates, degrees, licenses, training credits, experiences completed successfully, etc.).

As an example of the interpreting of the instructor information 44, the experience creation module 30 identifies a set of concepts that the instructor desires to impart upon a learner and a set of comprehension verifying questions and associated correct answers. The experience creation module 30 further identifies step-by-step instructor annotations associated with the various objects within the environment of the learning experience for the instruction portion and the assessment portion. For example, the experience creation module 30 identifies positions held by the instructor 26-1 as the instructor narrates a set of concepts associated with the subject patient circulatory system. As a further example, the experience creation module 30 identifies circulatory system questions and correct answers posed by the instructor associated with the narrative.

Having interpreted the instructor information 44, the experience creation module 30 renders the environment sensor information 38, the modeled environment information 40, and the instructor information 44 to produce learning assets information 48 for storage in the learning assets database 34. The learning assets information 48 includes all things associated with the learning experience to facilitate subsequent recreation. Examples includes the environment, places, objects, instructors, learners, assets, recorded instruction information, learning evaluation information, etc.

Execution of a learning experience for the one or more learners includes a variety of approaches. A first approach includes the experience execution module 32 recovering the learning assets information 48 from the learning assets database 34, rendering the learning experience as learner information 46, and outputting the learner information 46 via the human interface module 18 as further human I/O 42 to one or more of the learners 28-1 through 28-N. The learner information 46 includes information to be sent to the one or more learners and information received from the one or more learners. For example, the experience execution module 32 outputs learner information 46 associated with the instruction portion for the learner 28-1 and collects learner information 46 from the learner 28-1 that includes submitted assessment answers in response to assessment questions of the assessment portion communicated as further learner information 46 for the learner 28-1.

A second approach includes the experience execution module 32 rendering the learner information 46 as a combination of live streaming of environment sensor information 38 from the real-world environment 12 along with an augmented reality overlay based on recovered learning asset information 48. For example, a real world subject human patient in a medical examination room is live streamed as the environment sensor information 38 in combination with a prerecorded instruction portion from the instructor 26-1.

Figure 2A:
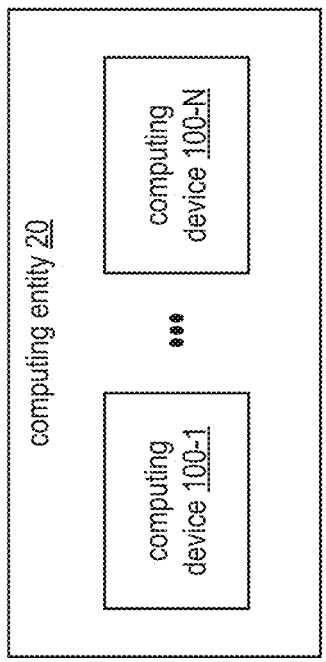
FIG. 2A is a schematic block diagram of an embodiment of a computing entity of a computing system in accordance with the present invention.

FIG. 2A is a schematic block diagram of an embodiment of the computing entity 20 of the computing system 10. The computing entity 20 includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
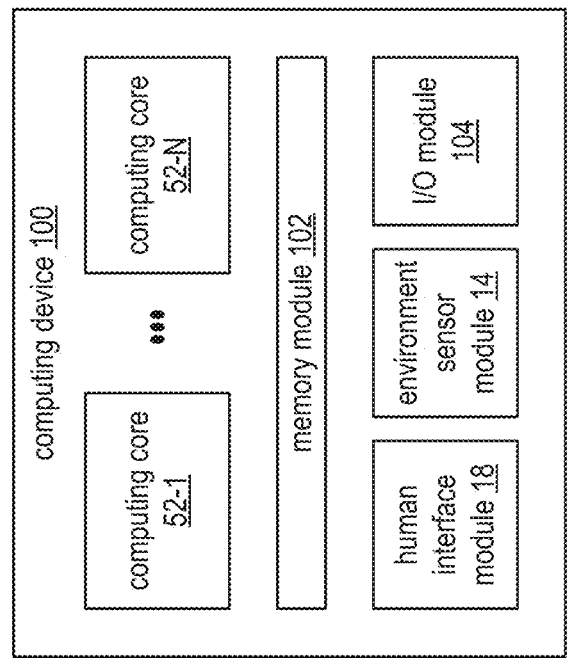
FIG. 2B is a schematic block diagram of an embodiment of a computing device of a computing system in accordance with the present invention.

FIG. 2B is a schematic block diagram of an embodiment of a computing device 100 of the computing system 10 that includes one or more computing cores 52-1 through 52-N, a memory module 102, the human interface module 18, the environment sensor module 14, and an I/O module 104. In alternative embodiments, the human interface module 18, the environment sensor module 14, the I/O module 104, and the memory module 102 may be standalone (e.g., external to the computing device). An embodiment of the computing device 100 will be discussed in greater detail with reference to FIG. 3.

Figure 3:
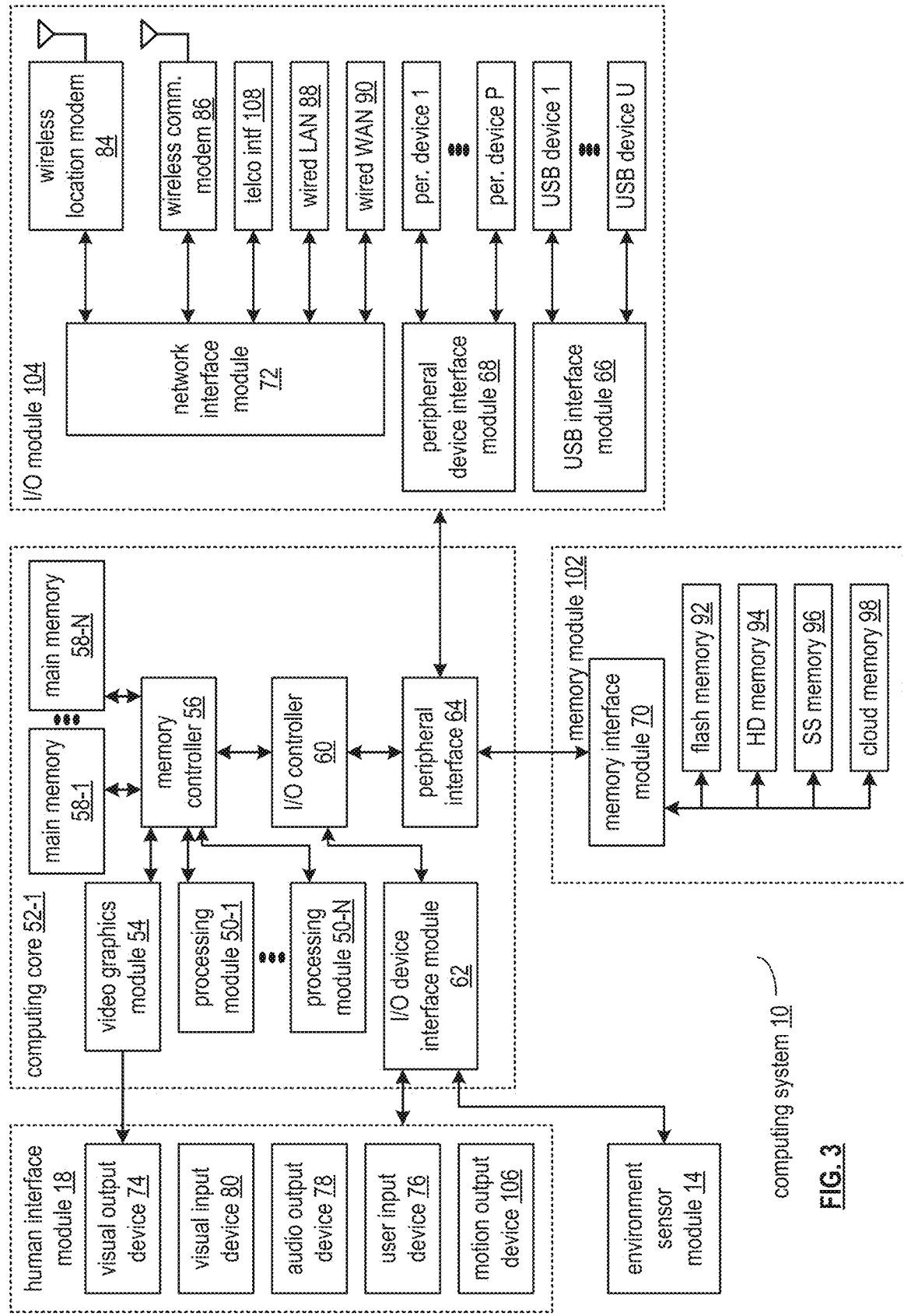
FIG. 3 is a schematic block diagram of another embodiment of a computing device of a computing system in accordance with the present invention.

FIG. 3 is a schematic block diagram of another embodiment of the computing device 100 of the computing system 10 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100 may include more or less devices and modules than shown in this example embodiment.

FIG. 4 is a schematic block diagram of an embodiment of the environment sensor module 14 of the computing system 10 that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, immuno, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
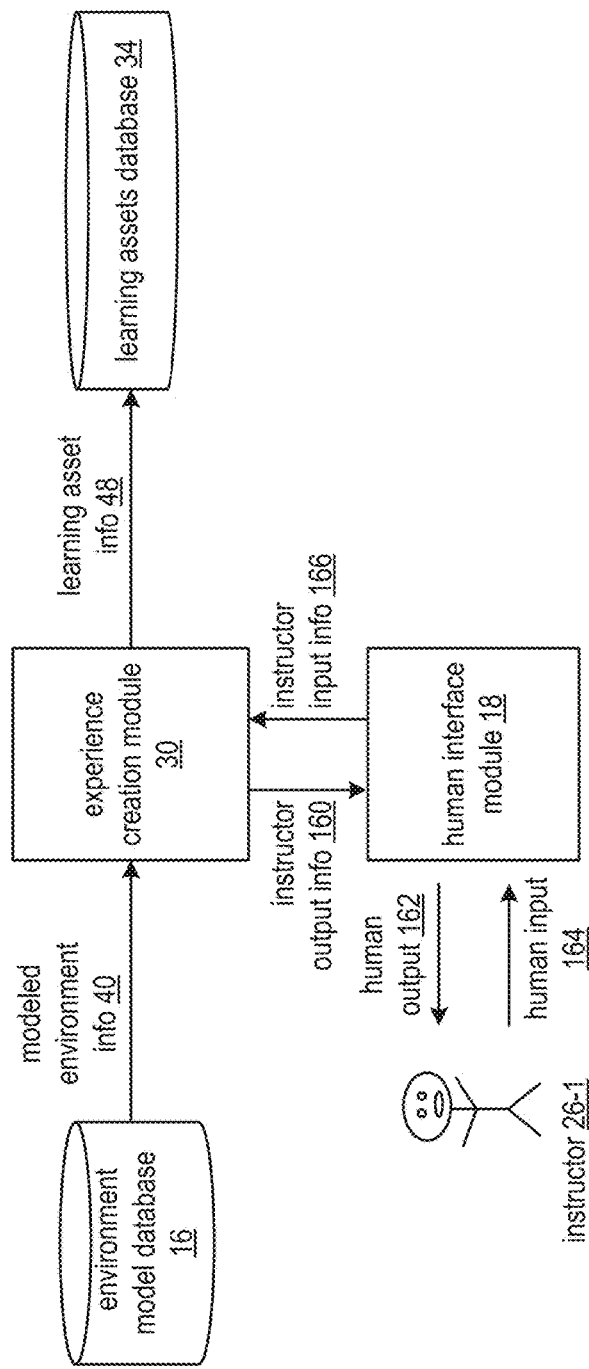
FIG. 5A is a schematic block diagram of another embodiment of a computing system in accordance with the present invention.

FIG. 5A is a schematic block diagram of another embodiment of a computing system that includes the environment model database 16, the human interface module 18, the instructor 26-1, the experience creation module 30, and the learning assets database 34 of FIG. 1. In an example of operation, the experience creation module 30 obtains modeled environment information 40 from the environment model database 16 and renders a representation of an environment and objects of the modeled environment information 40 to output as instructor output information 160. The human interface module 18 transforms the instructor output information 160 into human output 162 for presentation to the instructor 26-1. For example, the human output 162 includes a 3-D visualization and stereo audio output.

In response to the human output 162, the human interface module 18 receives human input 164 from the instructor 26-1. For example, the human input 164 includes pointer movement information and human speech associated with a lesson. The human interface module 18 transforms the human input 164 into instructor input information 166. The instructor input information 166 includes one or more of representations of instructor interactions with objects within the environment and explicit evaluation information (e.g., questions to test for comprehension level, and correct answers to the questions).

Having received the instructor input information 166, the experience creation module 30 renders a representation of the instructor input information 166 within the environment utilizing the objects of the modeled environment information 40 to produce learning asset information 48 for storage in the learnings assets database 34. Subsequent access of the learning assets information 48 facilitates a learning experience.

Figure 5B:
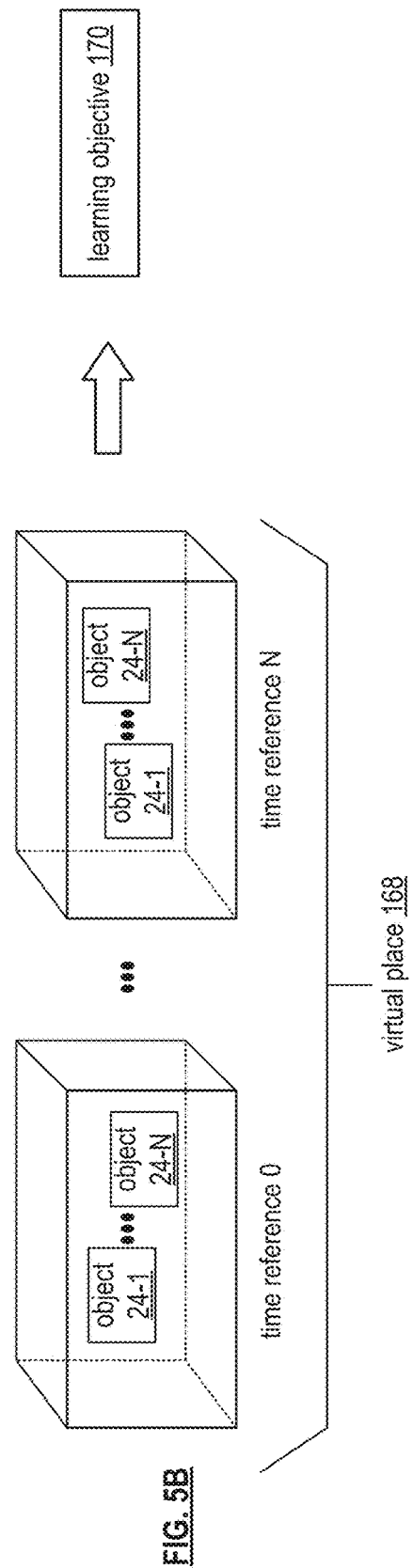
FIG. 5B is a schematic block diagram of an embodiment of a representation of a learning experience in accordance with the present invention.

FIG. 5B is a schematic block diagram of an embodiment of a representation of a learning experience that includes a virtual place 168 and a resulting learning objective 170. A learning objective represents a portion of an overall learning experience, where the learning objective is associated with at least one major concept of knowledge to be imparted to a learner. The major concept may include several subconcepts. The makeup of the learning objective is discussed in greater detail with reference to FIG. 6.

The virtual place 168 includes a representation of an environment (e.g., a place) over a series of time intervals (e.g., time 0-N). The environment includes a plurality of objects 24-1 through 24-N. At each time reference, the positions of the objects can change in accordance with the learning experience. For example, the instructor 26-1 of FIG. 5A interacts with the objects to convey a concept. The sum of the positions of the environment and objects within the virtual place 168 is wrapped into the learning objective 170 for storage and subsequent utilization when executing the learning experience.

Figure 6:
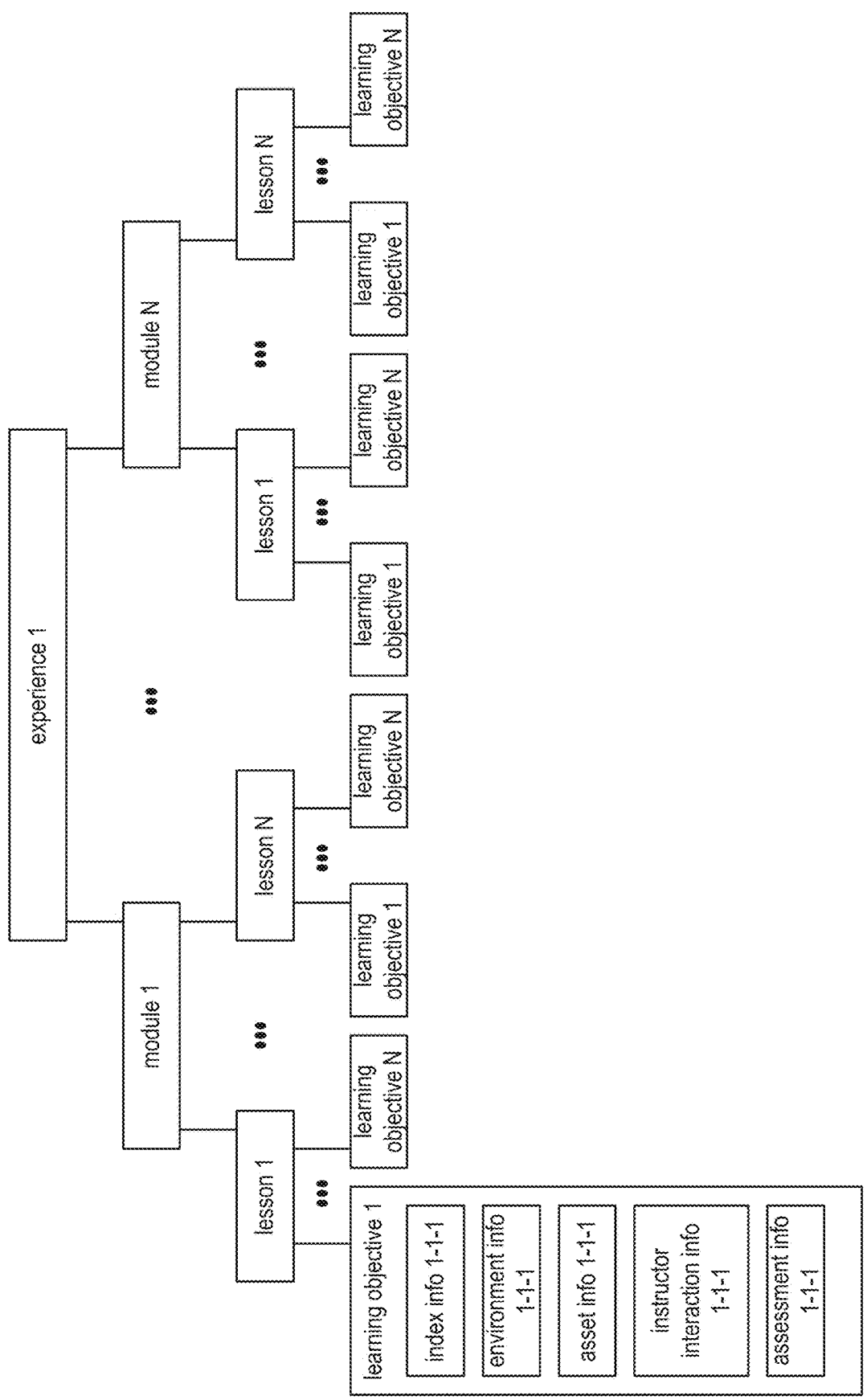
FIG. 6 is a schematic block diagram of another embodiment of a representation of a learning experience in accordance with the present invention.

FIG. 6 is a schematic block diagram of another embodiment of a representation of a learning experience that includes a plurality of modules 1-N. Each module includes a set of lessons 1-N. Each lesson includes a plurality of learning objectives 1-N. The learning experience typically is played from left to right where learning objectives are sequentially executed in lesson 1 of module 1 followed by learning objectives of lesson 2 of module 1 etc.

As learners access the learning experience during execution, the ordering may be accessed in different ways to suit the needs of the unique learner based on one or more of preferences, experience, previously demonstrated comprehension levels, etc. For example, a particular learner may skip over lesson 1 of module 1 and go right to lesson 2 of module 1 when having previously demonstrated competency of the concepts associated with lesson 1.

Each learning objective includes indexing information, environment information, asset information, instructor interaction information, and assessment information. The index information includes one or more of categorization information, topics list, instructor identification, author identification, identification of copyrighted materials, keywords, concept titles, prerequisites for access, and links to related learning objectives.

The environment information includes one or more of structure information, environment model information, background information, identifiers of places, and categories of environments. The asset information includes one or more of object identifiers, object information (e.g., modeling information), asset ownership information, asset type descriptors (e.g., 2-D, 3-D). Examples include models of physical objects, stored media such as videos, scans, images, digital representations of text, digital audio, and graphics.

The instructor interaction information includes representations of instructor annotations, actions, motions, gestures, expressions, eye movement information, facial expression information, speech, and speech inflections. The content associated with the instructor interaction information includes overview information, speaker notes, actions associated with assessment information, (e.g., pointing to questions, revealing answers to the questions, motioning related to posing questions) and conditional learning objective execution ordering information (e.g., if the learner does this then take this path, otherwise take another path).

The assessment information includes a summary of desired knowledge to impart, specific questions for a learner, correct answers to the specific questions, multiple-choice question sets, and scoring information associated with writing answers. The assessment information further includes historical interactions by other learners with the learning objective (e.g., where did previous learners look most often within the environment of the learning objective, etc.), historical responses to previous comprehension evaluations, and actions to facilitate when a learner responds with a correct or incorrect answer (e.g., motion stimulus to activate upon an incorrect answer to increase a human stress level).

Figure 7A:
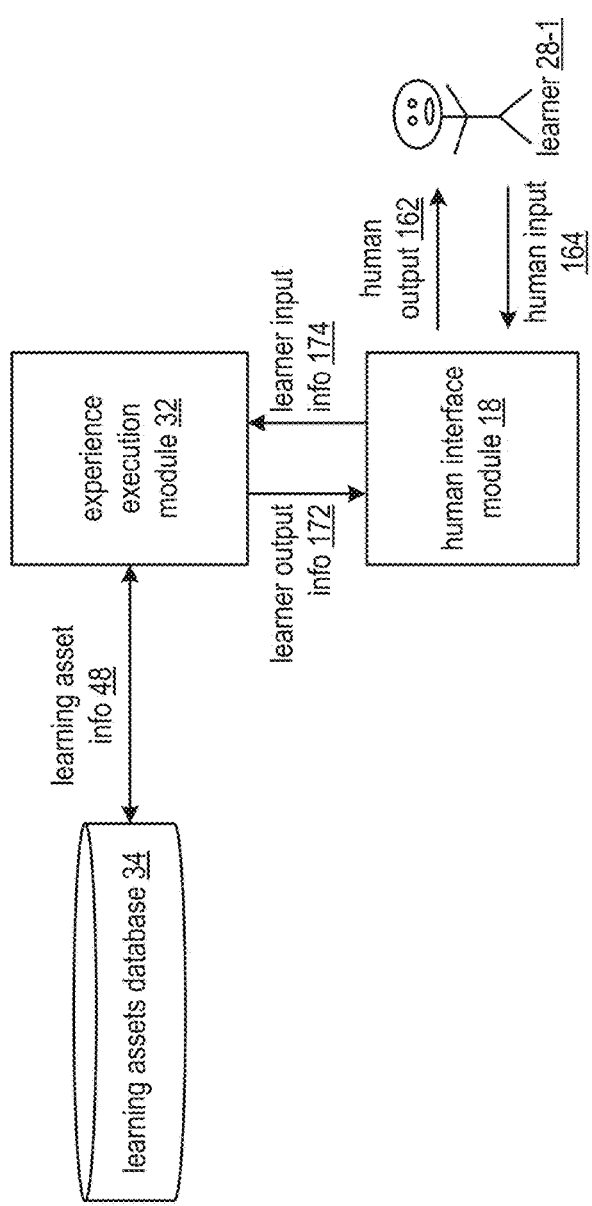
FIG. 7A is a schematic block diagram of another embodiment of a computing system in accordance with the present invention.

FIG. 7A is a schematic block diagram of another embodiment of a computing system that includes the learning assets database 34, the experience execution module 32, the human interface module 18, and the learner 28-1 of FIG. 1. In an example of operation, the experience execution module 32 recovers learning asset information 48 from the learning assets database 34 (e.g., in accordance with a selection by the learner 28-1). The experience execution module 32 renders a group of learning objectives associated with a common lesson within an environment utilizing objects associated with the lesson to produce learner output information 172. The learner output information 172 includes a representation of a virtual place and objects that includes instructor interactions and learner interactions from a perspective of the learner.

The human interface module 18 transforms the learner output information 172 into human output 162 for conveyance of the learner output information 172 to the learner 28-1. For example, the human interface module 18 facilitates displaying a 3-D image of the virtual environment to the learner 28-1.

The human interface module 18 transforms human input 164 from the learner 28-1 to produce learner input information 174. The learner input information 174 includes representations of learner interactions with objects within the virtual place (e.g., answering comprehension level evaluation questions).

The experience execution module 32 updates the representation of the virtual place by modifying the learner output information 172 based on the learner input information 174 so that the learner 28-1 enjoys representations of interactions caused by the learner within the virtual environment. The experience execution module 32 evaluates the learner input information 174 with regards to evaluation information of the learning objectives to evaluate a comprehension level by the learner 28-1 with regards to the set of learning objectives of the lesson.

Figure 7B:
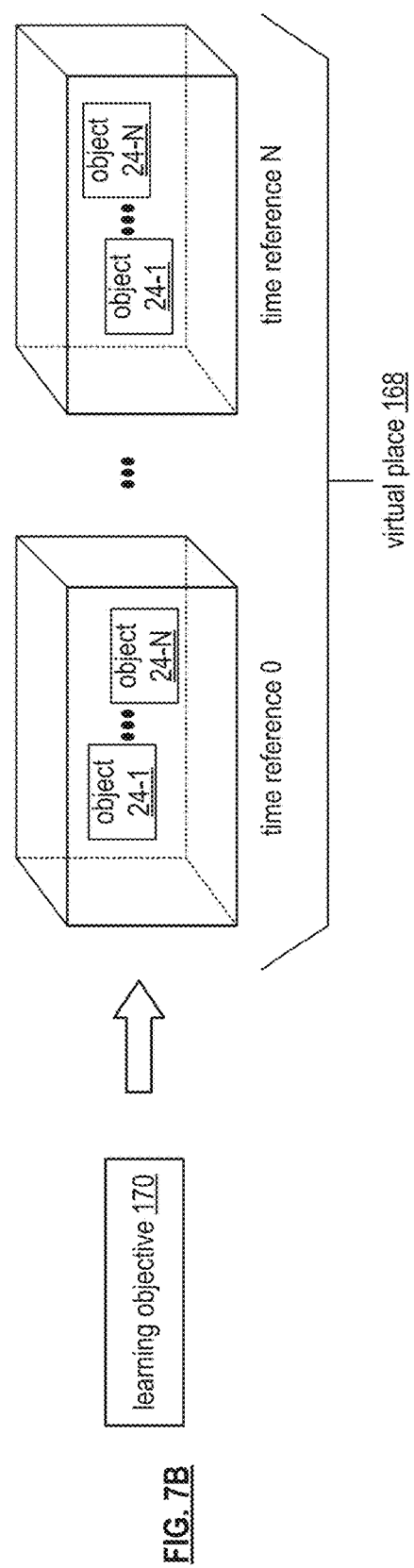
FIG. 7B is a schematic block diagram of another embodiment of a representation of a learning experience in accordance with the present invention.

FIG. 7B is a schematic block diagram of another embodiment of a representation of a learning experience that includes the learning objective 170 and the virtual place 168. In an example of operation, the learning objective 170 is recovered from the learning assets database 34 of FIG. 7A and rendered to create the virtual place 168 representations of objects 24-1 through 24-N in the environment from time references zero through N. For example, a first object is the instructor 26-1 of FIG. 5A, a second object is the learner 28-1 of FIG. 7A, and the remaining objects are associated with the learning objectives of the lesson, where the objects are manipulated in accordance with annotations of instructions provided by the instructor 26-1.

The learner 28-1 experiences a unique viewpoint of the environment and gains knowledge from accessing (e.g., playing) the learning experience. The learner 28-1 further manipulates objects within the environment to support learning and assessment of comprehension of objectives of the learning experience.

Figure 8A:
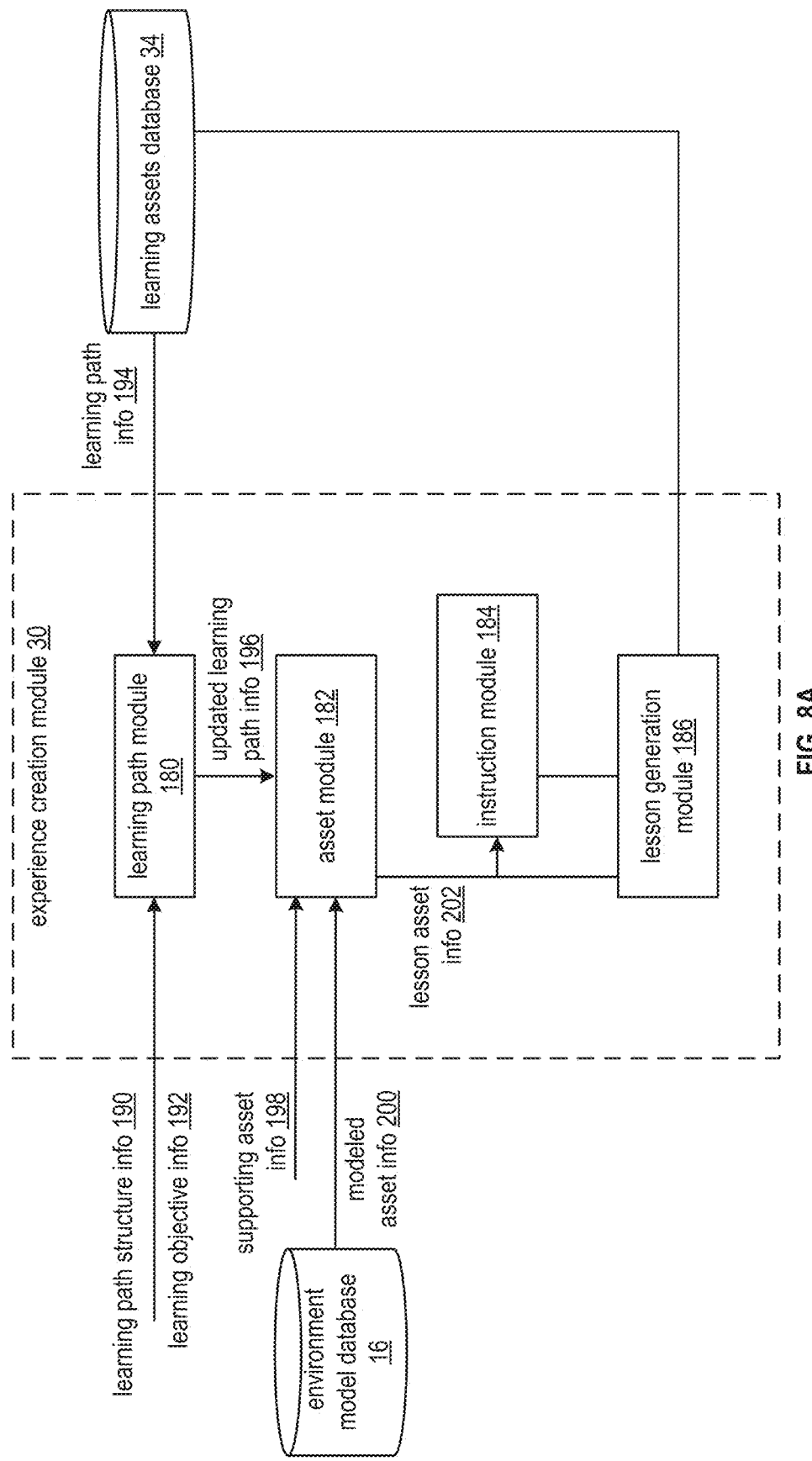
FIGS. 8A-8C are schematic block diagrams of another embodiment of a computing system illustrating an example of creating a learning experience in accordance with the present invention.
Figure 8B:
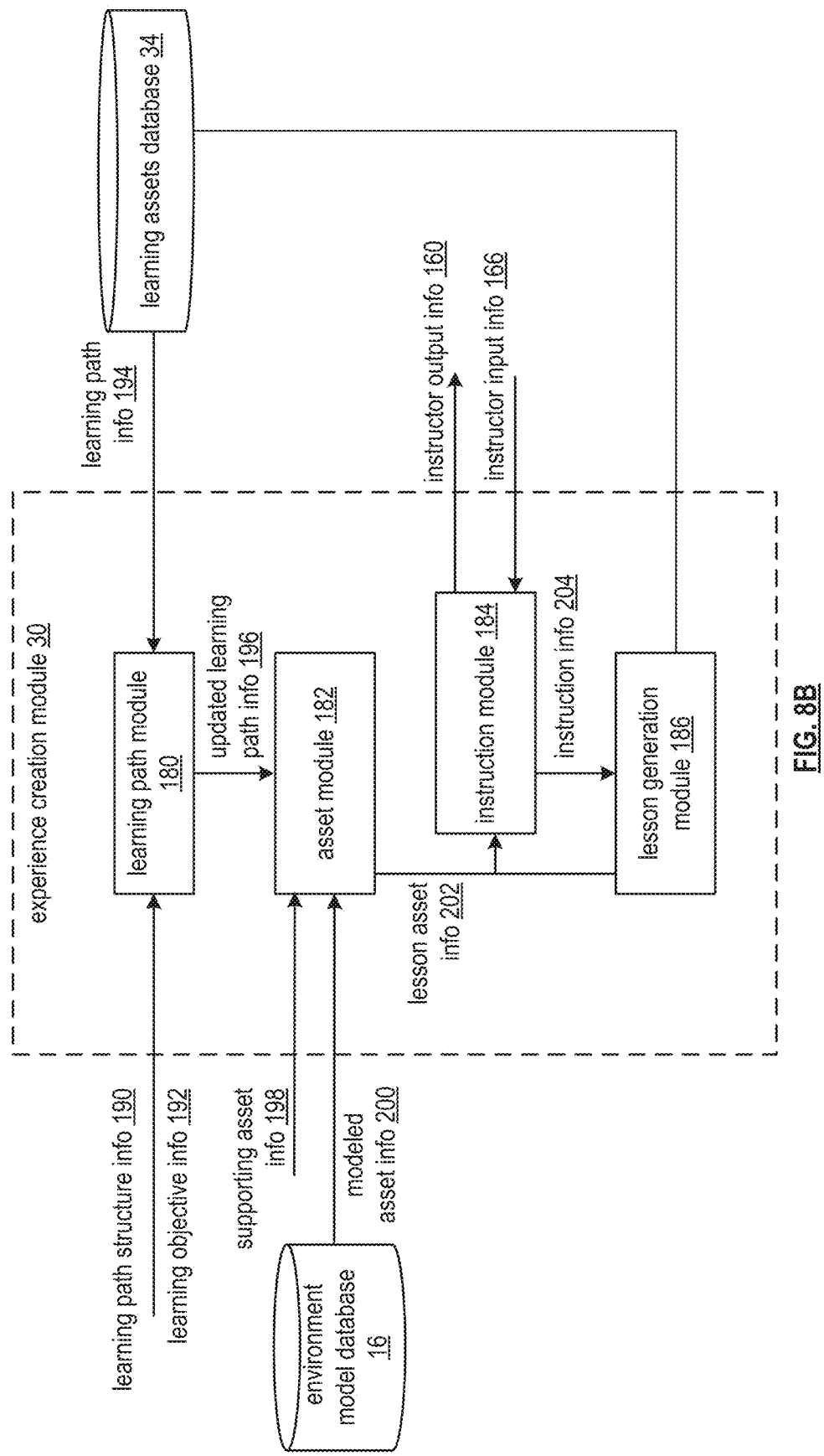
Figure 8C:
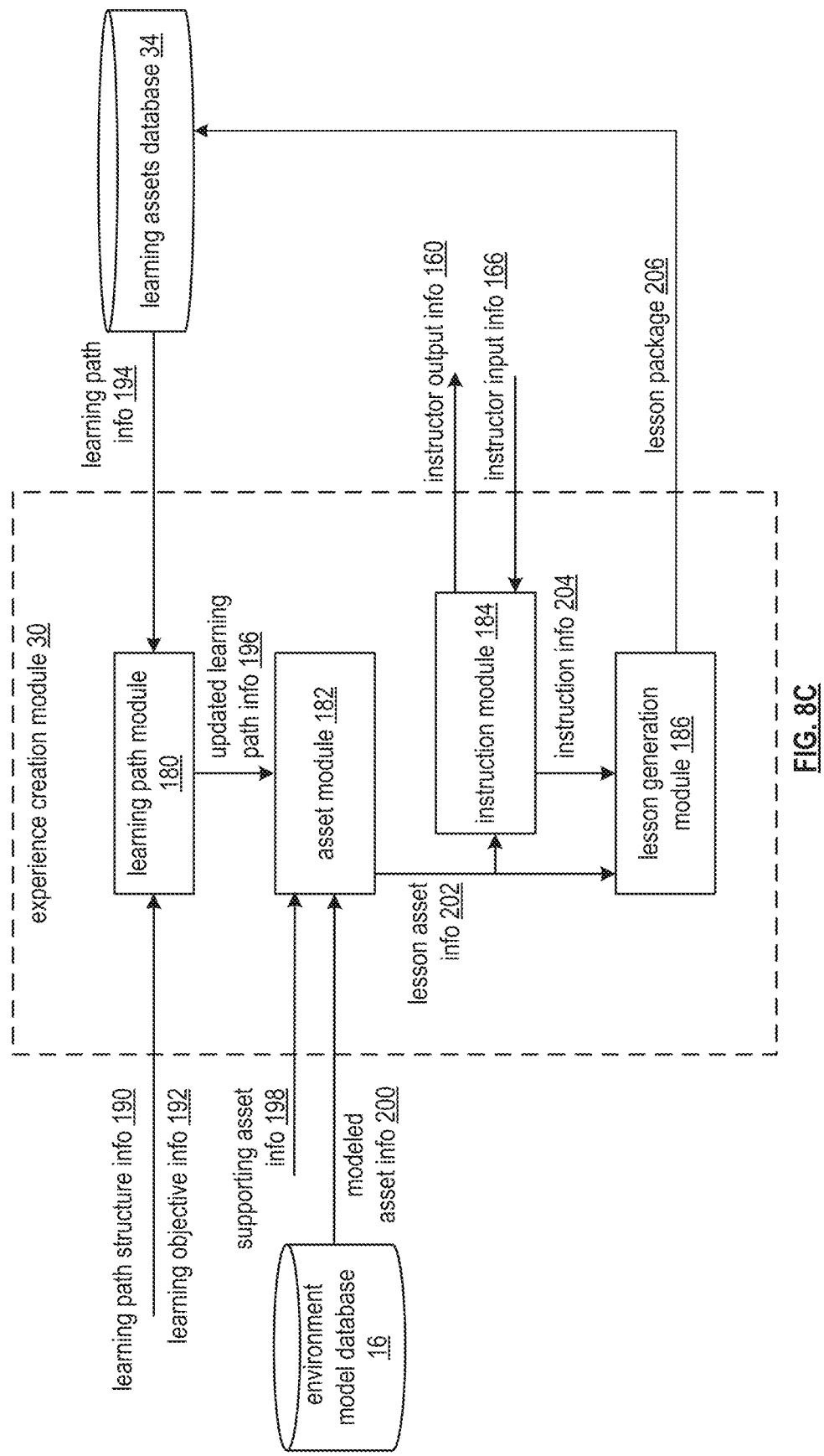

FIGS. 8A-8C are schematic block diagrams of another embodiment of a computing system illustrating an example of creating a learning experience. The computing system includes the environment model database 16, the experience creation module 30, and the learning assets database 34 of FIG. 1. The experience creation module 30 includes a learning path module 180, an asset module 182, an instruction module 184, and a lesson generation module 186.

In an example of operation, FIG. 8A illustrates the learning path module 180 determining a learning path (e.g., structure and ordering of learning objectives to complete towards a goal such as a certificate or degree) to include multiple modules and/or lessons. For example, the learning path module 180 obtains learning path information 194 from the learning assets database 34 and receives learning path structure information 190 and learning objective information 192 (e.g., from an instructor) to generate updated learning path information 196.

The learning path structure information 190 includes attributes of the learning path and the learning objective information 192 includes a summary of desired knowledge to impart. The updated learning path information 196 is generated to include modifications to the learning path information 194 in accordance with the learning path structure information 190 in the learning objective information 192.

The asset module 182 determines a collection of common assets for each lesson of the learning path. For example, the asset module 182 receives supporting asset information 198 (e.g., representation information of objects in the virtual space) and modeled asset information 200 from the environment model database 16 to produce lesson asset information 202. The modeled asset information 200 includes representations of an environment to support the updated learning path information 196 (e.g., modeled places and modeled objects) and the lesson asset information 202 includes a representation of the environment, learning path, the objectives, and the desired knowledge to impart.

FIG. 8B further illustrates the example of operation where the instruction module 184 outputs a representation of the lesson asset information 202 as instructor output information 160. The instructor output information 160 includes a representation of the environment and the asset so far to be experienced by an instructor who is about to input interactions with the environment to impart the desired knowledge.

The instruction module 184 receives instructor input information 166 from the instructor in response to the instructor output information 160. The instructor input information 166 includes interactions from the instructor to facilitate imparting of the knowledge (e.g., instructor annotations, pointer movements, highlighting, text notes, and speech) and testing of comprehension of the knowledge (e.g., valuation information such as questions and correct answers). The instruction module 184 obtains assessment information (e.g., comprehension test points, questions, correct answers to the questions) for each learning objective based on the lesson asset information 202 and produces instruction information 204 (e.g., representation of instructor interactions with objects within the virtual place, evaluation information).

FIG. 8C further illustrates the example of operation where the lesson generation module 186 renders (e.g., as a multi-dimensional representation) the objects associated with each lesson (e.g., assets of the environment) within the environment in accordance with the instructor interactions for the instruction portion and the assessment portion of the learning experience. Each object is assigned a relative position in XYZ world space within the environment to produce the lesson rendering.

The lesson generation module 186 outputs the rendering as a lesson package 206 for storage in the learning assets database 34. The lesson package 206 includes everything required to replay the lesson for a subsequent learner (e.g., representation of the environment, the objects, the interactions of the instructor during both the instruction and evaluation portions, questions to test comprehension, correct answers to the questions, a scoring approach for evaluating comprehension, all of the learning objective information associated with each learning objective of the lesson).

Figure 8D:
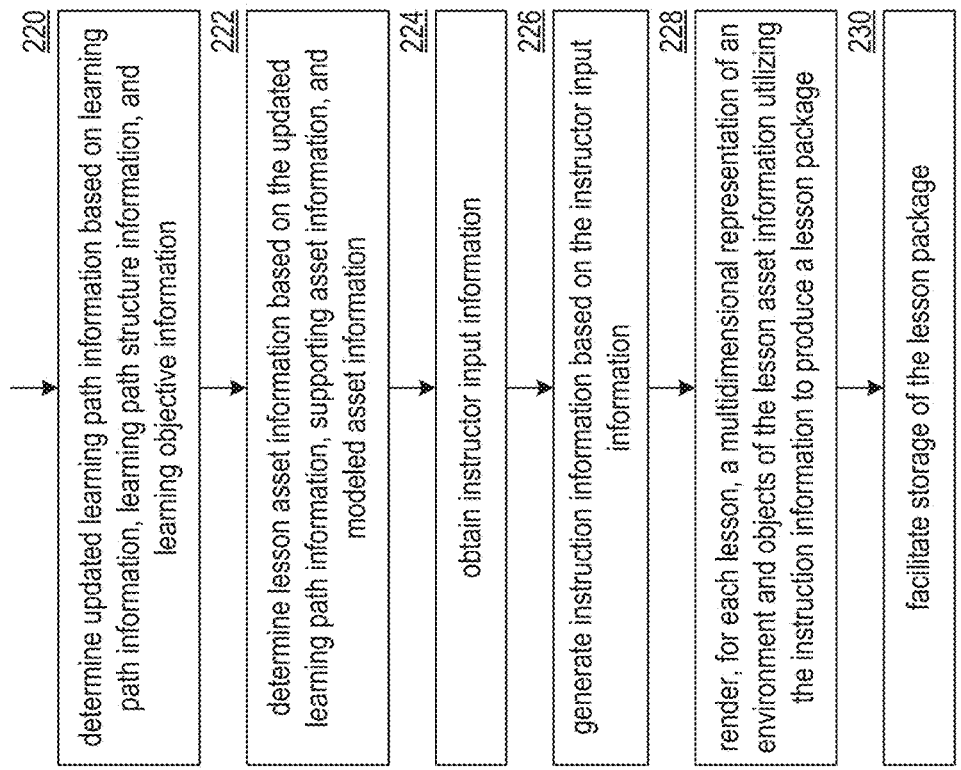
FIG. 8D is a logic diagram of an embodiment of a method for creating a learning experience within a computing system in accordance with the present invention.

FIG. 8D is a logic diagram of an embodiment of a method for creating a learning experience within a computing system (e.g., the computing system 10 of FIG. 1). In particular, a method is presented in conjunction with one or more functions and features described in conjunction with FIGS. 1-7B, and also FIGS. 8A-8C. The method includes step 220 where a processing module of one or more processing modules of one or more computing devices within the computing system determines updated learning path information based on learning path information, learning path structure information, and learning objective information. For example, the processing module combines a previous learning path with obtained learning path structure information in accordance with learning objective information to produce the updated learning path information (i.e., specifics for a series of learning objectives of a lesson).

The method continues at step 222 where the processing module determines lesson asset information based on the updated learning path information, supporting asset information, and modeled asset information. For example, the processing module combines assets of the supporting asset information (e.g., received from an instructor) with assets and a place of the modeled asset information in accordance with the updated learning path information to produce the lesson asset information. The processing module selects assets as appropriate for each learning objective (e.g., to facilitate the imparting of knowledge based on a predetermination and/or historical results).

The method continues at step 224 where the processing module obtains instructor input information. For example, the processing module outputs a representation of the lesson asset information as instructor output information and captures instructor input information for each lesson in response to the instructor output information. Further obtain asset information for each learning objective (e.g., extract from the instructor input information).

The method continues at step 226 where the processing module generates instruction information based on the instructor input information. For example, the processing module combines instructor gestures and further environment manipulations based on the assessment information to produce the instruction information.

The method continues at step 228 where the processing module renders, for each lesson, a multidimensional representation of environment and objects of the lesson asset information utilizing the instruction information to produce a lesson package. For example, the processing module generates the multidimensional representation of the environment that includes the objects and the instructor interactions of the instruction information to produce the lesson package. For instance, the processing module includes a 3-D rendering of a place, background objects, recorded objects, and the instructor in a relative position XYZ world space over time.

The method continues at step 230 where the processing module facilitates storage of the lesson package. For example, the processing module indexes the one or more lesson packages of the one or more lessons of the learning path to produce indexing information (e.g., title, author, instructor identifier, topic area, etc.). The processing module stores the indexed lesson package as learning asset information in a learning assets database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 8E, 8F, 8G, 8H, 8J, and 8K are schematic block diagrams of another embodiment of a computing system illustrating another example of a method to create a learning experience. The embodiment includes creating a multi-disciplined learning tool regarding a topic. The multi-disciplined aspect of the learning tool includes both disciplines of learning and any form/format of presentation of content regarding the topic. For example, a first discipline includes mechanical systems, a second discipline includes electrical systems, and a third discipline includes fluid systems when the topic includes operation of a combustion based engine. The computing system includes the environment model database 16 of FIG. 1, the learning assets database 34 of FIG. 1, and the experience creation module 30 of FIG. 1.

Figure 8E:
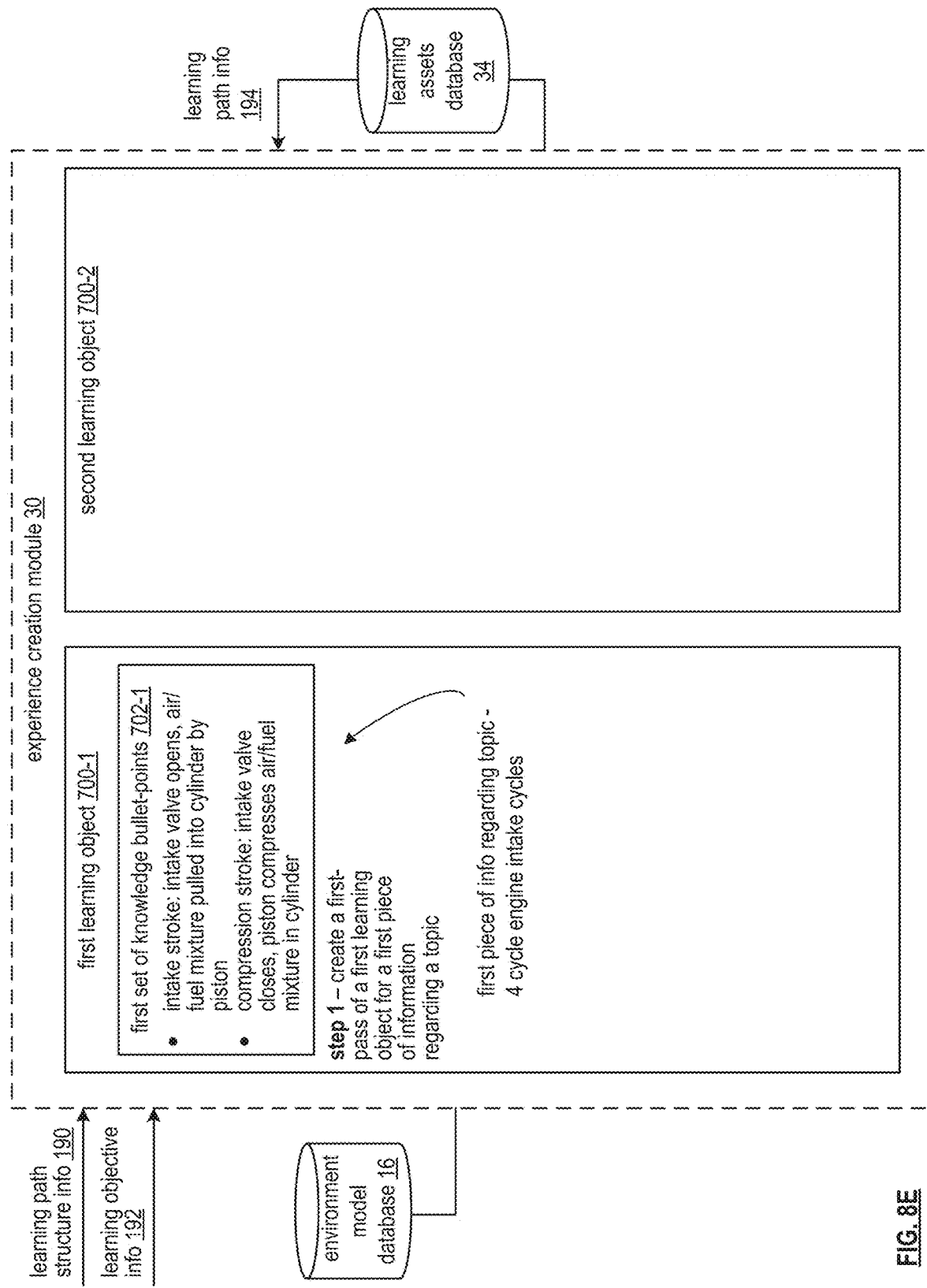

FIG. 8E illustrates the example of operation where the experience creation module 30 creates a first-pass of a first learning object 700-1 for a first piece of information regarding the topic to include a first set of knowledge bullet-points 702-1 regarding the first piece of information. The creating includes utilizing guidance from an instructor and/or reusing previous knowledge bullet-points for a related topic. For example, the experience creation module 30 extracts the bullet-points from one or more of learning path structure information 190 and learning objective information 192 when utilizing the guidance from the instructor. As another example, the experience creation module 30 extracts the bullet-points from learning path information 194 retrieved from the learning assets database 34 when utilizing previous knowledge bullet points for the related topic.

Each piece of information is to impart additional knowledge related to the topic. The additional knowledge of the piece of information includes a characterization of learnable material by most learners in just a few minutes. As a specific example, the first piece of information includes "4 cycle engine intake cycles" when the topic includes "how a 4 cycle engine works."

Each of the knowledge bullet-points are to impart knowledge associated with the associated piece of information in a logical (e.g., sequential) and knowledge building fashion. As a specific example, the experience creation module 30 creates the first set of knowledge bullet-points 702-1 based on instructor input to include a first bullet point "intake stroke: intake valve opens, air/fuel mixture pulled into cylinder by piston" and a second bullet point "compression stroke: intake valve closes, piston compresses air/fuel mixture in cylinder" when the first piece of information includes the "4 cycle engine intake cycles."

Figure 8F:
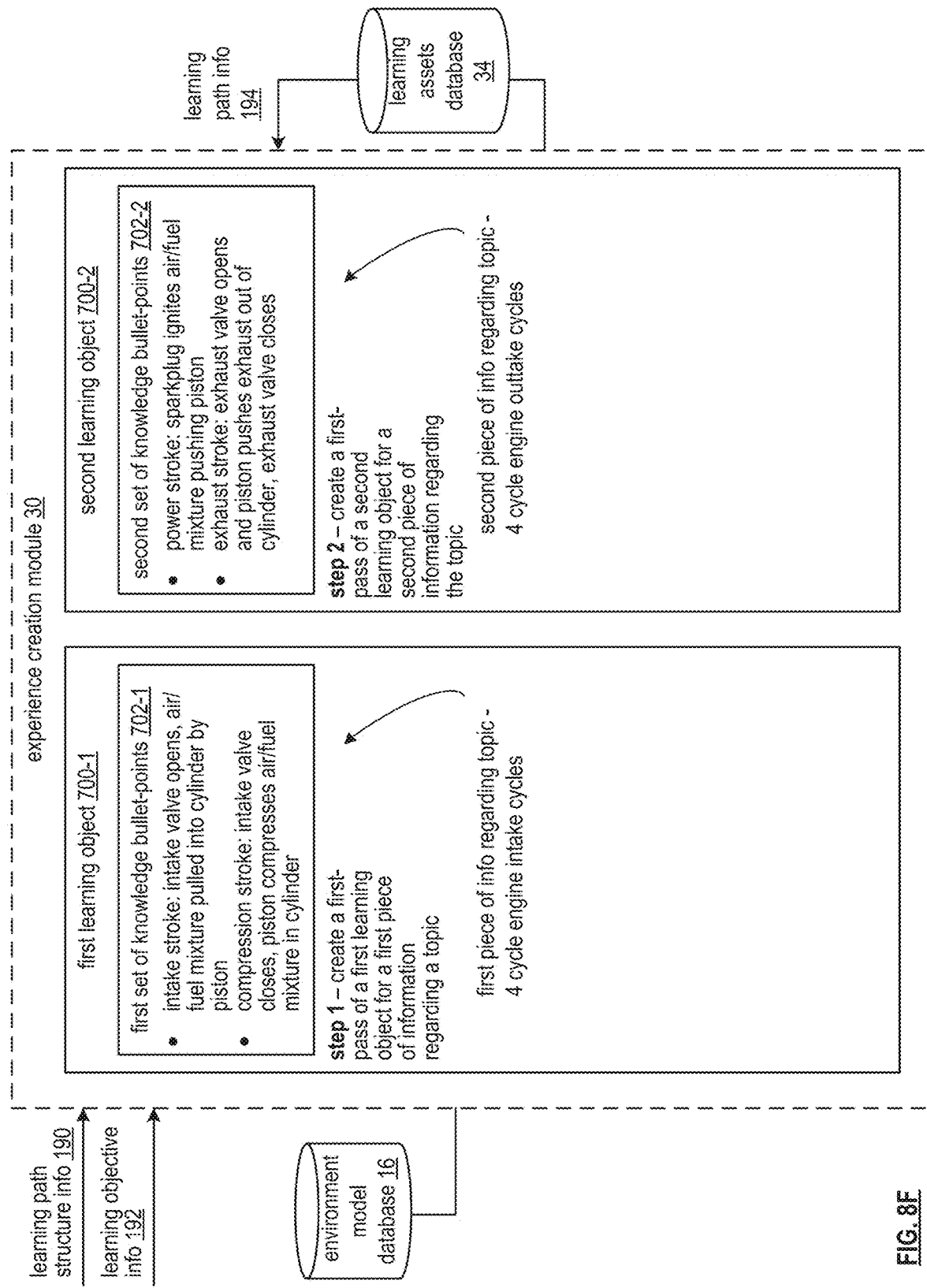

FIG. 8F further illustrates the example of operation where the experience creation module 30 creates a first-pass of a second learning object 700-2 for a second piece of information regarding the topic to include a second set of knowledge bullet-points 702-2 regarding the second piece of information. As a specific example, the experience creation module 30 creates the second set of knowledge bullet-points 702-2 based on the instructor input to include a first bullet point "power stroke: spark plug ignites air/fuel mixture pushing piston" and a second bullet point "exhaust stroke: exhaust valve opens and piston pushes exhaust out of cylinder, exhaust valve closes" when the second piece of information includes "4 cycle engine outtake cycles."

Figure 8G:
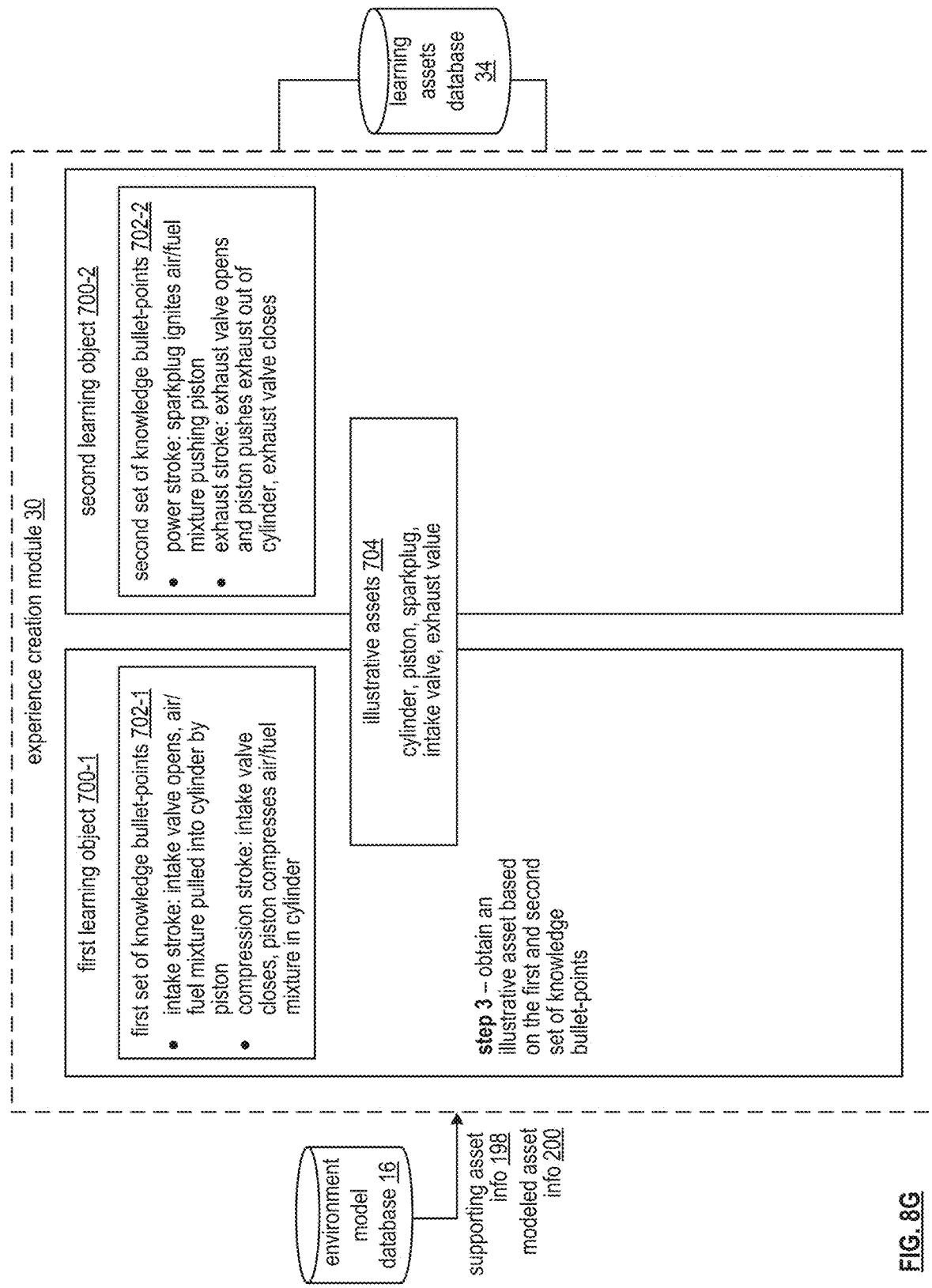

FIG. 8G further illustrates the example of operation where the experience creation module 30 obtains illustrative assets 704 based on the first and second set of knowledge bullet-points 702-1 and 702-2. The illustrative assets 704 depicts one or more aspects regarding the topic pertaining to the first and second pieces of information. Examples of illustrative assets includes background environments, objects within the environment (e.g., things, tools), where the objects and the environment are represented by multidimensional models (e.g., 3-D model) utilizing a variety of representation formats including video, scans, images, text, audio, graphics etc.

The obtaining of the illustrative assets 704 includes a variety of approaches. A first approach includes interpreting instructor input information to identify the illustrative asset. For example, the experience creation module 30 interprets instructor input information to identify a cylinder asset.

A second approach includes identifying a first object of the first and second set of knowledge bullet-points as an illustrative asset. For example, the experience creation module 30 identifies the piston object from both the first and second set of knowledge bullet-points.

A third approach includes determining the illustrative assets 704 based on the first object of the first and second set of knowledge bullet-points. For example, the experience creation module 30 accesses the environment model database 16 to extract information about an asset from one or more of supporting asset information 198 and modeled asset information 200 for a sparkplug when interpreting the first and second set of knowledge bullet-points.

Figure 8H:
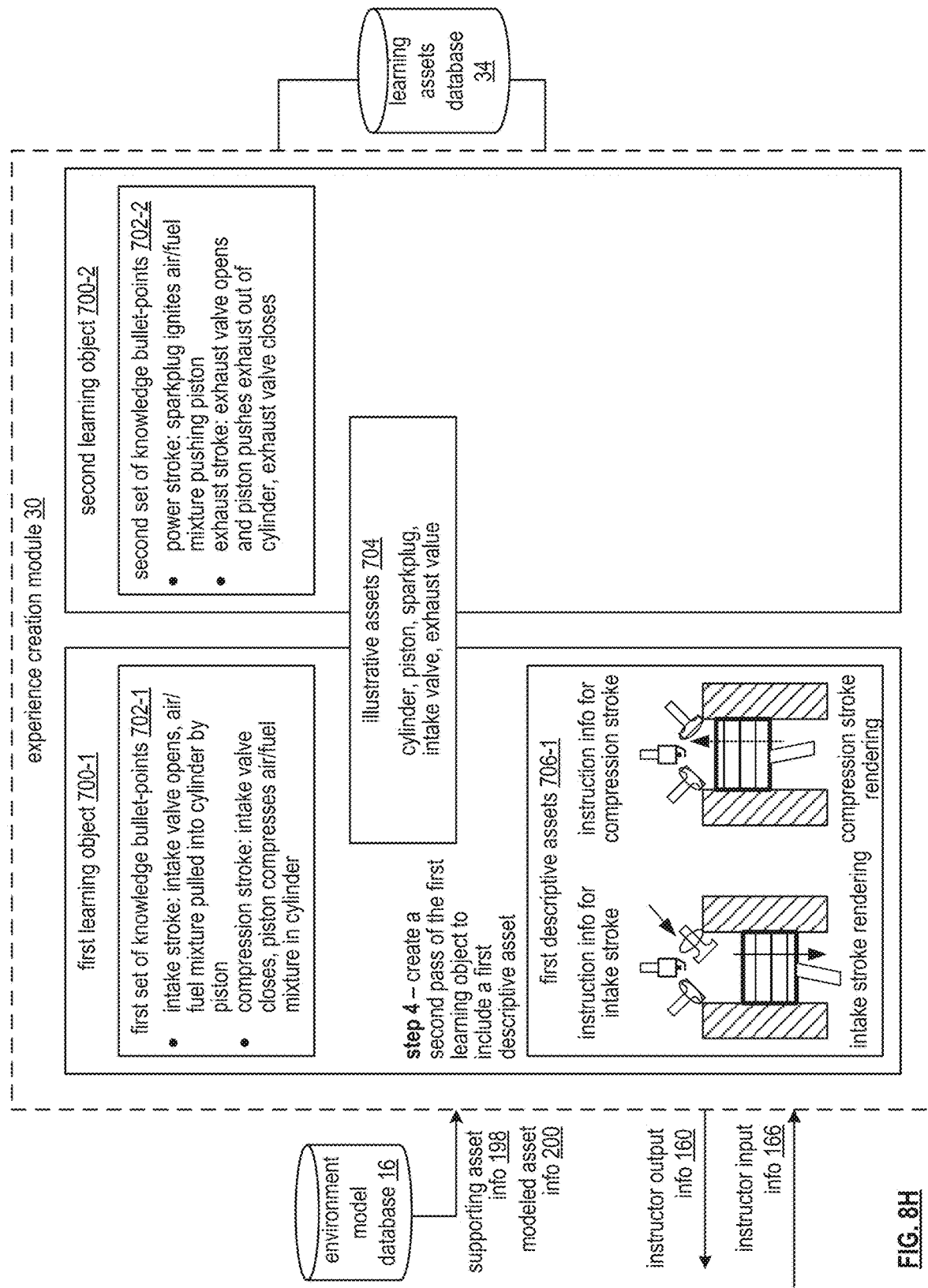

FIG. 8H further illustrates the example of operation where the experience creation module 30 creates a second-pass of the first learning object 700-1 to further include first descriptive assets 706-1 regarding the first piece of information based on the first set of knowledge bullet-points 702-1 and the illustrative assets 704. Descriptive assets include instruction information that utilizes the illustrative asset 704 to impart knowledge and subsequently test for knowledge retention. The embodiments of the descriptive assets includes multiple disciplines and multiple dimensions to provide improved learning by utilizing multiple senses of a learner. Examples of the instruction information includes annotations, actions, motions, gestures, expressions, recorded speech, speech inflection information, review information, speaker notes, and assessment information.

The creating the second-pass of the first learning object 700-1 includes generating a representation of the illustrative assets 704 based on a first knowledge bullet-point of the first set of knowledge bullet-points 702-1. For example, the experience creation module 30 renders 3-D frames of a 3-D model of the cylinder, the piston, the spark plug, the intake valve, and the exhaust valve in motion when performing the intake stroke where the intake valve opens and the air/fuel mixture is pulled into the cylinder by the piston.

The creating of the second-pass of the first learning object 700-1 further includes generating the first descriptive assets 706-1 utilizing the representation of the illustrative assets 704. For example, the experience creation module 30 renders 3-D frames of the 3-D models of the various engine parts without necessarily illustrating the first set of knowledge bullet-points 702-1.

In an embodiment where the experience creation module 30 generates the representation of the illustrative assets 704, the experience creation module 30 outputs the representation of the illustrative asset 704 as instructor output information 160 to an instructor. For example, the 3-D model of the cylinder and associated parts.

The experience creation module 30 receives instructor input information 166 in response to the instructor output information 160. For example, the instructor input information 166 includes instructor annotations to help explain the intake stroke (e.g., instructor speech, instructor pointer motions). The experience creation module 30 interprets the instructor input information 166 to produce the first descriptive assets 706-1. For example, the renderings of the engine parts include the intake stroke as annotated by the instructor.

Figure 8J:
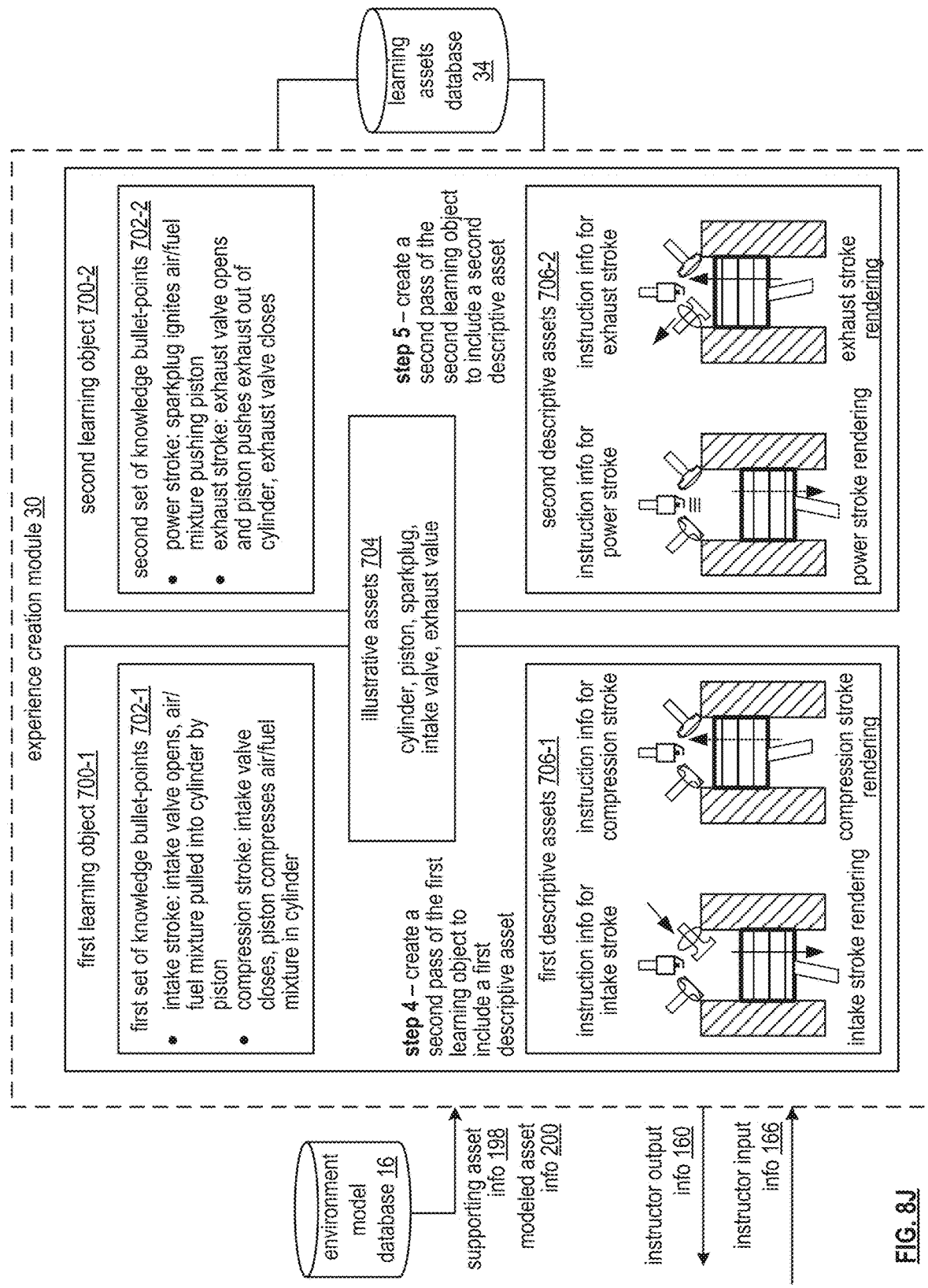

FIG. 8J further illustrates the example of operation where the experience creation module 30 creates a second-pass of the second learning object 700-2 to further include second descriptive assets 706-2 regarding the second piece of information based on the second set of knowledge bullet-points 702-2 and the illustrative assets 704. For example, the experience creation module 30 creates 3-D renderings of the power stroke and the exhaust stroke as annotated by the instructor based on further instructor input information 166.

Figure 8K:
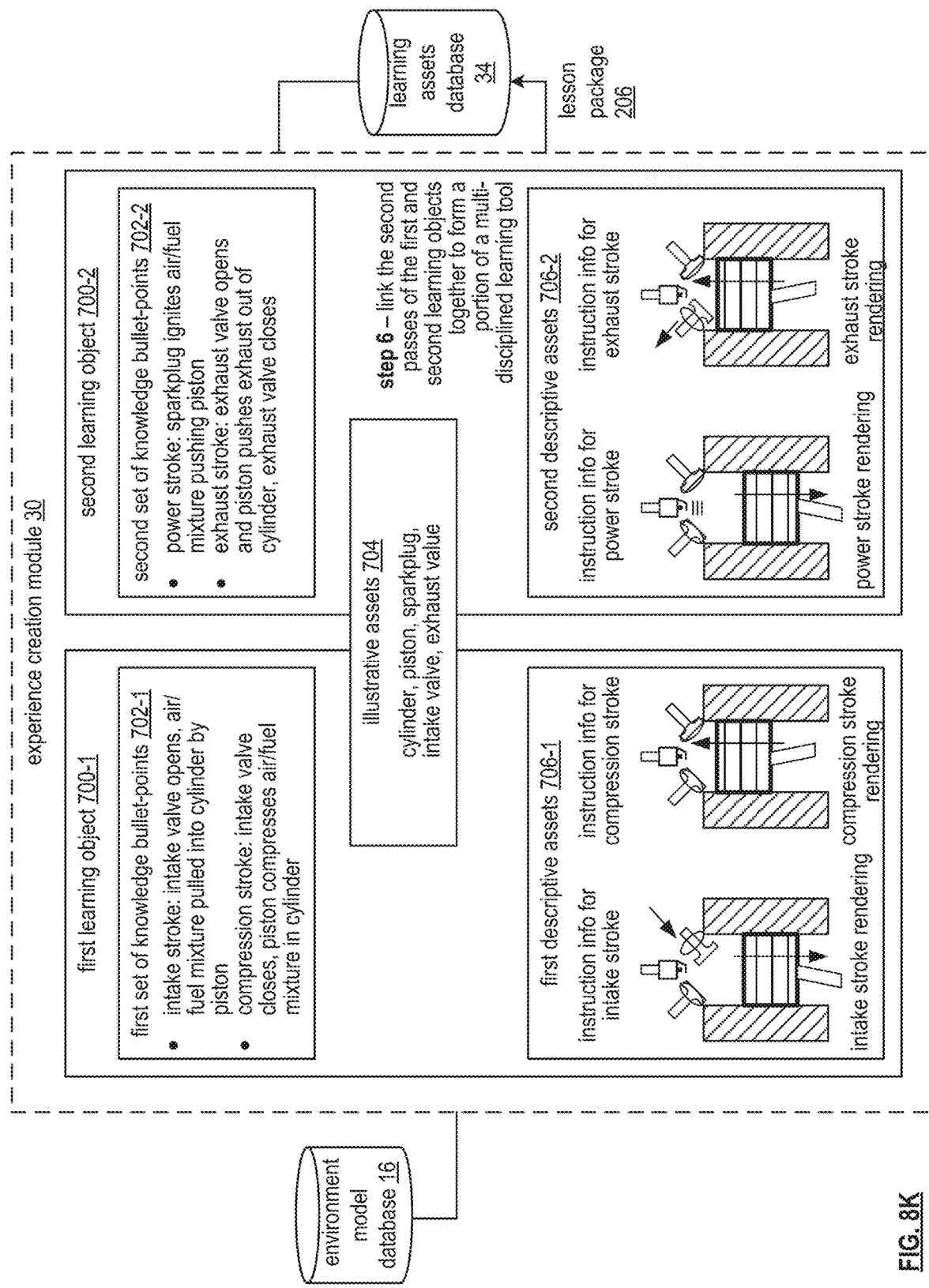

FIG. 8K further illustrates the example of operation where the experience creation module 30 links the second-passes of the first and second learning objects 700-1 and 700-2 together to form at least a portion of the multi-disciplined learning tool. For example, the experience creation module 30 aggregates the first learning object 700-1 and the second learning object 700-2 to produce a lesson package 206 for storage in the learning assets database 34.

In an embodiment, the linking of the second-passes of the first and second learning objects 700-1 and 700-2 together to form the at least the portion of the multi-disciplined learning tool includes generating index information for the second-passes of first and second learning objects to indicate sharing of the illustrative asset 704. For example, the experience creation module 30 generates the index information to identify the first learning object 700-1 and the second learning object 700-2 as related to the same topic.

The linking further includes facilitating storage of the index information and the first and second learning objects 700-1 and 700-2 in the learning assets database 34 to enable subsequent utilization of the multi-disciplined learning tool. For example, the experience creation module 30 aggregates the first learning object 700-1, the second learning object 700-2, and the index information to produce the lesson package 206 for storage in the learning assets database 34.

The method described above with reference to FIGS. 8E-8K in conjunction with the experience creation module 30 can alternatively be performed by other modules of the computing system 10 of FIG. 1 or by other devices including various embodiments of the computing entity 20 of FIG. 2A. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause boy one or more computing devices to perform any or all of the method steps described above.

FIGS. 9A, 9B, 9C, 9D, and 9E are schematic block diagrams of an embodiment of a computing system illustrating an example of constructing a lesson package. The computing system includes the environment model database 16 of FIG. 1, the environment sensor module 14 of FIG. 1, the experience creation module 30 of FIG. 1, and the learning assets database 34 of FIG. 1. The environment sensor module 14 includes the motion sensor 126 of FIG. 4 and the position sensor 128 of FIG. 4. The experience creation module 30 includes the learning path module 180 of FIG. 8A, the asset module 182 of FIG. 8A, the instruction module 184 of FIG. 8A, and the lesson generation module 186 of FIG. 8A.

Figure 9A:
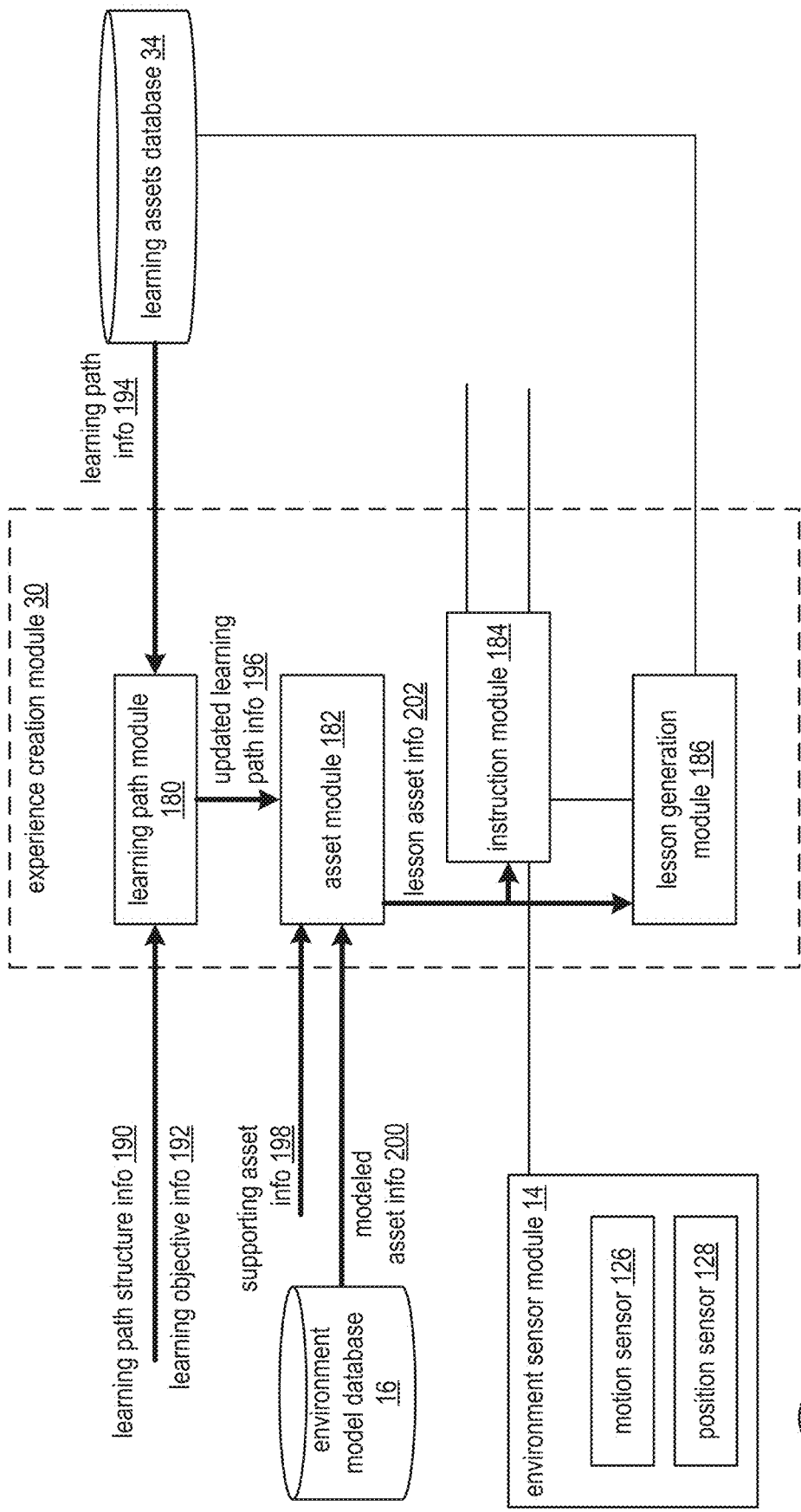

FIG. 9A illustrates an example of a method of operation to construct the lesson package where, in a first step the experience creation module obtains lesson asset information for a lesson. For example, the learning path module 180 recovers learning path information 194 from the learning assets database 34 and receives learning path structure information 190 and learning objective information 192 from an instructor to produce updated learning path information 196 that includes structure and learning object information including instructor based on inputs.

The asset module 182 receives supporting asset information 198 and recovers modeled asset information 200 from the environment model database 16 to produce the lesson asset information 202 further based on the updated learning path information 196. The lesson asset information 202 represents information of the environment to support the updated learning path and objects within the environment.

Figure 9B:
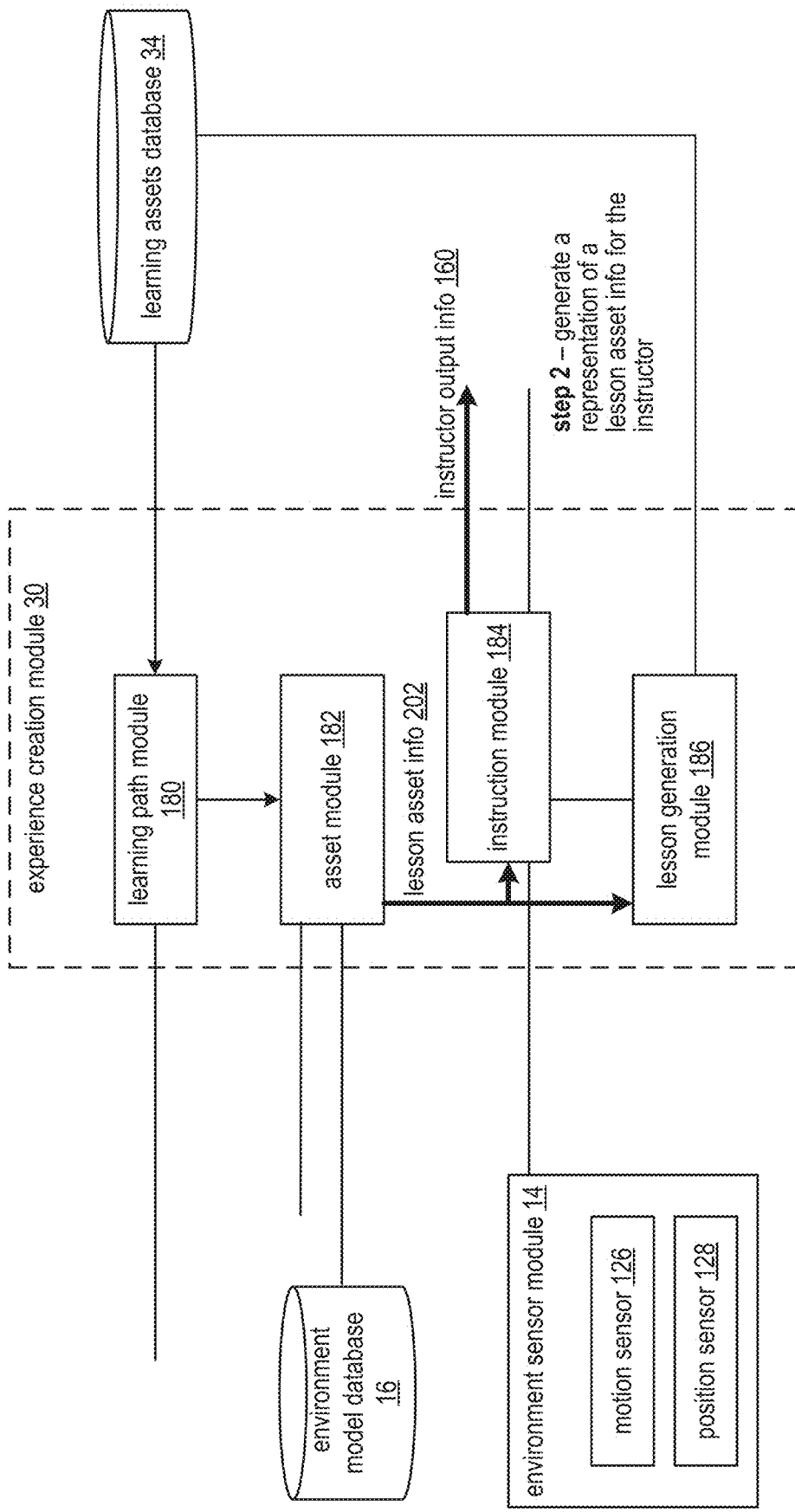

FIG. 9B further illustrates the method of operation to construct the lesson package where, having obtained the lesson asset information 202, in a second step the experience creation module 30 generates a representation of a portion of a lesson package of the lesson asset information 202 for an instructor 26-1. For example, the instruction module 184 generates instructor output information 160 based on the lesson asset information 202. The instructor output information 160 includes a representation of the environment and the assets so far (e.g., start of the lesson).

Figure 9C:
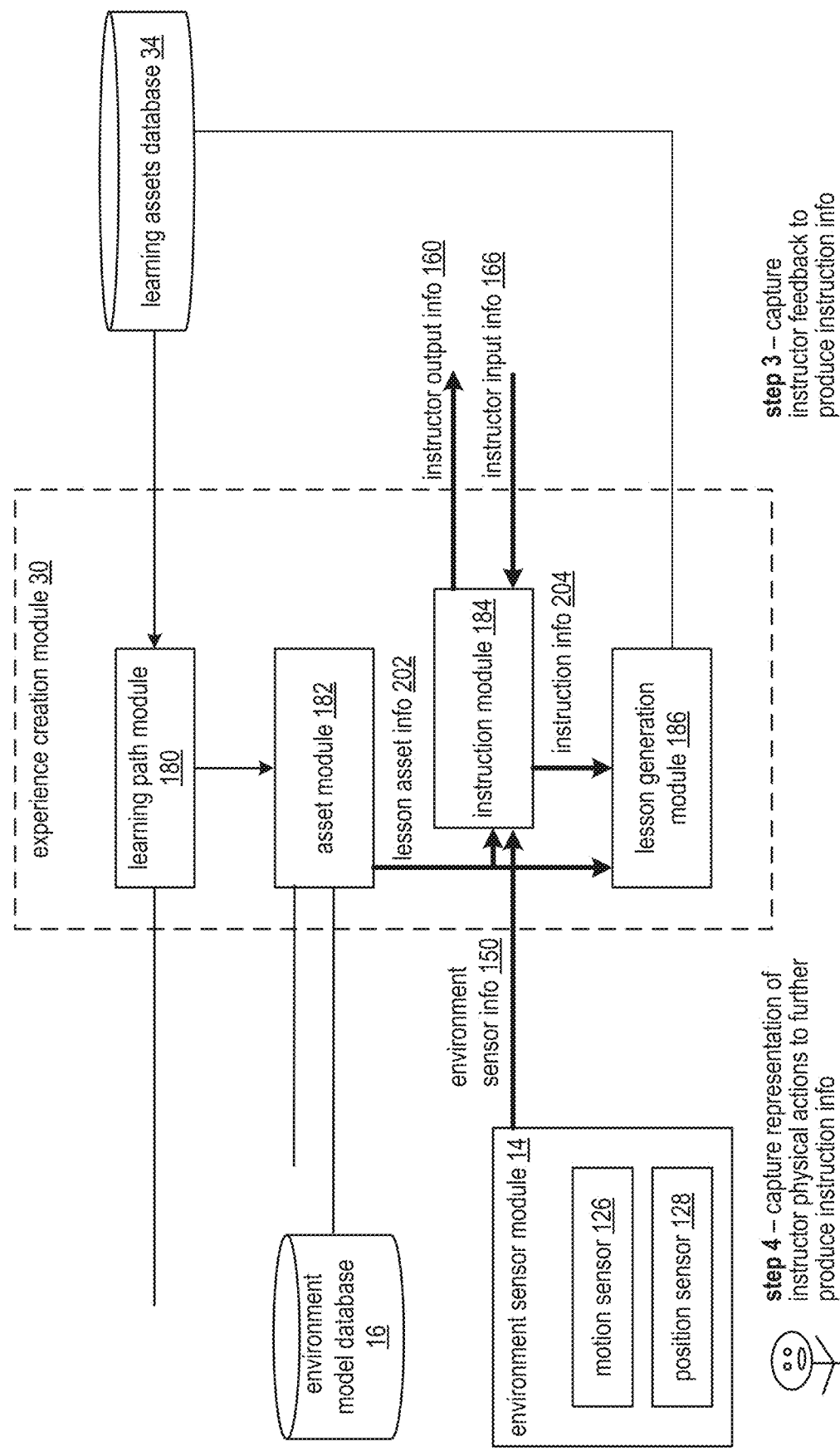

FIG. 9C further illustrates the method of operation to construct the lesson package where, having generated the representation of the lesson package for the instructor, in a third step the experience creation module 30 captures instructor feedback to produce instruction information. For example, the instruction module 184, receives instructor input information 166 from the instructor 26-1 in response to the instructor output information 160. The instructor input information 166 includes a representation of instructor interactions with objects within the virtual environment including composite evaluation information (e.g., explicit questions and answers).

Having captured instructor feedback, in a fourth step the experience creation module captures a representation of instructor physical actions to further produce instruction information. For example, the instruction module 184 receives environment sensor information 150 from the environment sensor module 14. The environment sensor module 14 detects physical manipulation of real world objects by the instructor 26-1 via the motion sensor 126 and position sensor 128 to produce the environment sensor information 150. The physical manipulations includes detecting a tool position, detecting a pointer position, detecting where a hand is, detecting a facial expression, detecting where a finger is pointing, detecting where eyes are looking, detecting feet position, etc.

Having received the environment sensor information 150 and the instructor input information 166, the instruction module 184 generates instruction information 204 based on the environment sensor information 150 and the instructor input information 166. The instruction information 204 includes a representation of instructor interactions with objects within the virtual environment and the composite evaluation information. The instruction information 204 includes a continuous stream of data.

Figure 9D:
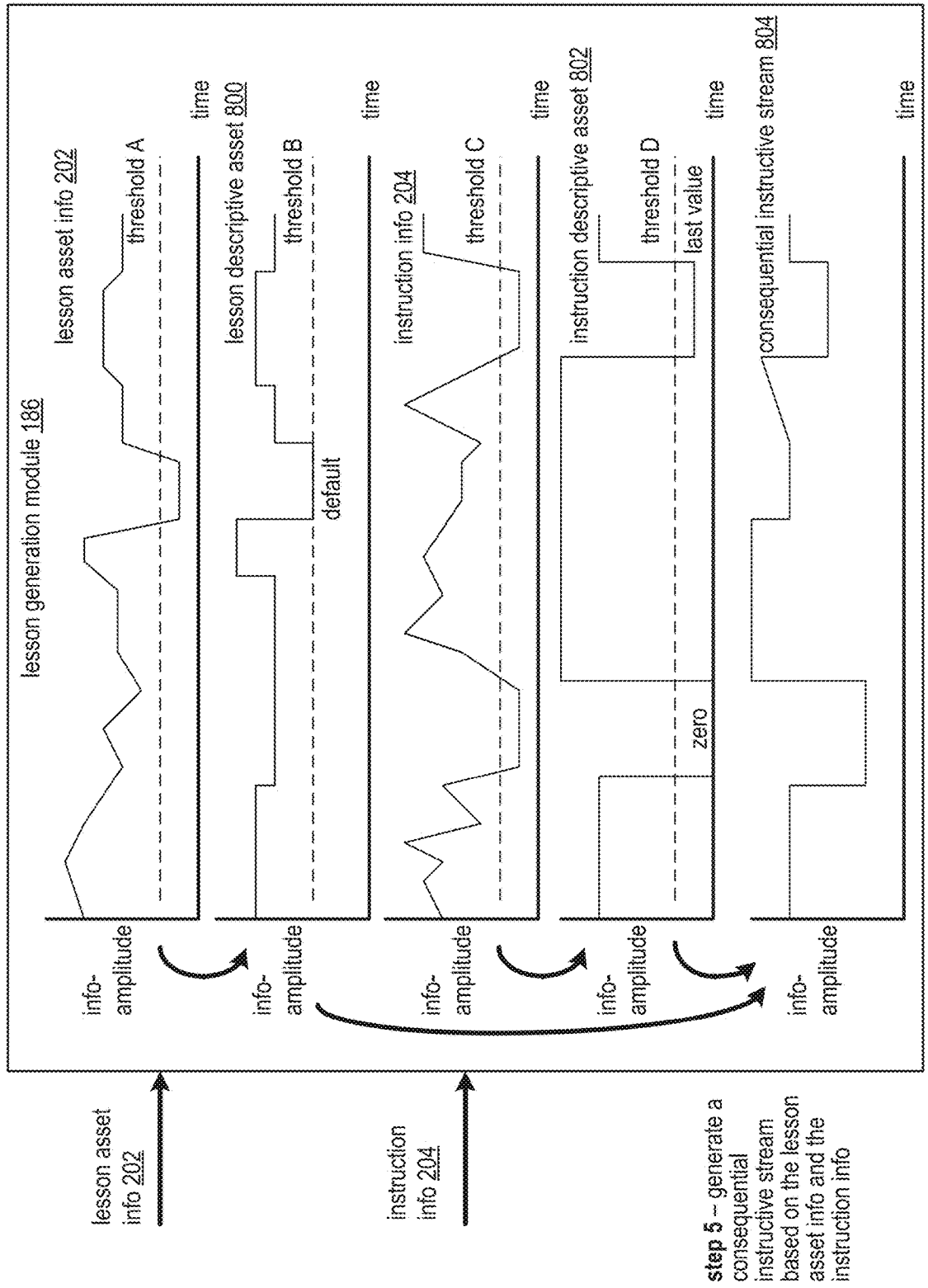

FIG. 9D further illustrates the method of operation to construct the lesson package where, having generated the instruction information 204, in a fifth step the lesson generation module 186 generates a consequential instructive stream 804 based on the lesson asset information 202 and the instruction information 204. For example, the lesson generation module 186 substitutes a portion of the lesson asset information 202 with an adaptive representation to produce a lesson descriptive asset 800, where a storage requirement for the lesson descriptive asset 800 is less than a storage requirement for the lesson asset information 202. The substitution includes selecting the portion of the lesson asset information 202 based on an information-amplitude level of the portion. The information-amplitude level includes a motion level, a sound level, a priority of information etc. For instance, a portion is selected that falls below a threshold A.

The selecting of the portion of the lesson asset information 202 further includes selecting a portion that is below a minimum information-amplitude threshold over a timeframe of the portion. For example, a portion associated with asset renderings that are substantially the same as previous renderings.

The substituting of the portion of the lesson asset information 202 further includes selecting an adaptive representation for the selected portion. The adaptive representation includes a recent peak value, a last average value, a default value, a function of last value, etc. In an instance, the lesson descriptive asset 800 is established at a threshold B default level for the timeframe and an average value over all other timeframes.

In a similar fashion to generating the lesson descriptive asset 800, the lesson generation module 186 substitutes a portion of the instruction information 204 with another adaptive representation to produce an instruction descriptive asset 802, where a storage requirement for the instruction descriptive asset 802 is less than a storage requirement for the instruction information 204. In an instance, the instruction descriptive asset 802 is established below a threshold D level for timeframes (e.g., a first at zero and a second at a last value) where the instruction information 204 falls below a threshold level C and an average value over all other timeframes.

Having produced the lesson descriptive asset 800 and the instruction descriptive asset 802, the lesson generation module 186 generates the consequential instructive stream 804 based on the lesson descriptive asset 800 and the instruction descriptive asset 802. The generating includes one or more of a simple aggregation, favoring one over the other based on a default, in accordance with a predetermined schedule, based on importance of information, and using an information-amplitude absolute value and/or an information-amplitude threshold. The generating further includes picking neither and substituting a representation of them both, using a recent peak value, using a last avg value, using a default value, and determining a function of a previous value. For instance, the consequential instructive stream 804 is determined as an average of the lesson descriptive asset 800 and the instruction descriptive asset 802.

Figure 9E:
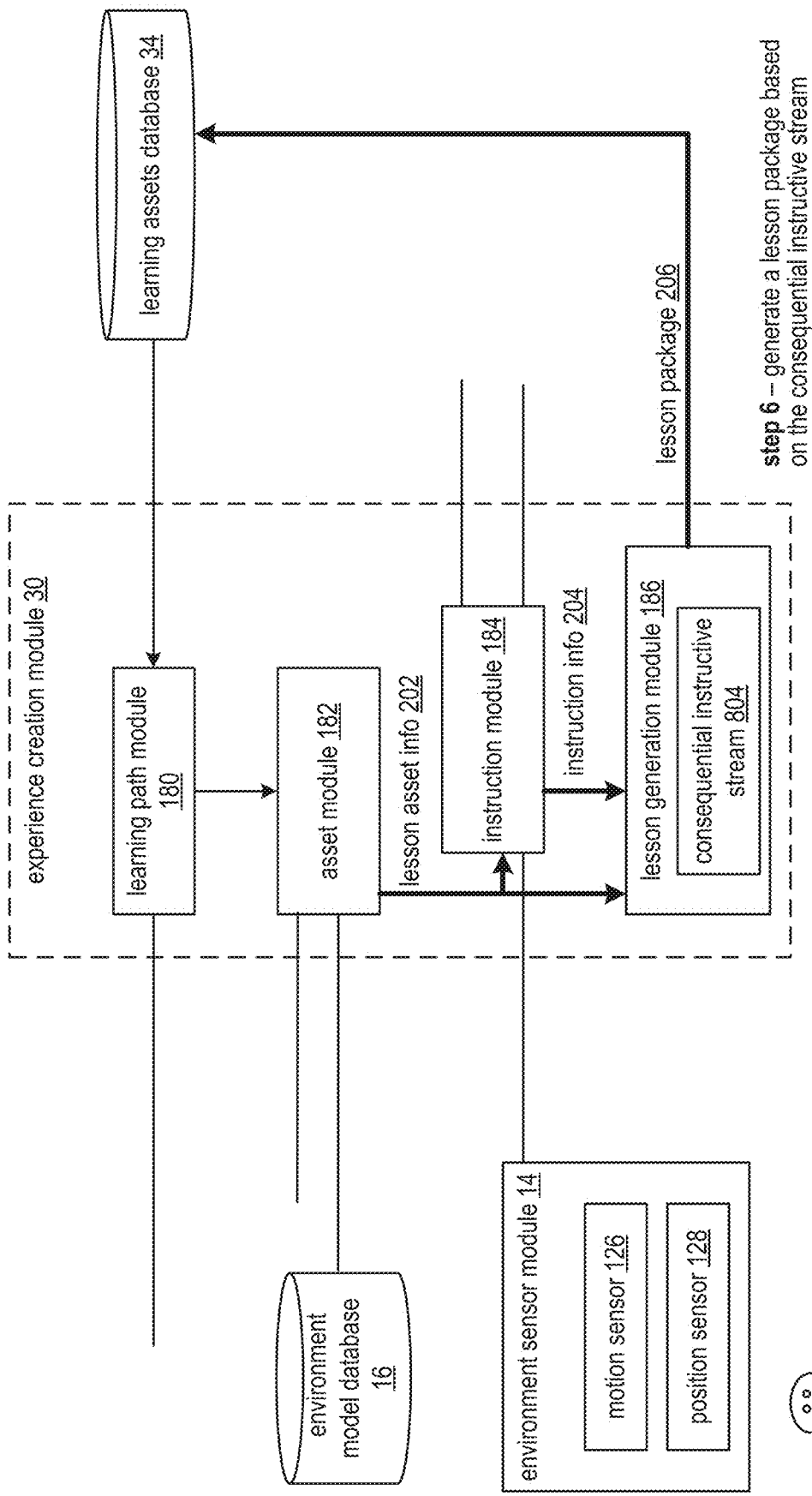

FIG. 9E further illustrates the method of operation to construct the lesson package where, having generated the instruction information 204, in a sixth step the experience creation module generates a lesson package. For example, the lesson generation module 186 generates the lesson package 206 for storage in the learning assets database 34 utilizing the consequential instructive stream 804 to provide a lowered storage capacity utilization level benefit.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 10A, 10B, 10C, and 10D are schematic block diagrams of an embodiment of a computing system illustrating an example of constructing a lesson package. The computing system includes the environment sensor module 14 of FIG. 1, the experience creation module 30 of FIG. 1, and the learning assets database 34 of FIG. 1. The environment sensor module 14 includes the motion sensor 126 of FIG. 4 and the position sensor 128 of FIG. 4. The experience creation module 30 includes the learning path module 180 of FIG. 8A, the asset module 182 of FIG. 8A, the instruction module 184 of FIG. 8A, and the lesson generation module 186 of FIG. 8A.

Figure 10A:
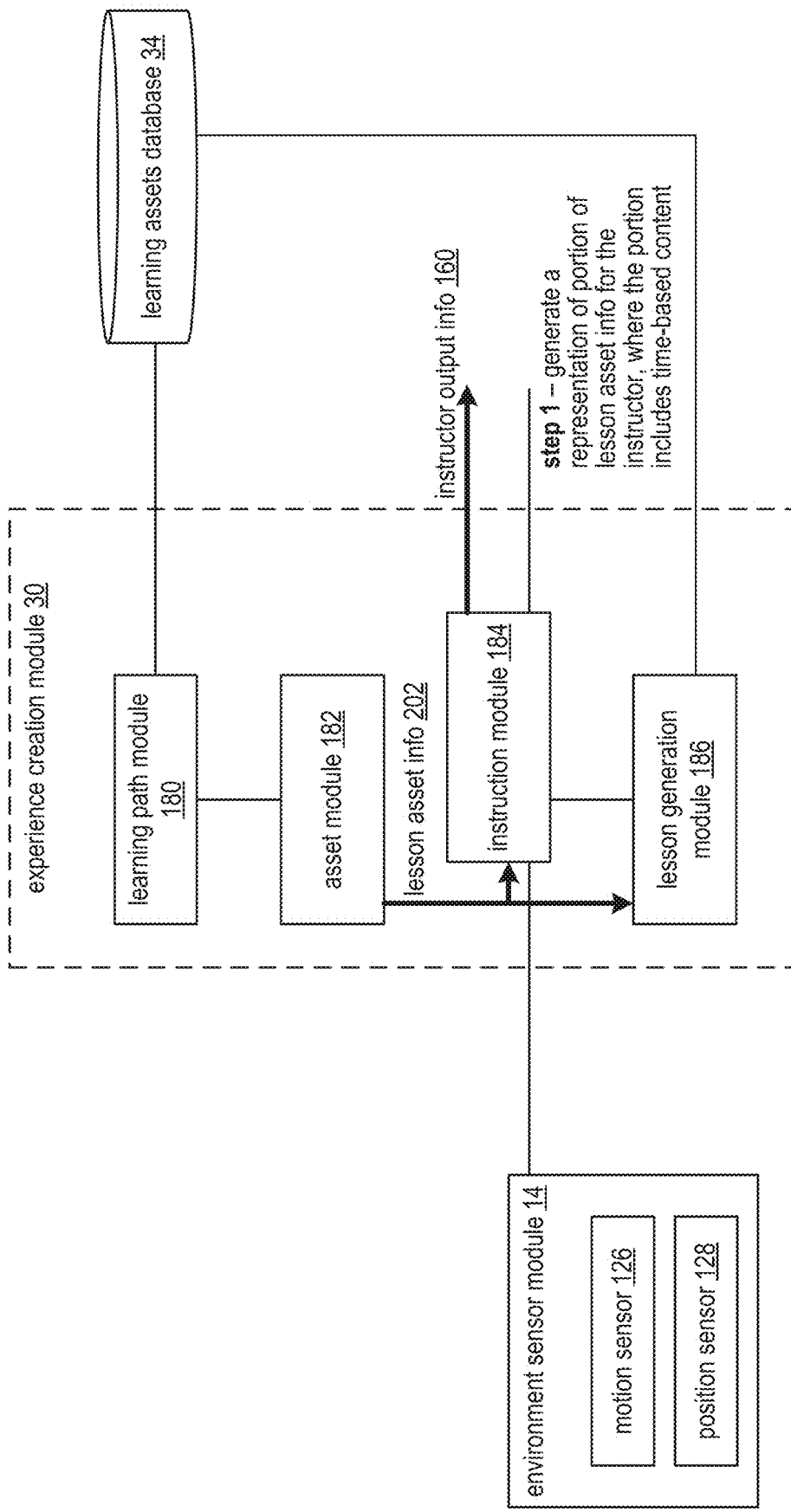

FIG. 10A illustrates an example of a method of operation to construct the lesson package where, in a first step the experience creation module 30 generates a representation of a portion of lesson asset information 202 for an instructor 26-1, where the portion includes time-based content (e.g., a frame by frame rendering). For example, the instruction module 184 receives the lesson asset information 202 from the asset module 182 and generates instructor output information 160 based on the lesson asset information 202. The instructor output information 160 includes a representation of the environment and the assets so far (e.g., video, a simulation, an animation, etc.).

Figure 10B:
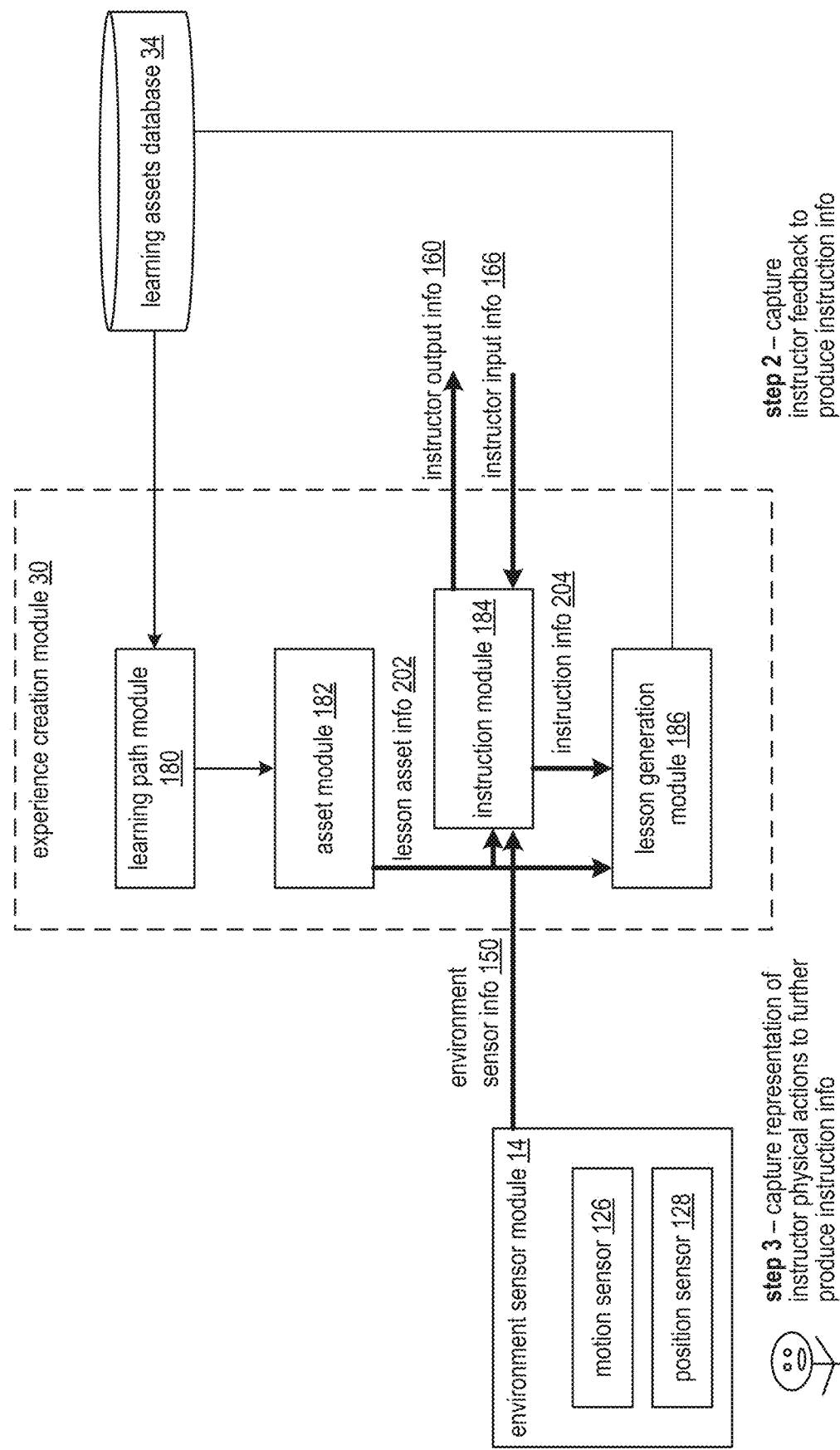

FIG. 10B further illustrates the example of the method of operation to construct the lesson package where, having generated the representation of the portion of the lesson package for the instructor, in a second step the experience creation module 30 captures instructor feedback to produce instruction information. For example, the instruction module 184, receives instructor input information 166 from the instructor 26-1 in response to the instructor output information 160. The instructor input information 166 includes a representation of instructor interactions with objects within the virtual environment including composite evaluation information (e.g., explicit questions and answers).

Having captured instructor feedback, in a third step the experience creation module 30 captures a representation of instructor physical actions to further produce instruction information. For example, the instruction module 184 receives environment sensor information 150 from the environment sensor module 14. The environment sensor module 14 detects physical manipulation of real world objects by the instructor 26-1 via the motion sensor 126 and position sensor 128 to produce the environment sensor information 150. The physical manipulations includes detecting a tool position, detecting a pointer position, detecting where a hand is, detecting a facial expression, detecting where a finger is pointing, detecting where eyes are looking, detecting feet position, etc.

Having received the environment sensor information 150 and the instructor input information 166, the instruction module 184 generates instruction information 204 based on the environment sensor information 150 and the instructor input information 166. The instruction information 204 includes a representation of instructor interactions with objects within the virtual environment and composite evaluation information. The instruction information 204 includes a continuous stream of data.

Figure 10C:
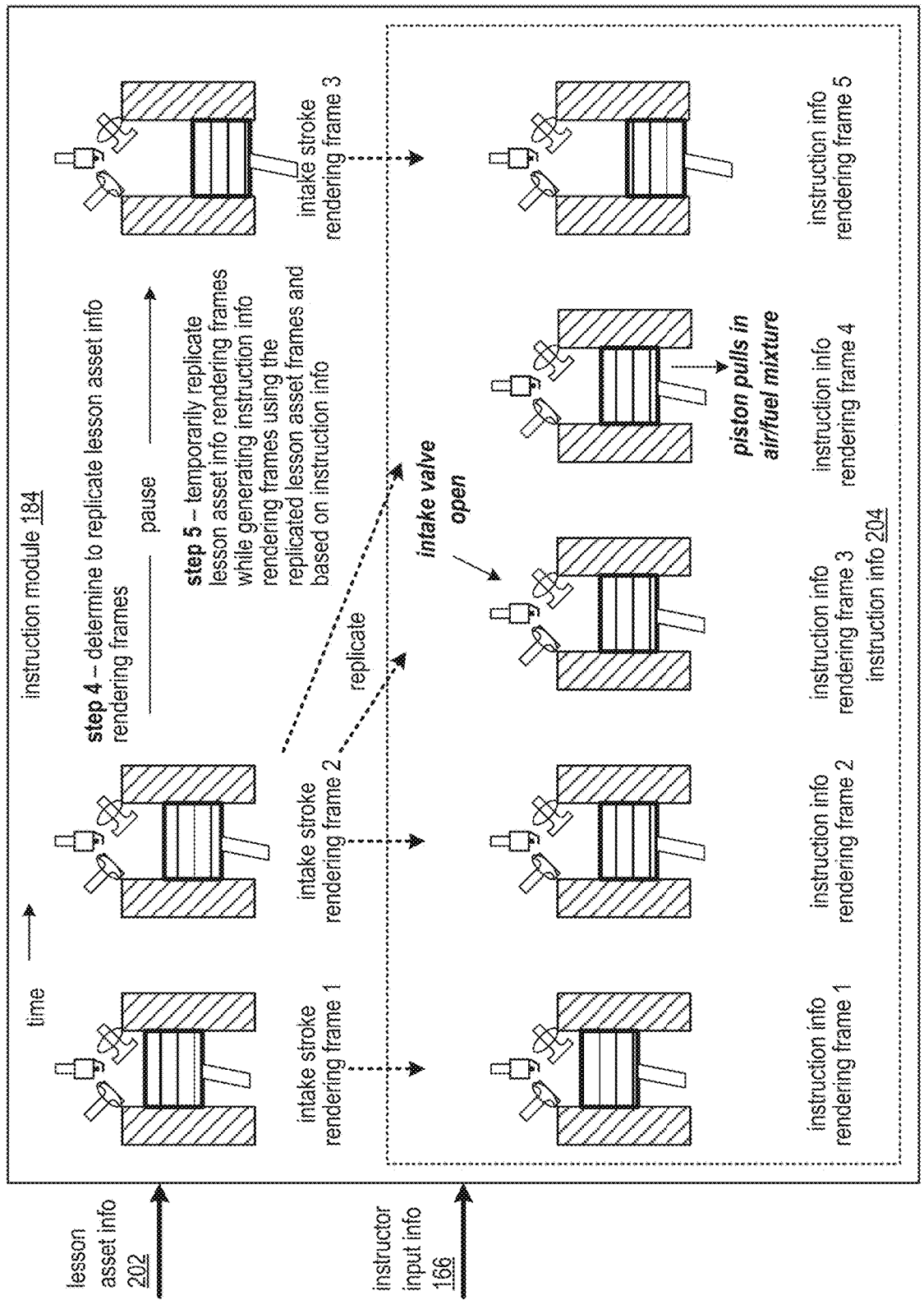

FIG. 10C further illustrates the example of the method of operation to construct the lesson package where, having generated the instruction information 204, in a fourth step the instruction module 184 determines to replicate lesson asset information rendering frames (e.g., pause the image stream to allow the instructor to make comments and annotate the paused image). The determining includes a variety of approaches. A first approach includes detecting a knowledge bullet-point associated with frame of lesson asset information. A second approach includes detecting a change in instructor input information and/or environment sensor information. A third approach includes detecting a pause button activation. A fourth approach includes determining that a maximum timeframe without instructor annotation has expired.

Having determined to replicate the lesson asset information rendering frames, in a fifth step the instruction module 184 temporarily replicates lesson asset information rendering frames while generating instruction information rendering frames using the replicated lesson asset frames and based on instruction information. For example, the instruction module 184 replicates the intake stroke rendering frame 2 as frames 2-4 of the instruction information 204 and adds instructor annotations. For instance, annotation "intake valve open" is added to frame 3 and "piston pulls in air/fuel mixture" is added to frame 4.

Having added the annotations, next frames of the lesson asset information 202 are utilized to create further frames of the instruction information 204. For example, the instruction module 184 generates frame 5 of the instruction information 204 utilizing frame 3 of the lesson asset information 202.

Figure 10D:
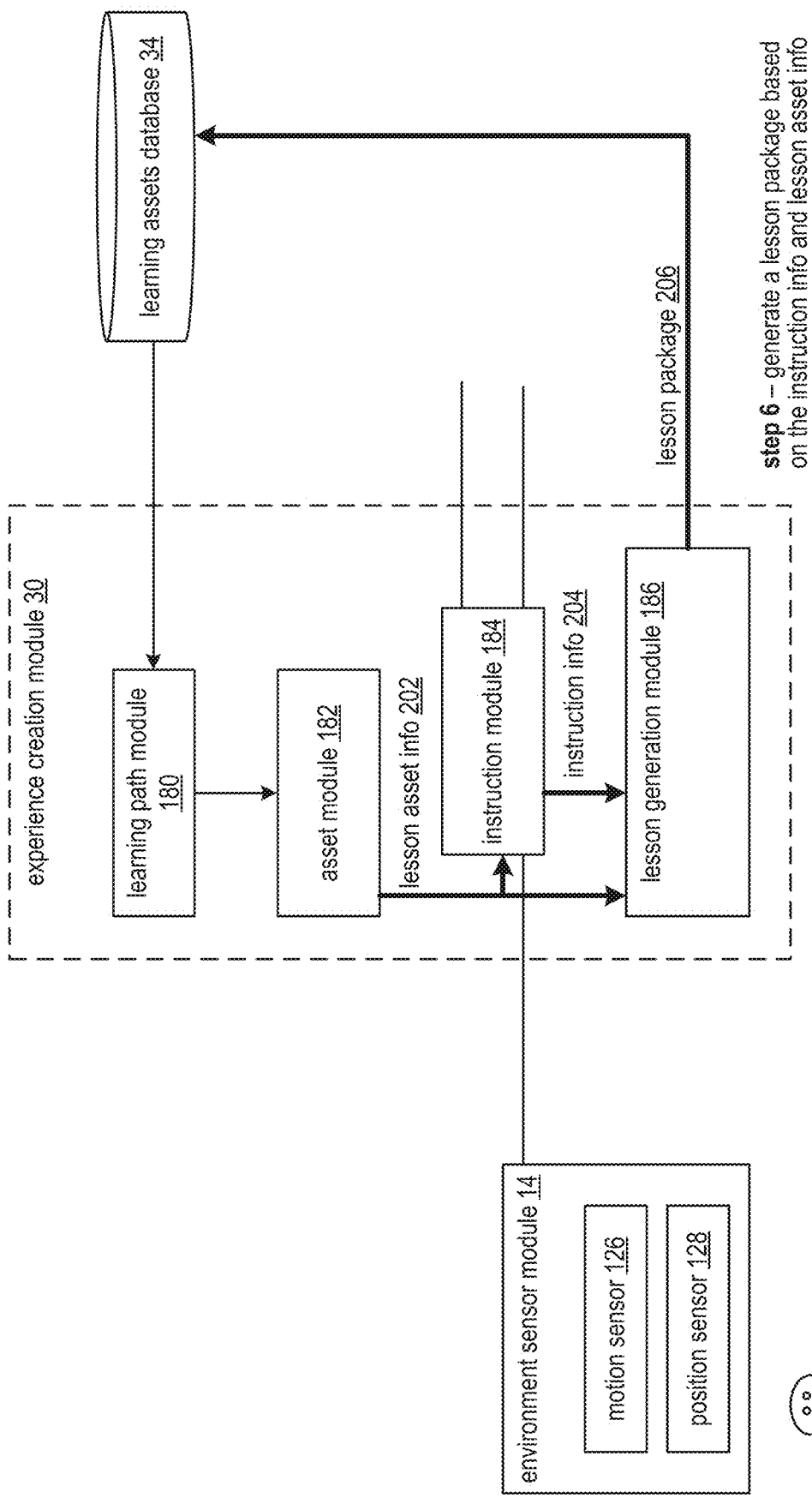

FIG. 10D further illustrates the method of operation to construct the lesson package where, having generated the instruction information 204, in a sixth step the experience creation module generates a lesson package. For example, the lesson generation module 186 generates the lesson package 206 for storage in the learning assets database 34 utilizing the instruction information 204.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 11A, 11B, 11C, and 11D are schematic block diagrams of an embodiment of a computing system illustrating an example of constructing a lesson package. The computing system includes the environment sensor module 14 of FIG. 1, the experience creation module 30 of FIG. 1, and the learning assets database 34 of FIG. 1. The environment sensor module 14 includes the motion sensor 126 of FIG. 4 and the position sensor 128 of FIG. 4. The experience creation module 30 includes the learning path module 180 of FIG. 8A, the asset module 182 of FIG. 8A, the instruction module 184 of FIG. 8A, and the lesson generation module 186 of FIG. 8A.

Figure 11A:
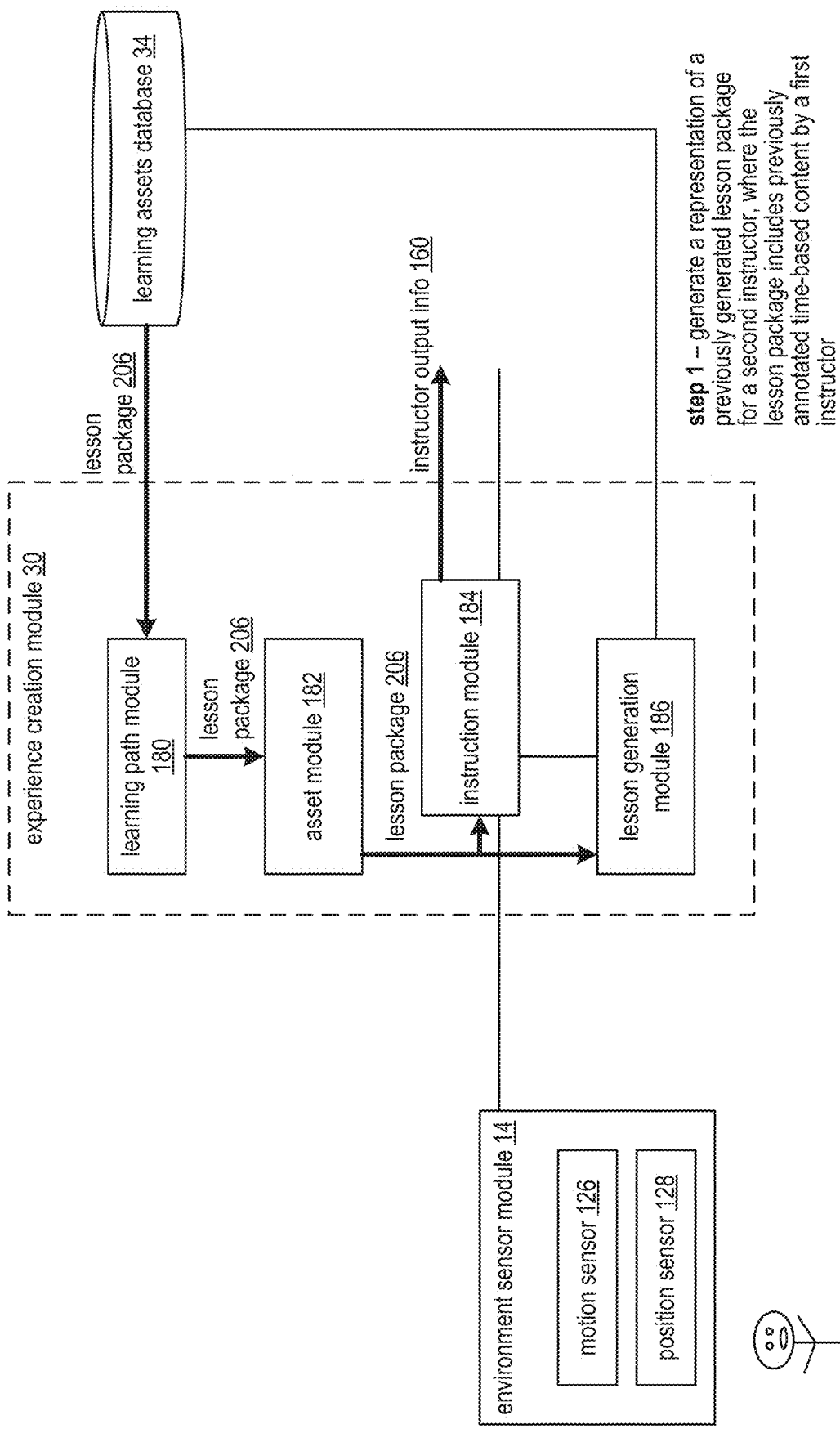

FIG. 11A illustrates an example of a method of operation to construct the lesson package where, in a first step the experience creation module 30 generates a representation of a previously generated lesson package for a second instructor, where the lesson package includes previously annotated time-based content by a first instructor (e.g., a frame by frame rendering). For example, the instruction module 184 receives the lesson package 206 from the asset module 182 and generates instructor output information 160 based on the lesson package 206. The instructor output information 160 includes a representation of the environment and the assets so far (e.g., vide, a simulation, an animation, etc.).

Figure 11B:
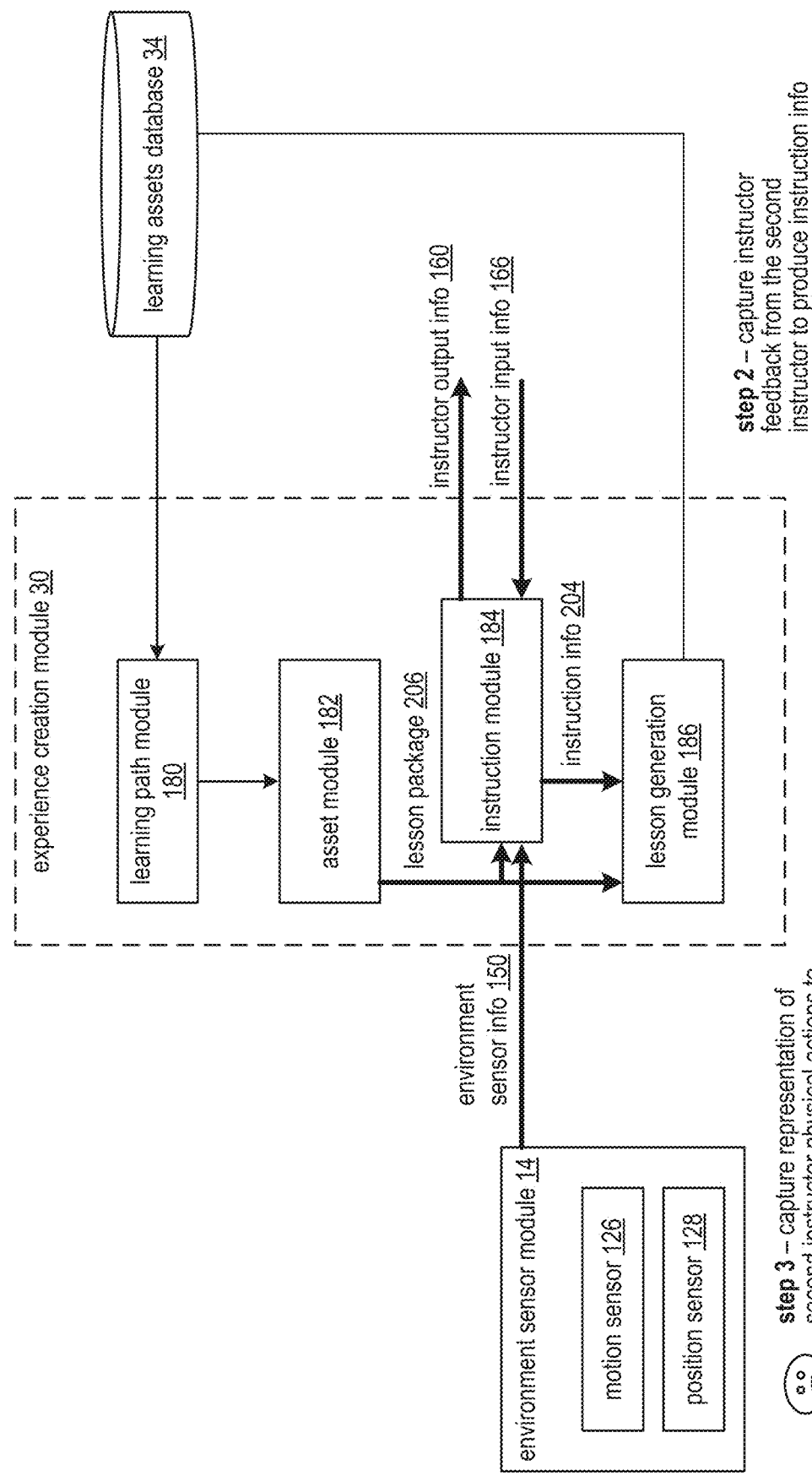

FIG. 11B further illustrates the example of the method of operation to construct the lesson package where, having generated the representation of the portion of the lesson package for the instructor, in a second step the experience creation module 30 captures instructor feedback from the second instructor to produce instruction information. For example, the instruction module 184, receives instructor input information 166 from the instructor 26-2 in response to the instructor output information 160. The instructor input information 166 includes a representation of second instructor interactions with objects within the virtual environment including composite evaluation information (e.g., explicit questions and answers).

Having captured instructor feedback, in a third step the experience creation module 30 captures a representation of instructor physical actions to further produce instruction information. For example, the instruction module 184 receives environment sensor information 150 from the environment sensor module 14. The environment sensor module 14 detects physical manipulation of real world objects by the instructor 26-2 via the motion sensor 126 and position sensor 128 to produce the environment sensor information 150. The physical manipulations includes detecting a tool position, detecting a pointer position, detecting where a hand is, detecting a facial expression, detecting where a finger is pointing, detecting where eyes are looking, detecting feet position, etc.

Having received the environment sensor information 150 and the instructor input information 166, the instruction module 184 generates instruction information 204 based on the environment sensor information 150 and the instructor input information 166. The instruction information 204 includes a representation of second instructor interactions with objects within the virtual environment and composite evaluation information. The instruction information 204 includes a continuous stream of data.

Figure 11C:
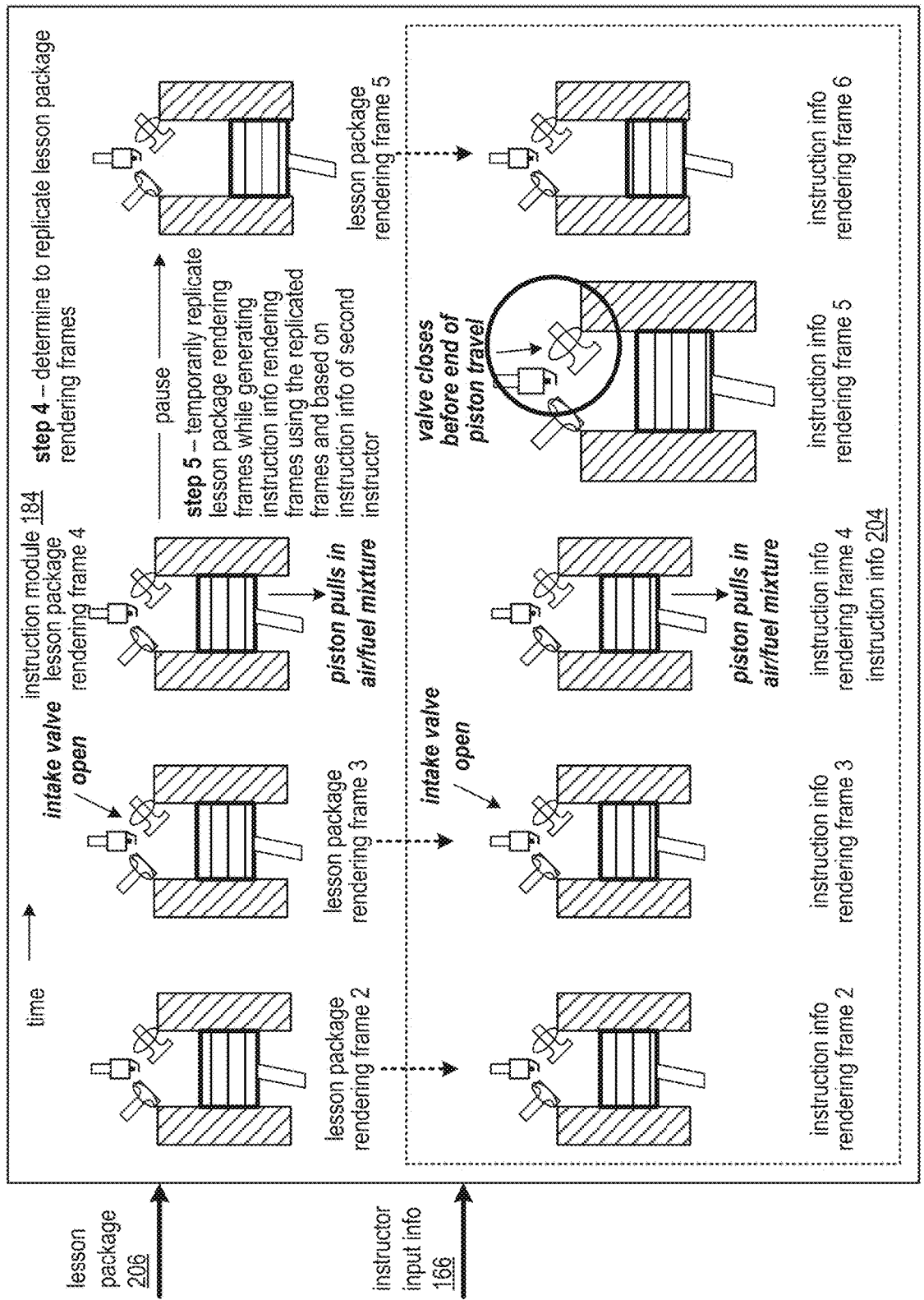

FIG. 11C further illustrates the example of the method of operation to construct the lesson package where, having generated the instruction information 204, in a fourth step the instruction module 184 determines to replicate lesson package rendering frames (e.g., pause the image stream to allow the second instructor to make comments and annotate the paused image). The determining includes a variety of approaches. A first approach includes identifying a portion of the lesson package with unfavorable comprehension, where the portion is affiliated with the first instructor. For instance, the instruction module 184 determines that learner comprehension associated with the engine example where the piston pulls in the air/fuel mixture has unfavorable comprehension and requires further explanation.

A second approach includes detecting a knowledge bulletpoint associated with frame of lesson asset information. A third approach includes detecting a change in second instructor input information and/or environment sensor information. A fourth approach includes detecting a pause button activation by the second instructor. A fifth approach includes determining that a maximum timeframe without second instructor annotation has expired.

Having determined to replicate the lesson asset information rendering frames, in a fifth step the instruction module 184 temporarily replicates lesson asset information rendering frames while generating instruction information rendering frames using the replicated lesson asset frames and based on instruction information from the second instructor. For example, the instruction module 184 replicates the intake stroke rendering frame 4 as frames 4-5 of the instruction information 204 and adds instructor annotations from the second instructor. For instance, annotation "valve closes before end of piston travel" along with a circle around the intake valve is added to frame 4.

Having added the annotations, next frames of the lesson asset information 202 are utilized to create further frames of the instruction information 204. For example, the instruction module 184 generates frame 6 of the instruction information 204 utilizing frame 5 of the lesson asset information 202.

Figure 11D:
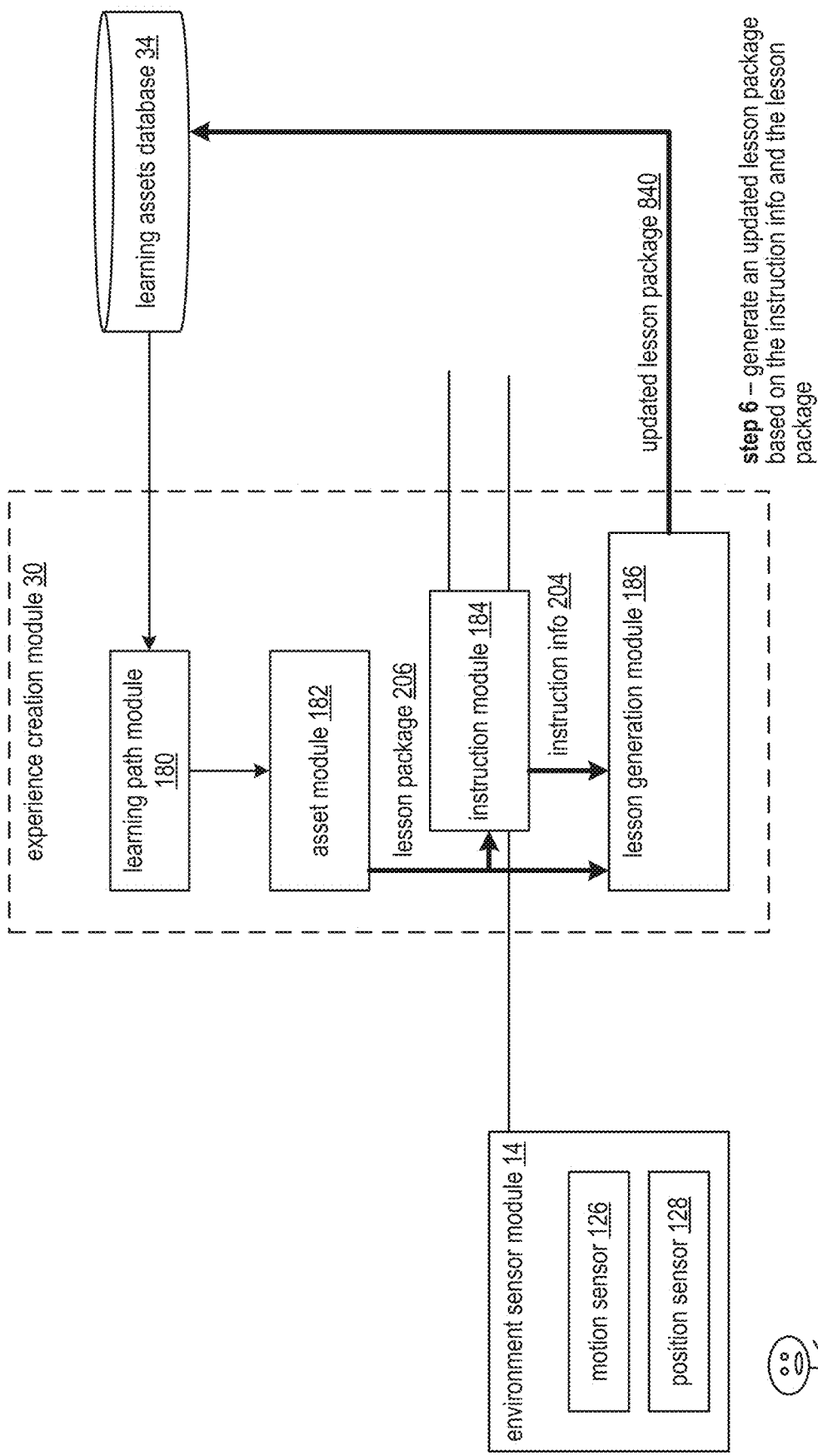

FIG. 11D further illustrates the method of operation to construct the lesson package where, having generated the instruction information 204, in a sixth step the experience creation module generates an updated lesson package. For example, the lesson generation module 186 generates an updated lesson package 840 for storage in the learning assets database 34 utilizing the instruction information 204.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 12A, 12B, 12C, 12D, 12E, 12F, and 12G are schematic block diagrams of an embodiment of a computing system illustrating examples of creating lesson asset information. The computing system includes the experience execution module 32 of FIG. 1, the learning assets database 34 of FIG. 1, and the environment sensor module 14 of FIG. 1. The experience execution module 32 includes an environment generation module 240, an instance experience module 290, and a learning assessment module 330. The environment sensor module 14 includes the motion sensor 126 of FIG. 4 and the position sensor 120 of FIG. 4.

Figure 12A:
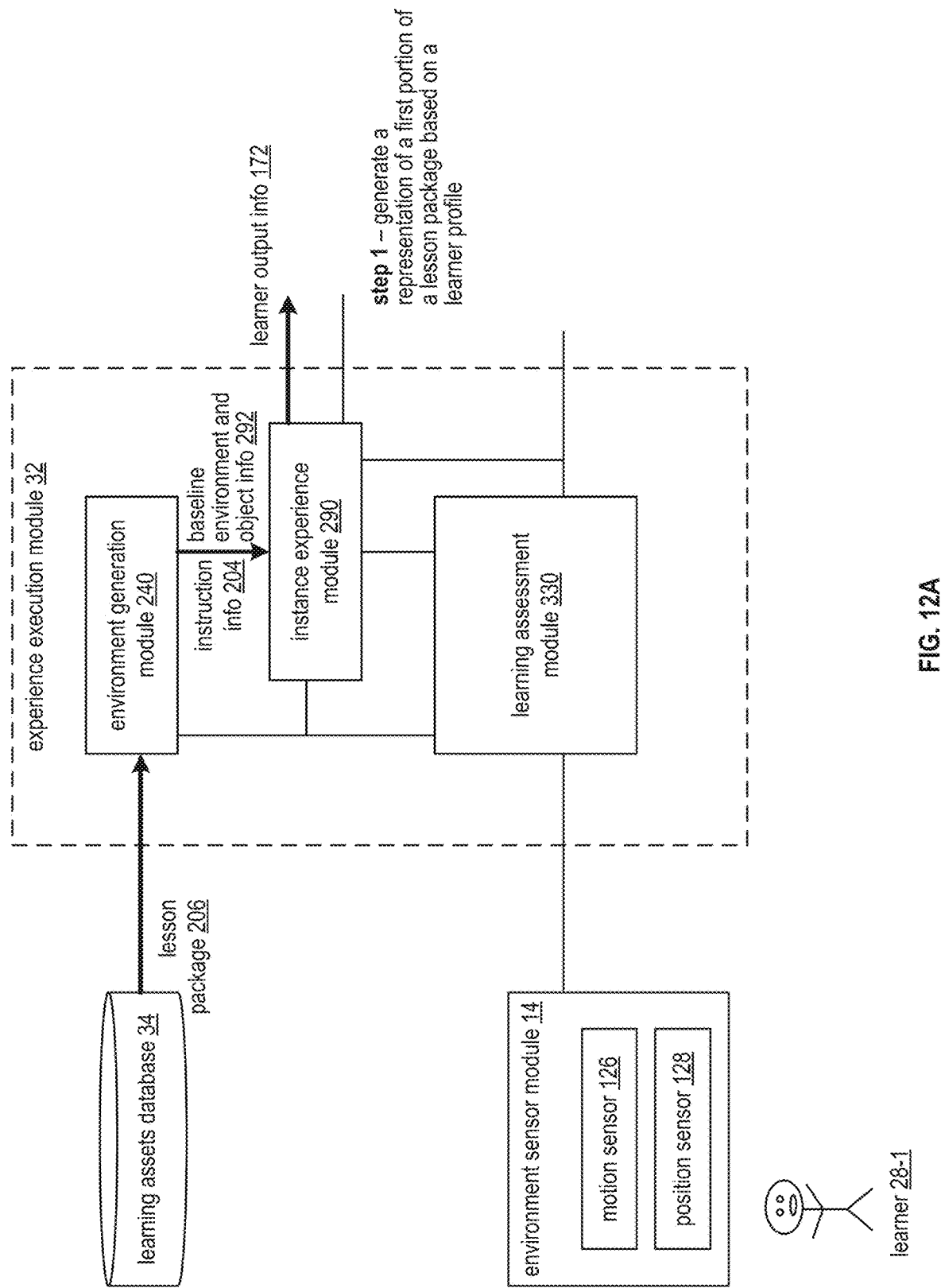

FIG. 12A illustrates a first example of operation of a method to create lesson asset information, where in a first step the experience execution module 32 generates a representation of a first portion of a lesson package based on a learner profile. The learner profile guides how portions of the lesson package are represented, including substituting alternative renderings for an object (e.g., to block, to simplify, to mislead, as an "Easter egg", to change color, to change scale, to reposition, to provide a different action).

In an example of generating the representation of the first portion of the lesson package, the environment generation module 240 generates instruction information 204 and baseline environment and object information 292 based on a lesson package 206 recovered from the learning assets database 34. The instruction information 204 includes a representation of instructor interactions with objects within the virtual environment and evaluation information. The baseline environment and object information 292 includes XYZ positioning information of each object within the environment for the lesson package 206.

The instance experience module 290 generates learner output information 172 for the first portion of the lesson package based on the learner profile, the instruction information 204 and the baseline environment and object information 292. The learner output information 172 includes a representation of a virtual place with objects, instructor interactions, and learner interactions from a perspective of the learner. The learner output information 172 further includes representations of the instruction information (e.g., instructor annotations).

The generating of the learner output information 172 based on the learner profile further includes utilizing one or more of a default setting for a view of one or more renderings (e.g., a perspective, a scale, a position, etc.), utilizing a previous setting, and in accordance with a security level and/or a permissions level etc. (e.g., blacking out or enabling viewing of an element of a rendering that is proprietary or associated with a high level of security access).

Figure 12B:
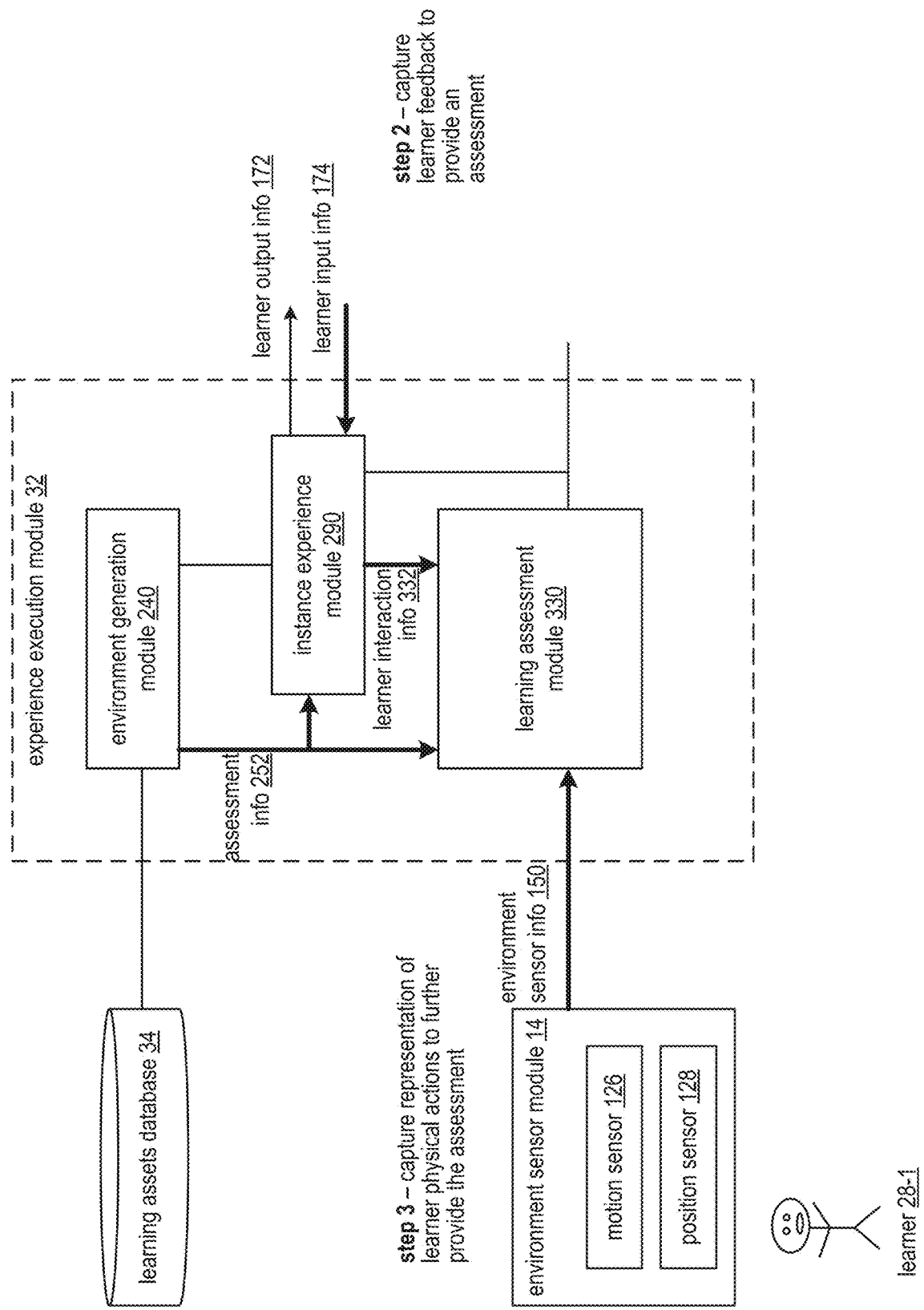

FIG. 12B further illustrates the example of operation the method to create lesson asset information where, having generated the representation of the first portion of the lesson package in accordance with the learner profile, in a second step the experience execution module 32 captures learner feedback to provide an assessment. For example, the instance experience module 290 generates learner interaction information 332 based on assessment information 252 and learner input information 174. The learner input information 174 includes session control information, answer object manipulation, and direct answer input (e.g., text, speech). The assessment information 252 includes an updated representation of the assessment information based on learner input information, functionality and/or time correlations of further learner input information to the further learner output information to produce correlated assessment learner input information (e.g., time stamped and manipulated answer information).

Having captured the learner feedback, in a third step the experience execution module 32 captures a representation of learner physical actions to further provide the assessment. For example, the learning assessment module 330 receives environment sensor information 150 from the environment sensor module 14 based on inputs from the learner 28-1 to the motion sensor 126 and the position sensor 128. For instance, the environment sensor module 14 generates the environment sensor information 150 based on detecting physical manipulation of real-world objects by the student (e.g., tool position, a bat position, a golf club position, etc.).

Figure 12C:
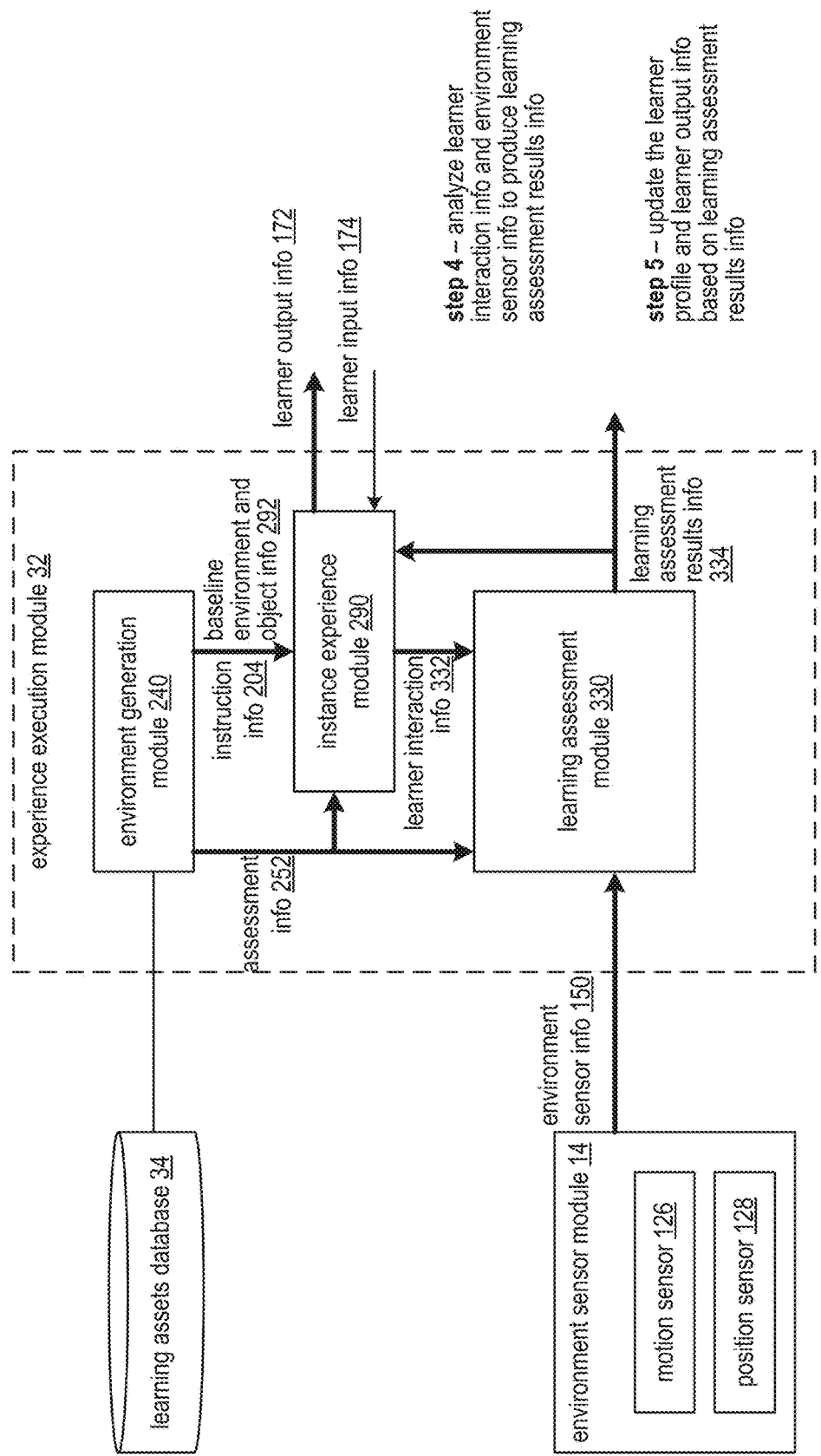

FIG. 12C further illustrates the example of operation of the method to create lesson asset information where, having captured representations of the learner physical actions, in a fourth step the experience execution module 32 analyzes learner interaction information 332 and environment sensor information 150 in light of assessment information 252 to produce learning assessment results information 334. For example, the learning assessment module 330 analyzes the environment sensor information 150 to interpret physical actions of the learner 28-1 and compares the physical actions to specifications of the assessment information 252 to produce the learning assessment results information 334.

The learning assessment results information 334 includes one or more of a learner identity, a learning object identifier, a lesson identifier, and raw learner interaction information (e.g., a timestamp recording of all learner interactions like points, speech, input text, settings, viewpoints, etc.). The learning assessment results information 334 further includes summarized learner interaction information (e.g., average, mins, maxes of raw interaction information, time spent looking at each view of a learning object, how fast answers are provided, number of wrong answers, number of right answers, etc.).

Having produced the learning assessment results information, in a fifth step the experience execution module 32 updates the learner profile and the learner output information 172 based on the learning assessment results information. For example, the instance experience module 290 determines to occlude viewing of a portion of the previous learner output information 172 when the learning assessment results information 334 indicates a disinterest by the learner 28-1 for that portion.

Figure 12D:
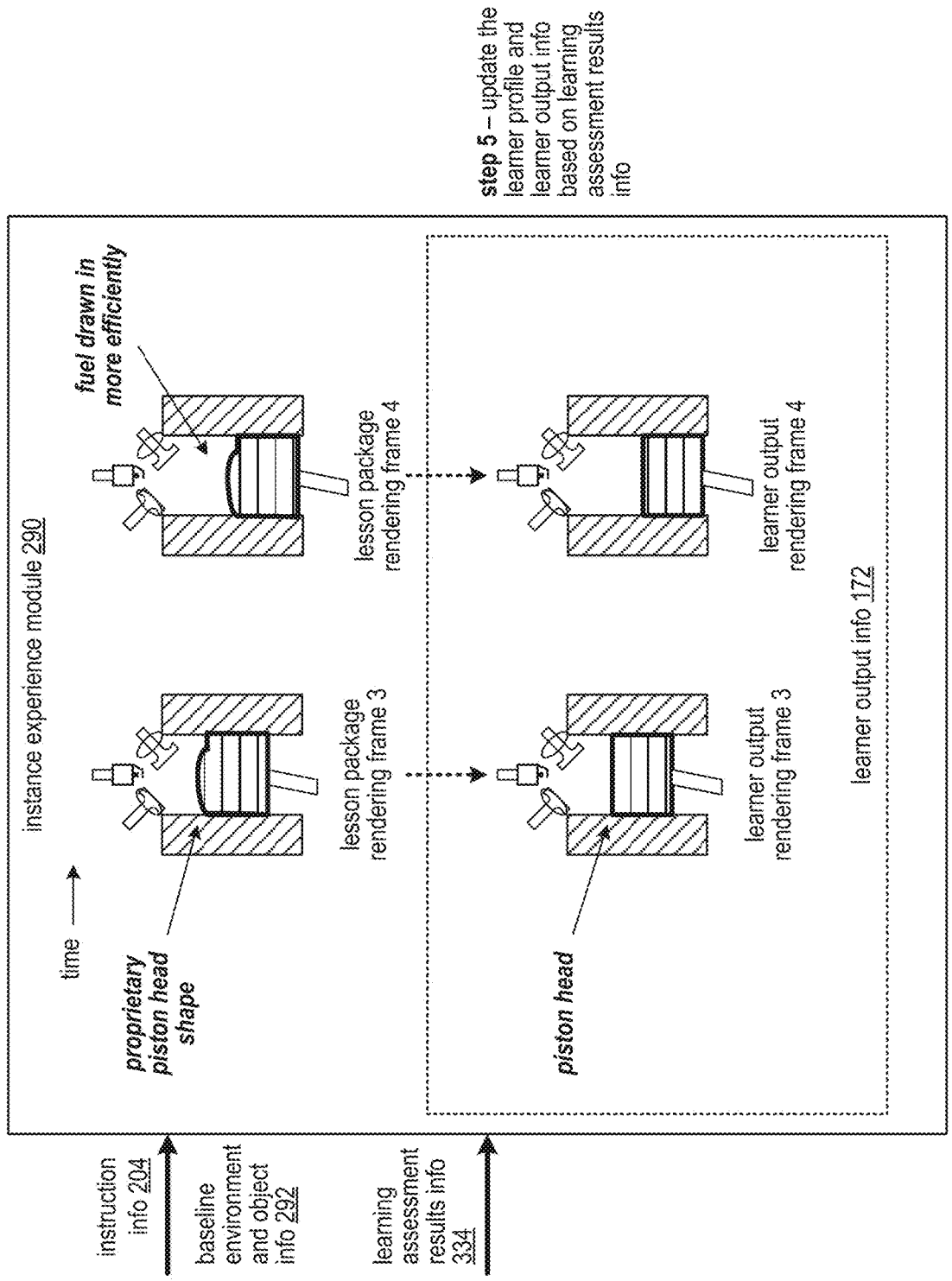

FIG. 12D further illustrates step 5 of the method to create lesson asset information where, the instance experience module 290 updates the learner profile and learner output information 172 based on the learning assessment results information 334. In an example of updating the learner output information 172, the instance experience module 290 determines that the learner is not associated with a sufficient security level to view a proprietary aspect of a rendering of an engine part based on the learner profile. In an instance, the lesson package rendering frame 3 is updated to remove the proprietary aspect and to change associated annotation (e.g., from "proprietary piston head shape" to "piston head") to produce a learner output rendering frame 3. In a similar fashion, the lesson package rendering frame 4 is updated to produce the learner output rendering frame 4 to suppress proprietary aspects.

In another example, the learner output rendering is updated to include a more complicated representation of and associated lesson package rendering frame when the learner profile indicates that a security level associated with the learner is above a minimum threshold level.

Figure 12E:
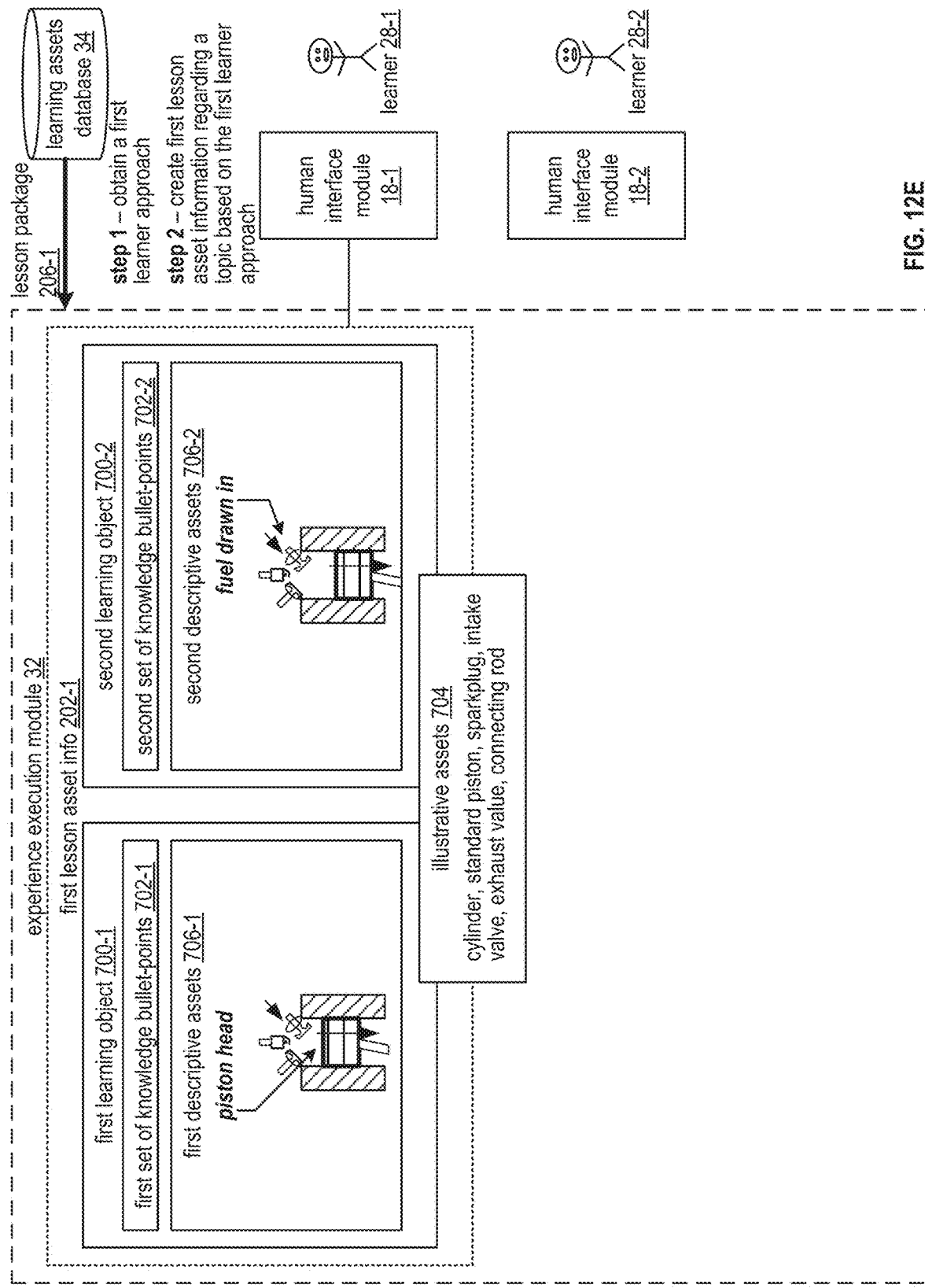
Figure 12F:
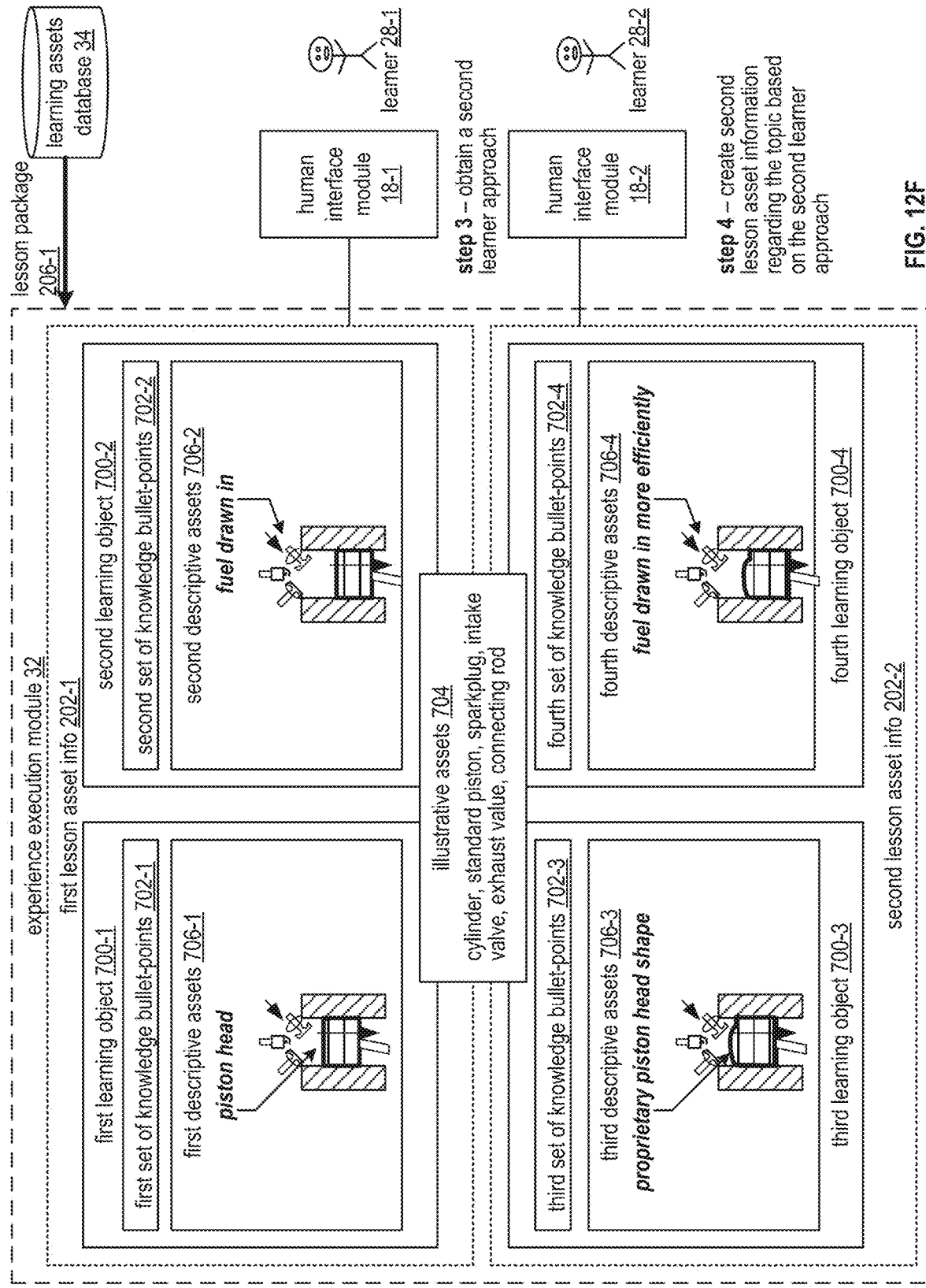
Figure 12G:
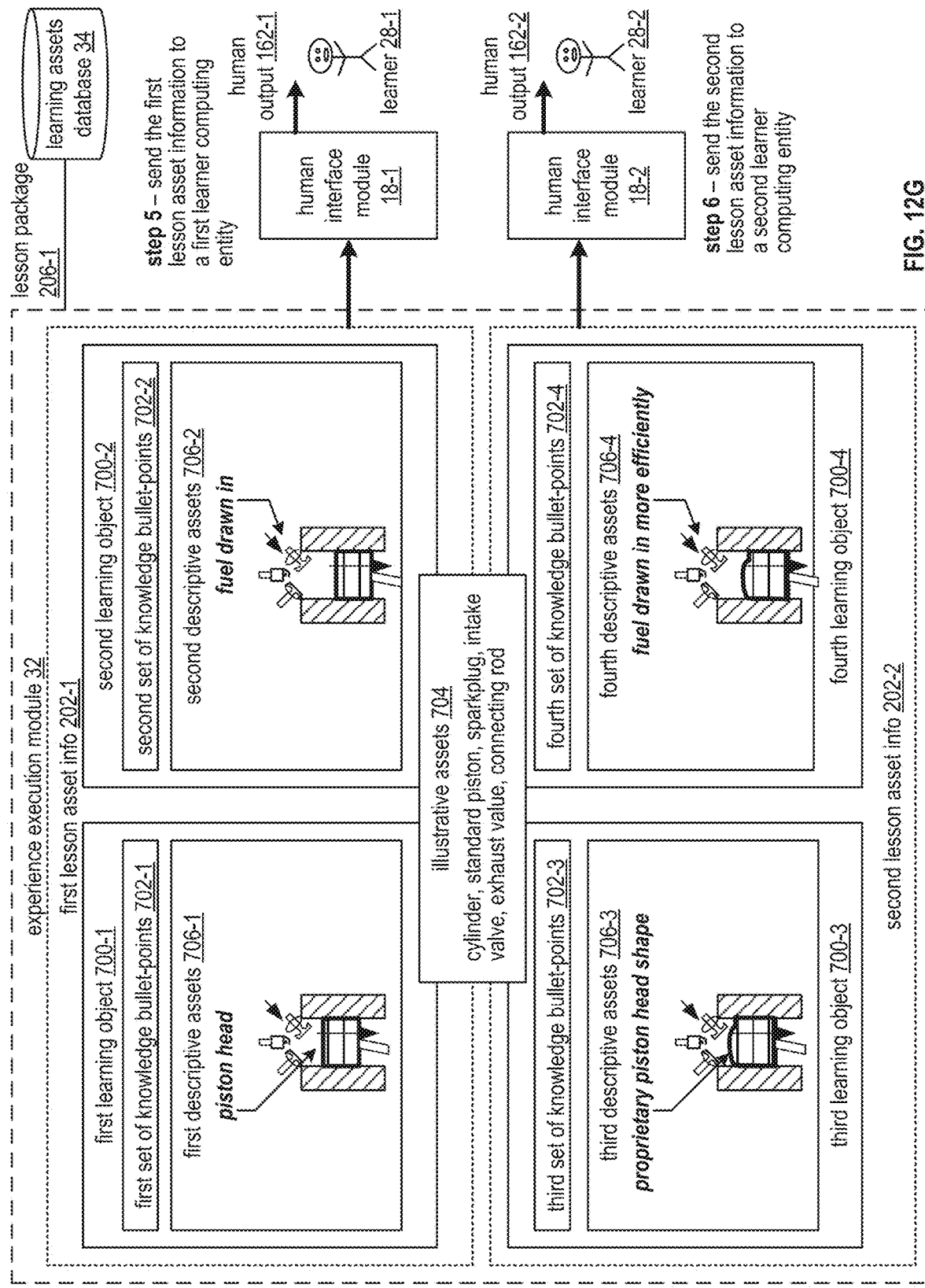

FIGS. 12E-12G are schematic block diagrams of the embodiment of the computing system illustrating examples of creating lesson asset information. The computing system further includes human interface modules 18-1 and 18-2 and illustrates a second example of operation of the method to create the lesson asset information. The human interface modules 18-1 and 18-2 are implemented utilizing the human interface module 18 of FIG. 1.

FIG. 12E illustrates a first step of the second example of operation of the method to create lesson asset information, where the experience execution module 32 obtains a first learner approach associated with a first learner 28-1 of a set of learners (e.g., 28-1 and 28-2). The first learner approach is associated with what knowledge and how to portray the knowledge to the first learner. The approach constrains access to knowledge when the knowledge requires a particular authorization/security level. The approach provides access to knowledge when the learner has sufficient authorization. The approach enhances access to knowledge when the learner is equipped to learn more. The approach curtails access to knowledge when the learner is less equipped to learn.

The obtaining the first learner approach associated with the first learner includes a variety of alternatives. A first alternative includes the first learner approach to exclude utilization of a constrained knowledge bullet-point from inclusion in the first set of knowledge bullet-points and the second set of knowledge bullet-points points. For example, the experience execution module 32 excludes utilization of a bullet point that references a proprietary piston head of an engine. A second alternative includes establishing the first learner approach to modify the constrained knowledge bullet-point to produce a modified knowledge bullet-point for inclusion in at least one of the first set of knowledge bullet-points and the second set of knowledge bullet-points. For example, the experience execution module 32 modifies the bullet point associated with the proprietary piston head to that of a standard piston head.

A third alternative includes establishing the first learner approach to include utilization of a first expansion knowledge bullet-point in the first set of knowledge bullet-points for an expansion first piece of information associated with the first piece of information regarding the topic. For example, the experience execution module 32 utilizes a first expansion knowledge bullet-point associated with a particular alloy of the piston head for the expansion first piece of information associated with composition of parts of the engine.

A fourth alternative includes establishing the first learner approach to include utilization of a second expansion knowledge bullet-point in the second set of knowledge bullet-points for an expansion second piece of information associated with the second piece of information regarding the topic. For example, the experience execution module 32 utilizes a second expansion knowledge bullet-point associated with velocity of fuel being drawn into the cylinder.

A fifth alternative includes establishing the first learner approach to exclude utilization of a constrained asset as an illustrative asset 704. For example, experience execution module 32 excludes utilization of a rendering of an asset associated with the cylinder head of the engine when the cylinder head is a proprietary design and the first learner is not associated with access to the proprietary design.

A sixth alternative includes establishing the first learner approach to modify the constrained asset to produce a modified asset for inclusion as the illustrative asset 704. For example, the experience execution module 32 modifies the rendering of the proprietary cylinder head to that of the standard cylinder head for inclusion as the illustrative asset 704.

Having obtained the first learner approach, in a second step of the second example method of operation of creating lesson asset information, the experience execution module 32 creates first lesson asset information 202-1 regarding the topic for the first learner based on the first learner approach associated with the first learner. The first lesson asset information 202-1 includes a first learning object 700-1 and a second learning object 700-2. The first learning object 700-1 includes a first set of knowledge bullet-points 702-1 for a first piece of information regarding the topic (e.g., piston movement to draw in an air/fuel mixture through the intake valve into the cylinder). The second learning object 700-2 includes a second set of knowledge bullet-points 702-2 for a second piece of information regarding the topic (e.g., further movement of the piston to draw further air/fuel mixture in through the intake valve further into the cylinder).

The first learning object 700-1 and the second learning object 700-2 further includes the illustrative asset 704 that depicts an aspect regarding the topic pertaining to the first and second pieces of information. For example, representations of assets of the engine to demonstrate engine operation including a cylinder, a standard piston, a spark plug, and intake valve, and exhaust valve, and a connecting rod.

The first learning object 700-1 further includes one or more first descriptive assets 706-1 regarding the first piece of information based on the first set of knowledge bullet-points 702-1 and the illustrative asset 704. For example, rendering representations of assets of the engine to demonstrate the operation during an intake cycle. The second learning object 700-2 further includes one or more second descriptive assets 706-2 regarding the second piece of information based on the second set of knowledge bullet-points 702-2 and the illustrative asset 704. For example, further rendering representations of the assets of the engine demonstrating the operation during later stages of the intake cycle.

The creating the first lesson asset information 202-1 regarding the topic for the first learner based on the first learner approach associated with the first learner includes a series of sub-steps. Any of the sub-steps may include extracting information from lesson package 206-1 retrieved from the learning assets database 34. A first sub-step includes obtaining the illustrative asset 704 based on the first learner approach. For example, the experience execution module 32 generates a rendering of a standard piston head when the first learner approach curtails access to the proprietary nature of the piston head.

A second sub-step includes obtaining the first set of knowledge bullet-points 702-1 for the first piece of information regarding the topic based on the first learner approach. For example, the experience execution module 32 modifies a bullet point of the proprietary piston head to that of the standard piston head.

A third sub-step includes generating the first descriptive assets 706-1 regarding the first piece of information based on the first set of knowledge bullet-points 702-1 and the illustrative asset 704. For example, the experience execution module 32 renders representations of the standard piston head within the cylinder.

A fourth sub-step includes obtaining the second set of knowledge bullet-points for the second piece of information regarding the topic based on the first learner approach. For example, the experience execution module 32 modifies a bullet point associated with fuel drawn in more efficiently for the proprietary cylinder head to that of just fuel being drawn in for the standard piston head.

A fifth sub-step includes generating the second descriptive assets 706-2 regarding the second piece of information based on the second set of knowledge bullet-points 702-2 and the illustrative asset 704. For example, the experience execution module 32 represents representations of the standard piston head drawing fuel in within the cylinder. A sixth sub-step includes generating the first lesson asset information 202-1 to include the first descriptive assets 706-1 and the second descriptive assets 706-2.

FIG. 12F illustrates a third step of the second example of operation of the method to create lesson asset information, where, having created the first lesson asset information 202-1, the experience execution module 32 obtains, as previously discussed for the first learner, a second learner approach associated with the second learner 28-2 of the set of learners. For example, the second learner approach is obtained such that the second learner 28-2 has full access to knowledge associated with the proprietary cylinder head and its ability to more efficiently draw fuel into the cylinder.

Having obtained the second learner approach, a fourth step of the method of operation of the second example of creating lesson asset information includes the experience execution module 32 creating second lesson asset information 202-2 regarding the topic for the second learner based on the second learner approach associated with the second learner. The second learner approach is different than the first learner approach in the example.

The second lesson asset information 202-2 includes a third learning object 700-3 and a fourth learning object 700-4. The third learning object 700-3 includes a third set of knowledge bullet-points 702-3 for the first piece of information regarding the topic. The fourth learning object 700-4 includes a fourth set of knowledge bullet-points 702-4 for the second piece of information regarding the topic.

Third learning object 700-3 and the fourth learning object 700-4 further includes the illustrative asset 704. The third learning object 700-3 further includes at least one third descriptive asset 706-3 regarding the first piece of information based on the third set of knowledge bullet-points 702-3 and the illustrative asset 704. For example, the experience execution module 32 provides a rendering of the proprietary piston head shape.

The fourth learning object 700-4 further includes at least one fourth descriptive asset 706-4 regarding the second piece of information based on the fourth set of knowledge bullet-points 702-4 and the illustrative asset 704. For example, the experience execution module 32 provides the rendering of the proprietary piston head shape and a note to indicate that fuel is drawn and more efficiently when the second learner 28-2 is authorized to gain knowledge associated with the proprietary piston head.

FIG. 12G illustrates a fifth step of the second example of operation of the method to create lesson asset information, where, having created the second lesson asset information, the experience execution module 32 sends the first lesson asset information 202-1 to a first learner computing entity associated with the first learner. For example, the experience execution module 32 outputs a representation (e.g., a series of renderings as a video) of the first descriptive assets 706-1 and the second descriptive assets 706-2 of the first lesson asset information 202-1 to the human interface module 18-1. The human interface module 18-1 interprets the first lesson asset information 202-1 to generate human output 162-1 for the learner 28-1 (e.g., three-dimensional representation).

Having output the first lesson asset information 202-1 to the first learner, a sixth step of the second example of operation of the method to create lesson asset information includes the experience execution module 32 sending the second lesson asset information 202-2 to a second learner computing entity associated with the second learner. For example, the experience execution module 32 outputs a representation (e.g., a series of renderings as a video) of the third descriptive assets 706-3 and the fourth descriptive assets 706-4 of the second lesson asset information 202-2 to the human interface module 18-2. The human interface module 18-2 interprets the second lesson asset information 202-2 to generate human output 162-2 for the learner 28-2 (e.g., three-dimensional representation).

The methods described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 13A, 13B, 13C, and 13D are schematic block diagrams of an embodiment of a computing system illustrating an example of updating a lesson package. The computing system includes the experience creation module 30 of FIG. 1, the experience execution module 32 of FIG. 1, and the learning assets database 34 of FIG. 1.

Figure 13A:
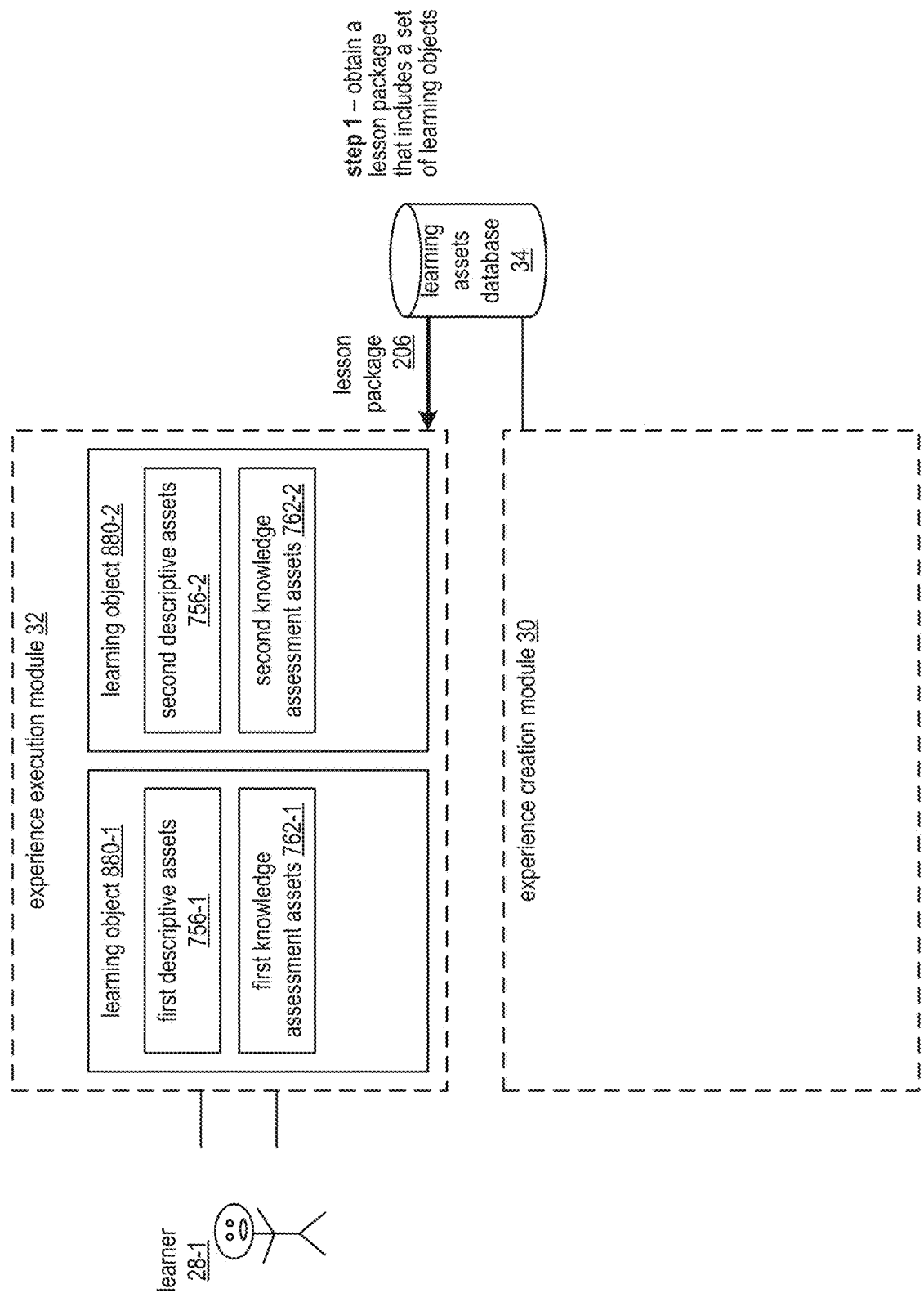

FIG. 13A illustrates an example of a method of operation to update the lesson package where, in a first step the experience creation module 30 obtains a lesson package that includes a set of learning objects. In a first example, the experience creation module 30 generates one or more of the learning objects of the set of learning objects. In a second example, the experience execution module 32 extracts the set of learning objects from a lesson package 206 recovered from the learning assets database 34. For instance, the experience execution module 32 extracts learning objects 880-1 through 880-2 from the lesson package 206. The learning object 880-1 includes first descriptive asset 756-1 and first knowledge assessment assets 762-1. A Learning path for the learner 28-1 includes execution of the learning object 880-1 followed by the execution of learning object 880-2.

Figure 13B:
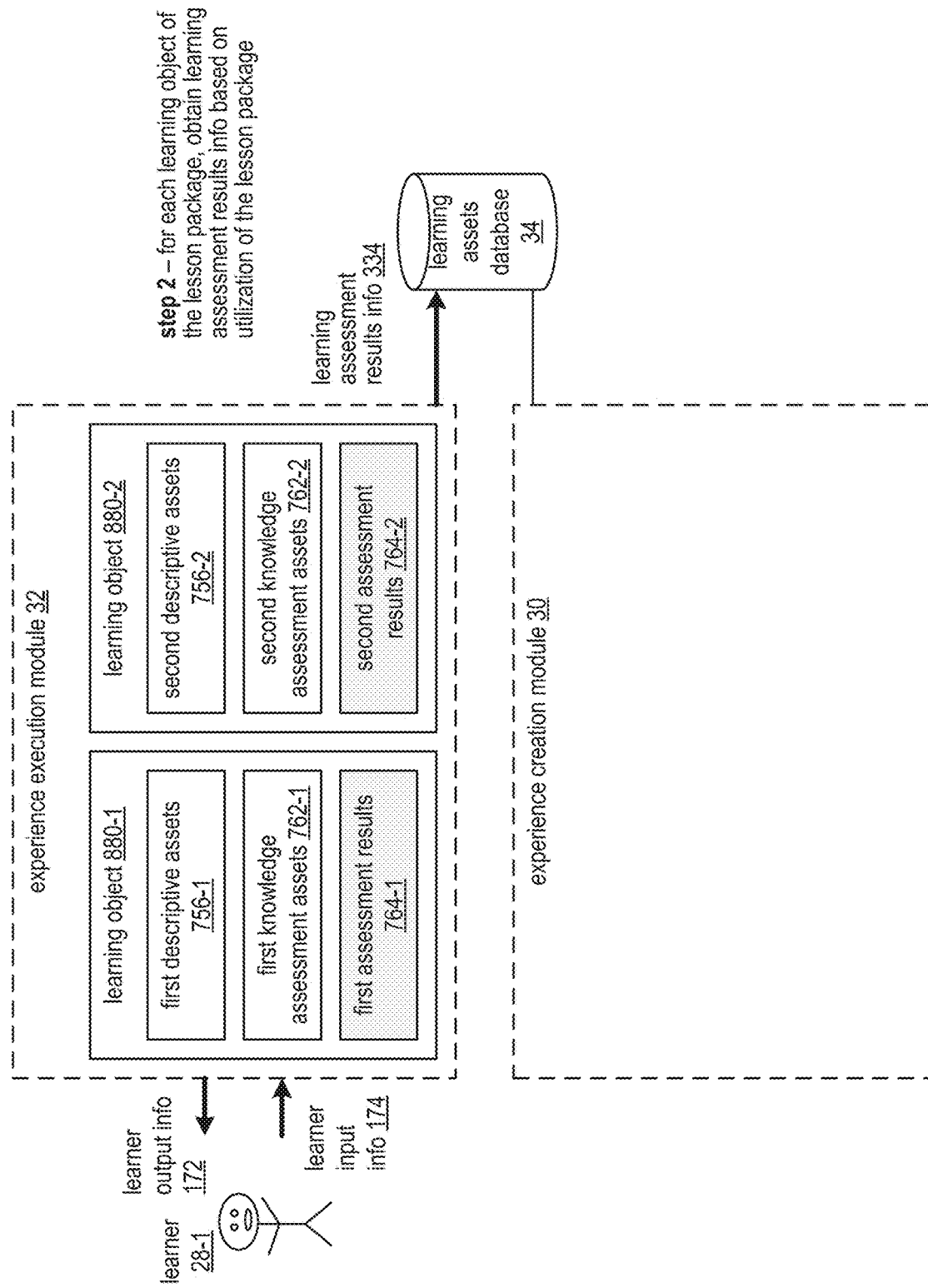

FIG. 13B further illustrates the example of the method of operation to update the lesson package where, having obtained the lesson package 206, a second step includes the experience execution module 32, for each learning object of the lesson package, obtaining learning assessment results information based on utilization of the lesson package. For example, the experience execution module 32 issues learner output information 172 to the learner 28-1 in accordance with the first descriptive asset 756-1 of the learning object 880-1 and receives learner input information 174 from the learner 28-1 in response. The experience execution module 32 evaluates the learner input information 174 in accordance with the first knowledge assessment assets 762-1 to produce first assessment results 764-1. In a similar fashion, the experience execution module 32 produces second assessment results 764-2 of the learning object 880-2. The experience execution module 32 facilitates storage of the assessment results in the learning assets database 34.

FIG. 13C further illustrates the example of the method of operation to update the lesson package where, having produced the learning assessment results, a third step includes, for each learning object of the lesson package, the experience creation module 30 identifying enhancements to the descriptive assets and/or their use to produce updated descriptive assets of an updated lesson package based on the corresponding learning assessment results information. For example, the experience creation module 30 recovers learning assessment results information 334 and the lesson package 206 from the learning assets database 34. The enhancements includes one or more of creating a new illustrative asset, modifying a descriptive asset, and reordering learning object execution in accordance with an update to the learning path.

As a specific example to the identification of the enhancements, the experience creation module 30 determines an update to the learning object when wrong answers related to the learning object occur more often than a maximum incorrect answer threshold level. The update to the learning object includes one or more of a new version, different view, taking more time on a particular object, etc. As another specific example to the identification of the enhancements, the experience creation module 30 determines the update to the object when correct answers related to the learning object occur more often than a maximum correct answer threshold level.

In an instance of the updating, the experience creation module 30 identifies the enhancements for the second descriptive asset 756-2 to produce updated second descriptive assets 766-2 when too many incorrect answers are detected. The updated second descriptive asset 766-2 addresses a more effective conveyance of desired knowledge to impart with the learner 28-1 and/or another learner.

Figure 13D:
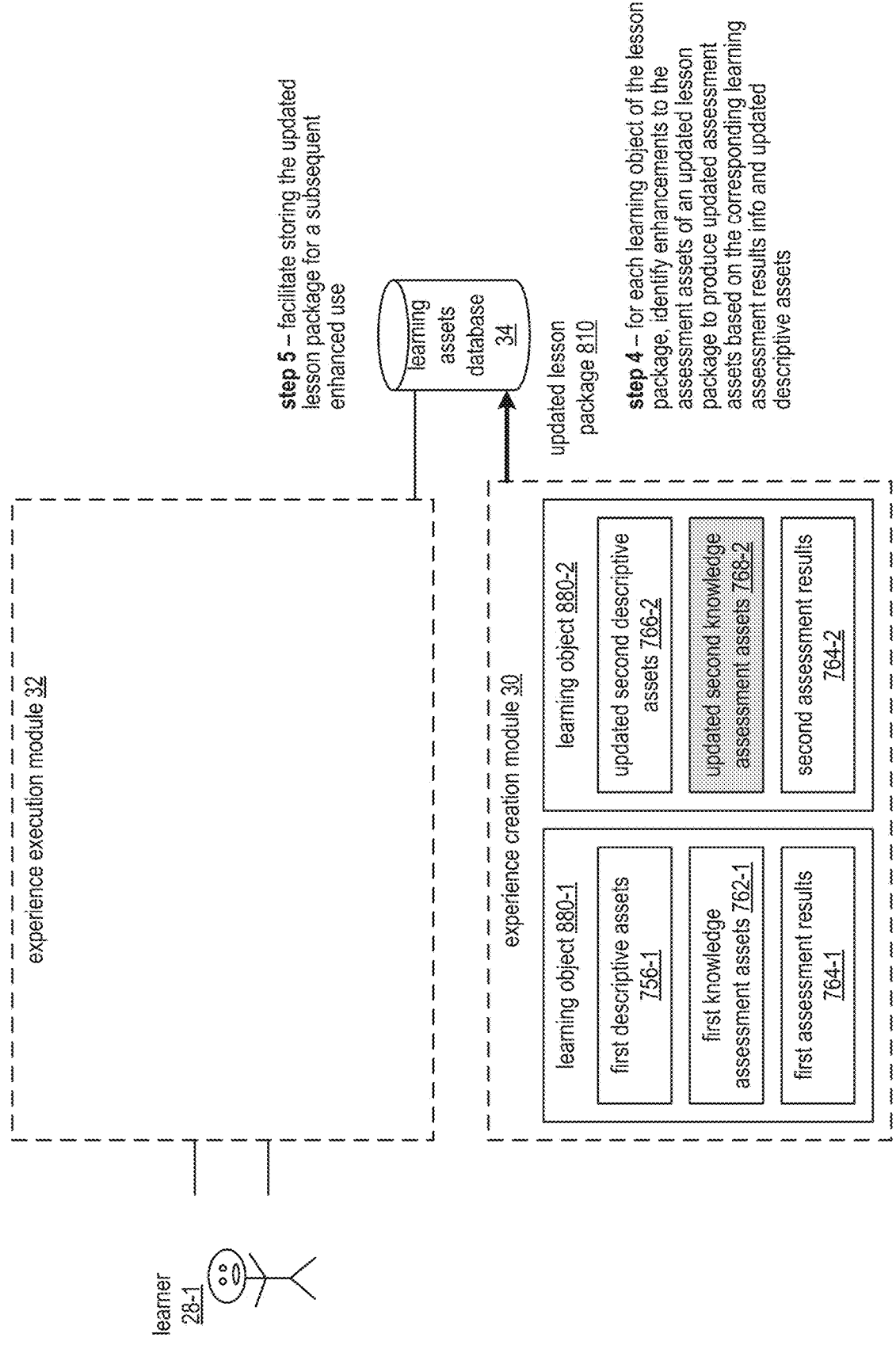

FIG. 13D further illustrates the example of the method of operation to update the lesson package where, having the identified enhancements to the descriptive assets, a fourth step includes, for each learning object of the lesson package, the experience creation module 30 identifying enhancements to the assessment assets of an updated lesson package to produce updated assessment assets based on the corresponding learning assessment results information and updated descriptive assets. For example, the experience creation module 30. The enhancements includes one or more of forming a new question, breaking down a previous question into one or more step-wise questions, providing a different view, taking more time on an object, etc.

As a specific example to the identification of the enhancements to the assessment assets, the experience creation module 30 determines an update to the assessment assets when wrong answers related to the learning object occur more often than the maximum incorrect answer threshold level. The update to the assessment assets includes one or more of a adding a new question, breaking down a previous question into more step-wise questions, providing a different view, taking more time on a particular object, etc. As another specific example to the identification of the enhancements, the experience creation module 30 determines the update to the assessment assets when correct answers related to the learning object occur more often than the maximum correct answer threshold level. The update to the assessment assets includes one or more of adding new more difficult questions, consolidating step-wise questions, providing a different view, and taking less time on a particular object.

In an instance of the updating, the experience creation module 30 identifies the enhancements for the second knowledge assessment assets 762-2 to produce updated second knowledge assessment assets 768-2 when too many incorrect answers are detected. The updated second knowledge assessment assets 768-2 addresses a more effective assessment knowledge retention with the learner 28-1 and/or another learner.

Having identified the enhancements to the assessment assets, a fifth step of the example method includes facilitating storing the updated lesson package for a subsequent enhanced use. For example, the experience creation module 30 generates updated lesson package 810 utilizing the set of learning objects with various updated descriptive assets and knowledge assessment assets and sends the updated lesson package 810 two the learning assets database 34 for storage.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 14A, 14B, 14C, and 14D are schematic block diagrams of an embodiment of a computing system illustrating an example of selecting lesson asset information for a topic. The computing system includes the experience execution module 32 of FIG. 1 and the learning assets database 34 of FIG. 1.

Figure 14A:
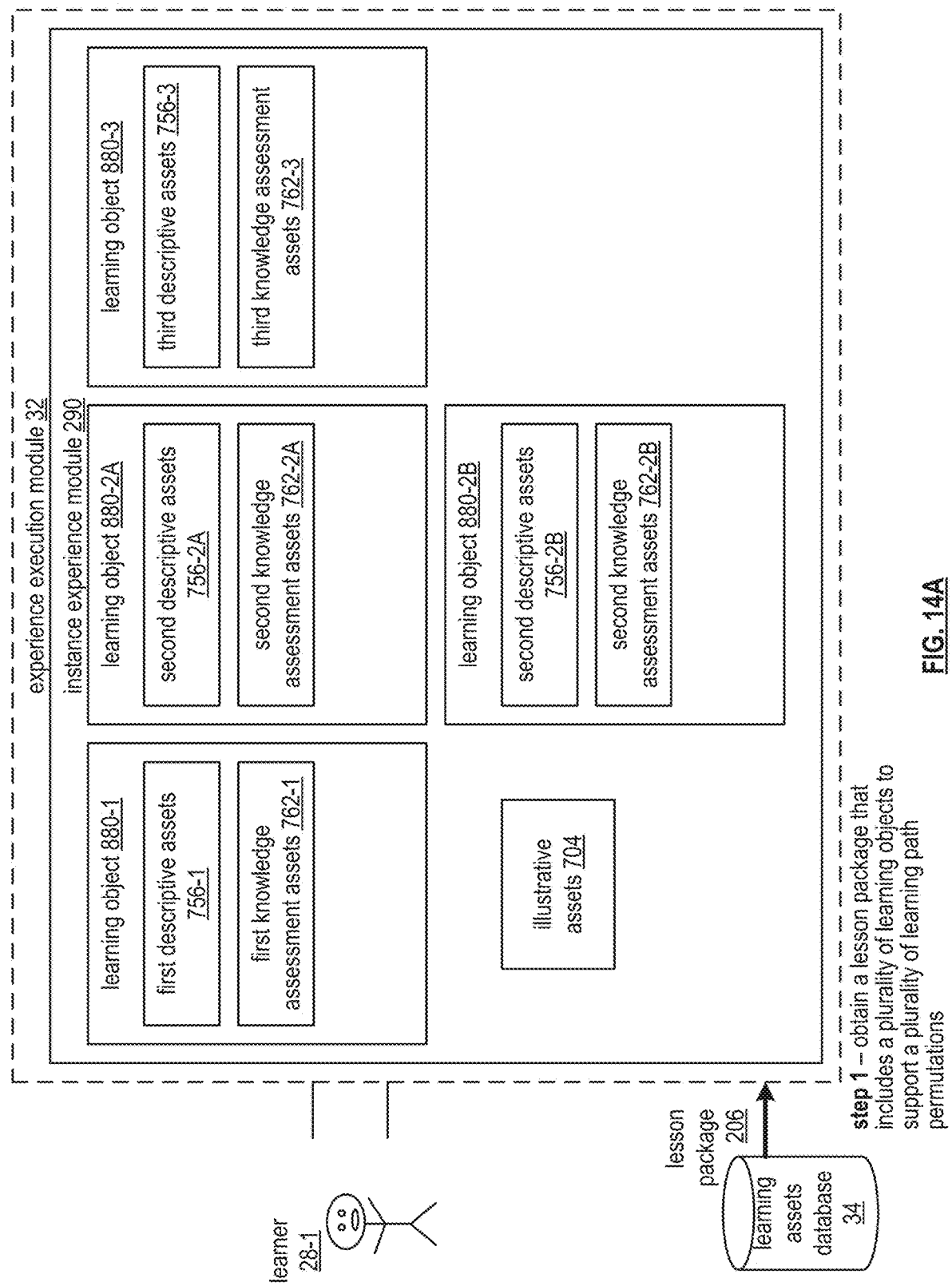

FIG. 14A illustrates an example of a method of operation for selecting lesson asset information where, in a first step the experience execution module 32 obtains a lesson package that includes a plurality of learning objects corresponding to permutations of learning paths for the topic. The permutations of learning paths corresponds to alternative branches of learning paths during execution of delivering of the learning package. A benefit is provided where, during the execution, a preferred alternative branch is utilized to provide a better experience for the learner 28-1.

As an example of the selecting lesson asset information, the experience execution module 32 extracts the plurality of learning objects from a lesson package 206 recovered from the learning assets database 34. For instance, the experience execution module 32 extracts learning objects 880-1, 880-2A, 880-2B, and 880-3 from the lesson package 206. In an embodiment, the learning objects are organized as sets of learning objects. For example, a first set of learning objects includes the learning object 880-1, a second set of learning objects includes the learning objects 880-2A and 880-2B, and a third set of learning objects includes the learning object 880-3.

The first learning object 880-1 includes a first set of knowledge bullet-points for a first piece of information regarding the topic. The second learning objects includes learning object 880-2A and 880-2B, where each includes a second set of knowledge bullet-points for a second piece of information regarding the topic. The third learning object 880-3 includes a third set of knowledge bullet-points for a third piece of information regarding the topic.

The first learning object 880-1, the second learning objects 880-2A and 880-2B, and the third learning object 880-3 further include one or more illustrative assets 704 that depicts an aspect regarding the topic pertaining to the first, the second, and the third pieces of information. The first learning object further includes one or more first descriptive assets 756-1 regarding the first piece of information based on the first set of knowledge bullet-points and the illustrative asset 704. The second learning objects further includes one or more second descriptive assets 756-2A and 756-2B regarding the second piece of information based on the second set of knowledge bullet-points and the illustrative asset 704. The third learning object further includes one or more third descriptive assets 756-3 regarding the third piece of information based on the third set of knowledge bullet-points and the illustrative asset 704.

In an embodiment, all of the learning objects share common illustrative assets. An embodiment of a particular permutation of learning paths for the learner 28-1 includes execution of the learning object 880-1 followed by the execution of one of learning object 880-2A and 880-2B followed by the execution of learning object 880-3.

Figure 14B:
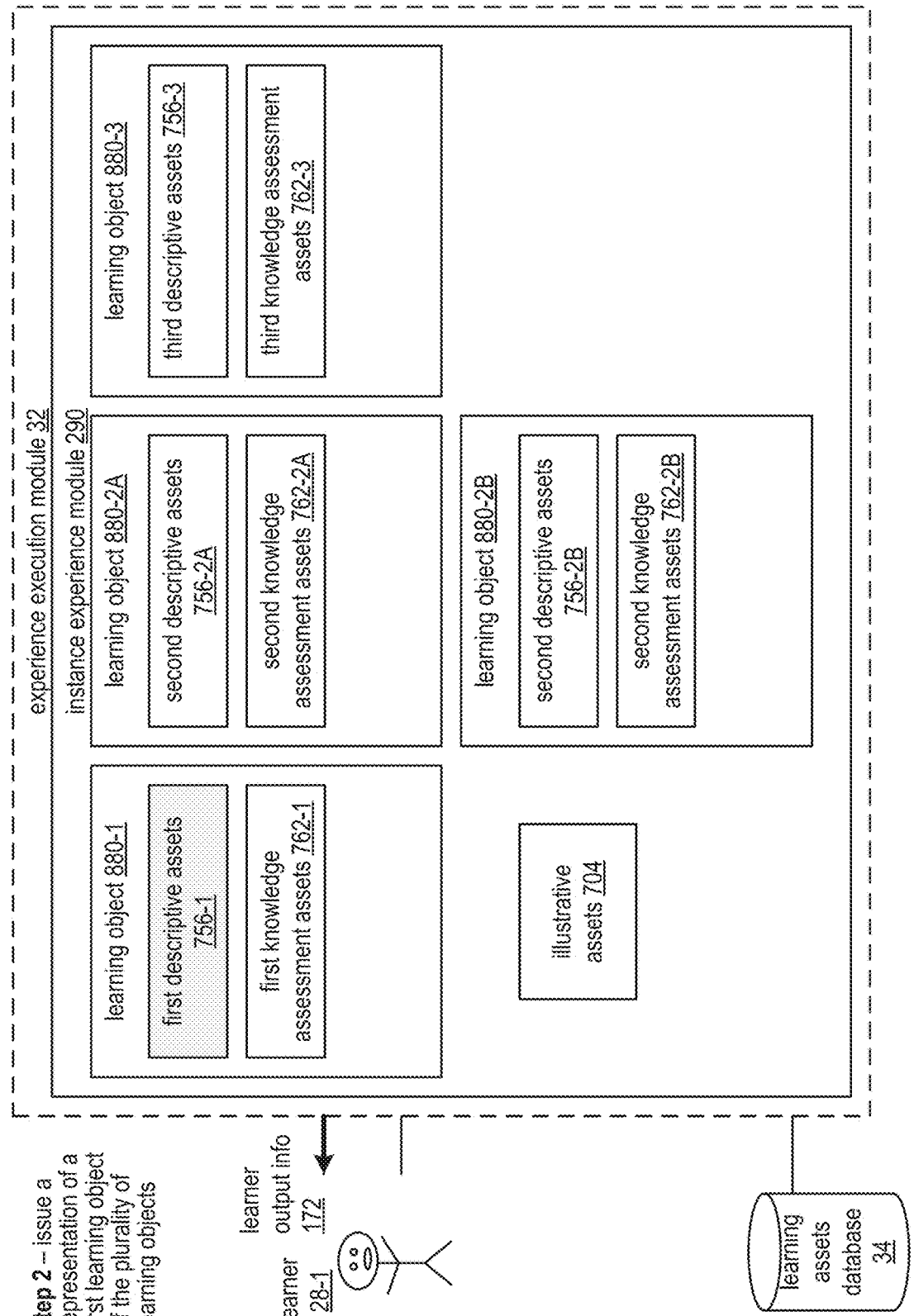

FIG. 14B further illustrates the example of the method of operation for the selecting lesson asset information where, having obtained the lesson package, in a second step the experience execution module 32 issues a representation of the first learning object. For example, the instance experience module 290 generates the first descriptive assets 756-1 for the first learning object 880-1 utilizing the first set of knowledge bullet-points and the illustrative asset 704 as previously discussed.

Having generated the first descriptive assets for the first learning object, the instance experience module 290 generates a representation of the first descriptive assets 756-1. For instance, the instance experience module 290 renders a three-dimensional representation of the first descriptive asset 756-1. Having produced the representation, the instance experience module 290 outputs the representation of the first descriptive asset 756-1 to a second computing entity. For instance, the instance experience module 290 issues learner output information 172 to the second computing entity, where the second computing entity is associated with the learner 28-1 and the learner output information 172 includes the representation.

Figure 14C:
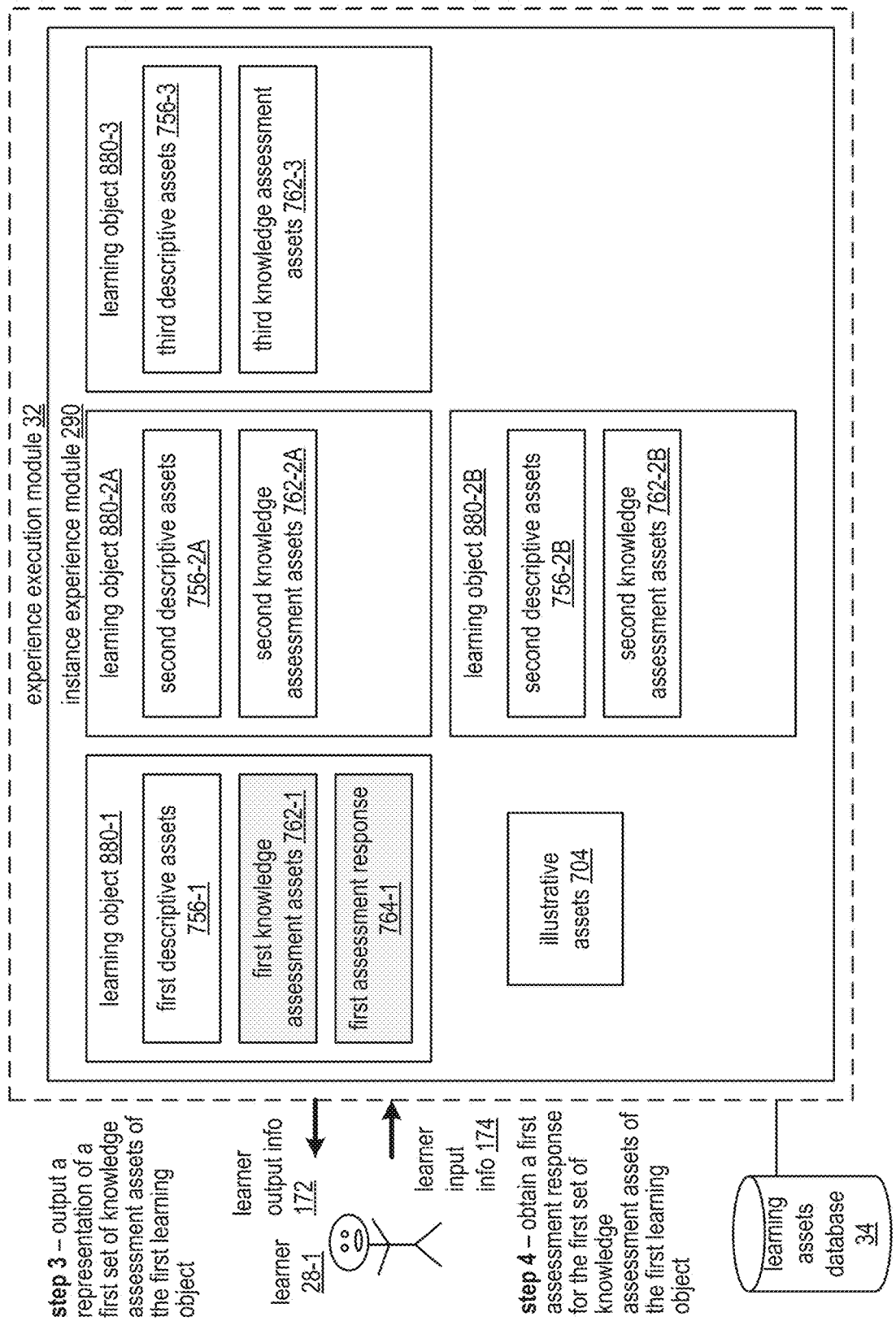

FIG. 14C further illustrates the example of the method of operation for the selecting lesson asset information where, having issued the representation of the first descriptive asset 756-1, in a third step the experience execution module 32 outputs a representation of a first set of knowledge assessment assets to the second computing entity. For instance, the instance experience module 290 derives a first set of knowledge test-points for the first learning object regarding the topic based on the first set of knowledge bullet-points. Having produced the first set of knowledge test-points, the instance experience module 290 generates the first knowledge assessment asset 762-1 as the first set of knowledge assessment assets utilizing the first set of knowledge test-points, the illustrative asset 704, and the first descriptive asset 756-1 of the first learning object 880-1.

Having generated the first set of knowledge assessment assets, the instance experience module 290 generates the representation of the first set of knowledge assessment assets. For instance, the instance experience module 290 renders a three-dimensional representation of the first set of knowledge assessment assets to produce the representation. Having produced the representation of the first set of knowledge assessment assets, the instance experience module sends the representation of the first set of knowledge assessment assets to the second computing entity. For instance, the instance experience module sends learner output information 172 to the second computing entity associated with the learner 28-1, where the learner output information 172 includes the representation of the first knowledge assessment assets 762-1.

Having output the representation of the first set of knowledge assessment assets, in a fourth step the experience execution module 32 obtains a first assessment response 764-1 for the first set of knowledge assessment assets. For example, the instance experience module 290 receives the first assessment response from the second computing entity in response to the representation of the first set of knowledge assessment assets. For instance, the instance experience module 290 interprets learner input information 174 received from the second computing entity associated with the learner 28-1 to produce the first assessment response 764-1.

Figure 14D:
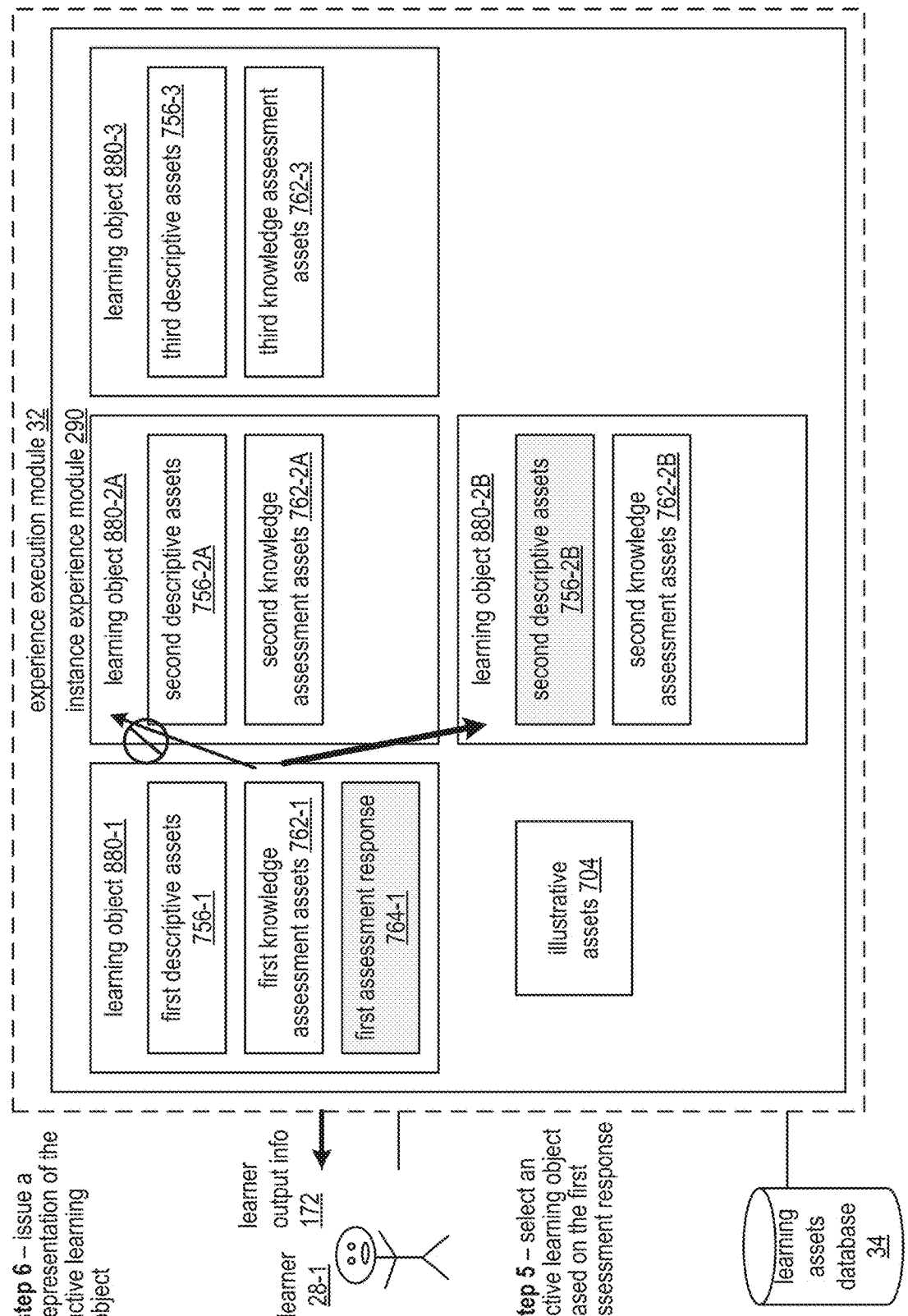

FIG. 14D further illustrates the example of the method of operation for the selecting lesson asset information where, having obtained the first assessment response 764-1, the experience execution module 32 selects one of the first learning object, the second learning object, and the third learning object as an active learning object (e.g., next learning object to represent to the learner 28-1) based on the first assessment response 764-1. The selecting the one of the first learning object, the second learning object, and the third learning object as the active learning object includes a series of sub-steps. A first sub-step includes evaluating the first assessment response 764-1 to produce a first assessment response evaluation. For instance, the instance experience module 290 evaluates answers of the first assessment response 764-1 against correct answers to produce a score as the first assessment response evaluation (e.g., numerical score as a percentage of correct answers, pass/fail indicator for a score above or below a desired minimum threshold level, etc.).

A second sub-step includes interpreting the first assessment response evaluation in accordance with a learning object selection approach to produce an active learning object requirement. Learning object selection approaches includes repeating a learning object when the first assessment response evaluation indicates an unacceptable score, moving to a next default learning object when the first assessment response evaluation indicates a score within an acceptable range, and skipping ahead to another learning object (e.g., more difficult) when the first assessment response evaluation indicates a score above a high threshold level. Active learning object requirements includes re-learning a present learning object, learning the next default learning object, and learning the other learning object (e.g., more advanced material).

A third sub-step of the selecting of the active learning object includes indicating which one of the first learning object, the second learning object, and the third learning object fulfills the active learning object requirement. For example, the instance experience module 290 indicates that the first learning object 880-1 is the active learning object when the active learning object requirement includes the re-learning of the first learning object. As another example, the instance experience module 290 indicates that the second learning object 880-2A is the active learning object when the active learning object requirement includes moving slowly ahead in accordance with a default learning plan. As yet another example, the instance experience module 290 indicates that the second learning object 880-2B is the active learning object when the active learning object requirement includes moving normally ahead in accordance with the default learning plan. As a still further example, the instance experience module 290 indicates that the third learning object 880-3 is the active learning object when the active learning object requirement includes skipping ahead to more advanced material.

Having selected the active learning object, in a sixth step of the example method, the experience execution module 32 issues a representation of the active learning object to the second computing entity associated with the learner 28-1. For example, when the active learning object is the first learning object, the instance experience module 290 outputs learner output information 172 that includes a representation of the first descriptive assets 756-1 to the second computing entity. As another example, when the active learning object is the second learning object, the instance experience module 290 outputs learner output information 172 that includes a representation of one or more of the second descriptive assets 756-2A and the second descriptive asset 756-2B to the second computing entity. As yet another example, when the active learning object is the third learning object, the instance experience module 290 outputs learner output information 172 that includes a representation of the third descriptive assets 756-3 to the second computing entity.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 15A, 15B, and 15C are schematic block diagrams of an embodiment of a computing system illustrating an example of creating learning output information. The computing system includes the experience execution module 32 of FIG. 1 and the learning assets database 34 of FIG. 1. The experience execution module 32 includes an environment generation module 240, an instance experience module 290, and a learning assessment module 330. The environment sensor module 14 includes the motion sensor 126 of FIG. 4 and the position sensor 120 of FIG. 4.

FIG. 15A illustrates an example of operation of a method to create the learning output information, where in a first step the experience execution module 32 generates a representation of a first portion of a lesson package that includes a learning path of a sequence of learning objects. For example, the environment generation module 240 generates assessment information 252, instruction information 204, baseline environment and object information 292 based on the lesson package 206 recovered from the learning assets database 34. The instance experience module 290 selects a learning object from the first portion of the lesson package and issues learner output 172 to the learner 28-1 as a representation of the first portion of the lesson package. The issuing of the learner output 172 includes rendering assets of the learning object in accordance with the instruction information 204 and the baseline environment and object information 292.

Having generated the representation of the first portion of the lesson package, in a second step the experience execution module 32 captures learner input to produce learner interaction information. For example, the instance experience module 290 generates learner interaction information 332 based on learner input information 174 received from the learner 28-1 and the instruction information 204.

Having produced the learner interaction information 332, in a third step the experience execution module 32 analyzes the learner interaction information to produce learning assessment results information. For example, the learning assessment module 330 issues learning assessment results information 334 based on the learner interaction information 332 and in accordance with the assessment information 252.

FIG. 15B further illustrates the example of operation of the method to create the learning output information, where having produced the learning assessment results information 334, in a fourth step the experience execution module 32 selects a diversion universal resource locator (URL) based on the learning assessment results information to update the learning path. The selecting is based on one or more of an instructor set pause and divert point in the learning path as forced more optional, and assessment determines supplemental information is required to enhance an experience and/or improve learning comprehension (e.g., the learner needs help), and the learner 28-1 and invokes a request to learn more than what the current learning path offers. For example, the instance experience module 290 selects a diversion URL from diversion URL information 846 recovered from the learning assets database 34 for the lesson package when the learning path includes an instructor set diversion point to pause playback of the lesson package along the learning path to allow the learner 28-1 to access supplemental information at the diversion URL.

Having selected the diversion URL, in a fifth step the experience execution module pauses the learning path and diverts the representation of the lesson package to the selected diversion URL. For example, the instance experience module 290 starts replicating rendering frames of a current learning object while adding a representation of content accessed via the diversion URL information 846 to the learner output information 172 to the learner 28-1.

FIG. 15C illustrates an instance of the example of operation of the method to create the learning output information, where the instance experience module 290 pauses the learning path and diverts to the selected diversion URL. In the instance, rendering frame 3 of the lesson package (e.g., rendered from the baseline environment and object information 292 and the instruction information 204) is paused starting with rendering frame 3 of the learner output information 172.

Having paused the rendering of the lesson package, the instance experience module 290 renders a representation of a portion of the diversion URL information 846 (e.g., www.intake valves1.com) and outputs the rendering(s) as further rendering frames 4-100 of the learner output information 172. The outputting further includes interactivity with the learner to access associated content options of the diversion URL information 846 (e.g., further webpages in response to clicks).

While diverting to the selected diversion URL, the instance experience module 290 determines to halt the pause and return to playing of further portions of the lesson package. The determining may be based on one or more of a detecting that a predetermined time frame has expired, detecting an input from the learner, and detecting that no further content is available at the diversion URL information 846. For example, the instance experience module 290 determines that the learner has activated a resume function.

Having determined to return to the plane of the further portions of the lesson package, the instance experience module 290 renders further frames of the learner output information 172 based on the lesson package. For example, the instance experience module 290 provides rendering frame 4 of the lesson package as a next rendering frame of the learner output information 172 (e.g., rendering frame 101). The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 16A, 16B, 16C, and 16D are schematic block diagrams of an embodiment of a computing system illustrating an example of selecting lesson asset information based on a physicality assessment. The computing system includes the experience execution module 32 of FIG. 1, the learning assets database 34 of FIG. 1, and the environment sensor module 14 of FIG. 1. The experience execution module 32 includes the environment generation module 240, the instance experience module 290, and the learning assessment module 330. The environment sensor module 14 includes the motion sensor 126 of FIG. 4 and the position sensor 120 of FIG. 4.

Figure 16A:
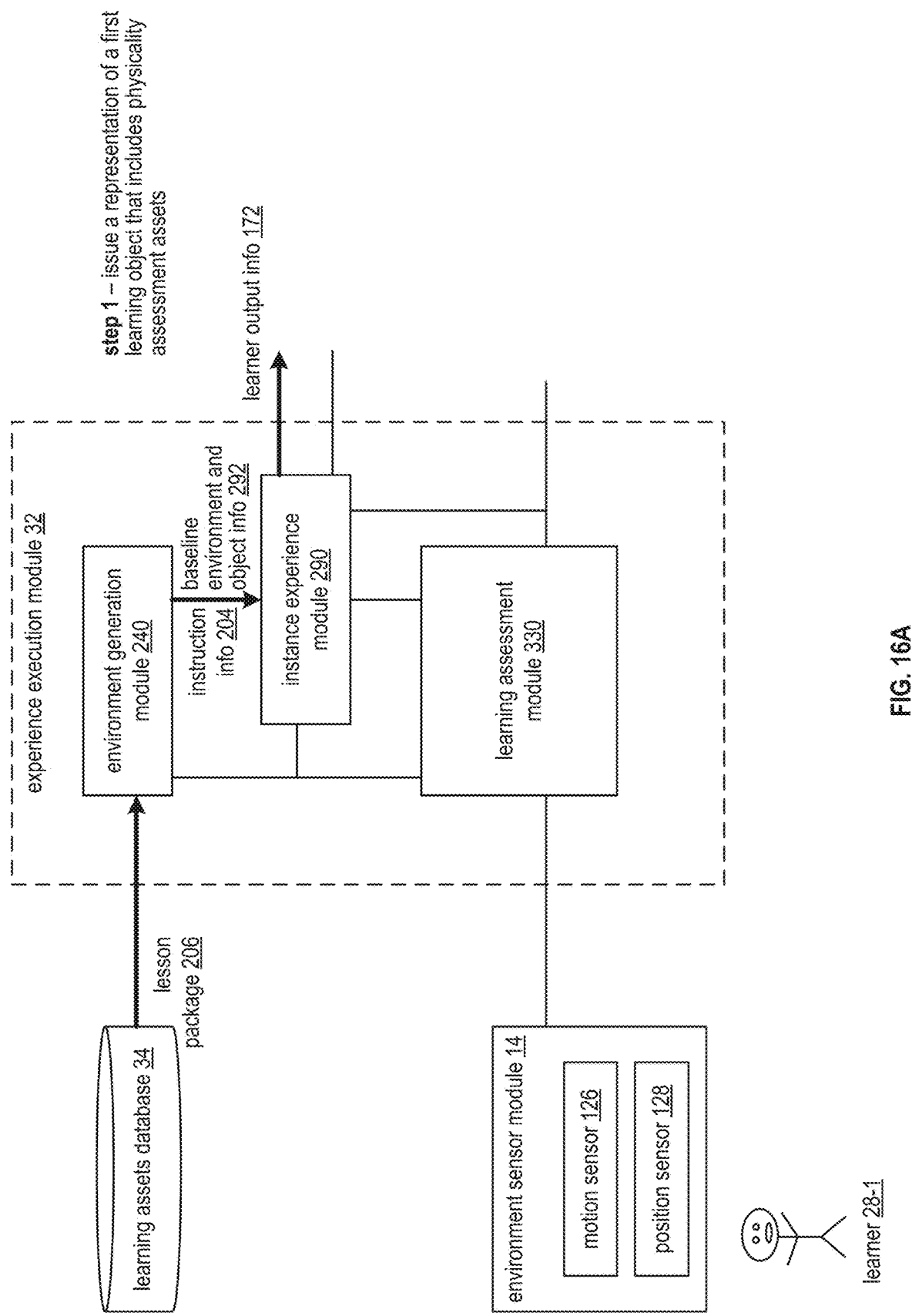

FIG. 16A illustrates an example of operation of a method of selecting the lesson asset information based on the physicality assessment, where in a first step the experience execution module 32 issues a representation of a first learning object that includes physicality assessment assets. For example, the environment generation module 240 generates instruction information 204 and baseline environment and object information 292 based on a lesson package 206 recovered from the learning assets database 34. The lesson package 206 includes a plurality of learning objects.

Figure 16B:
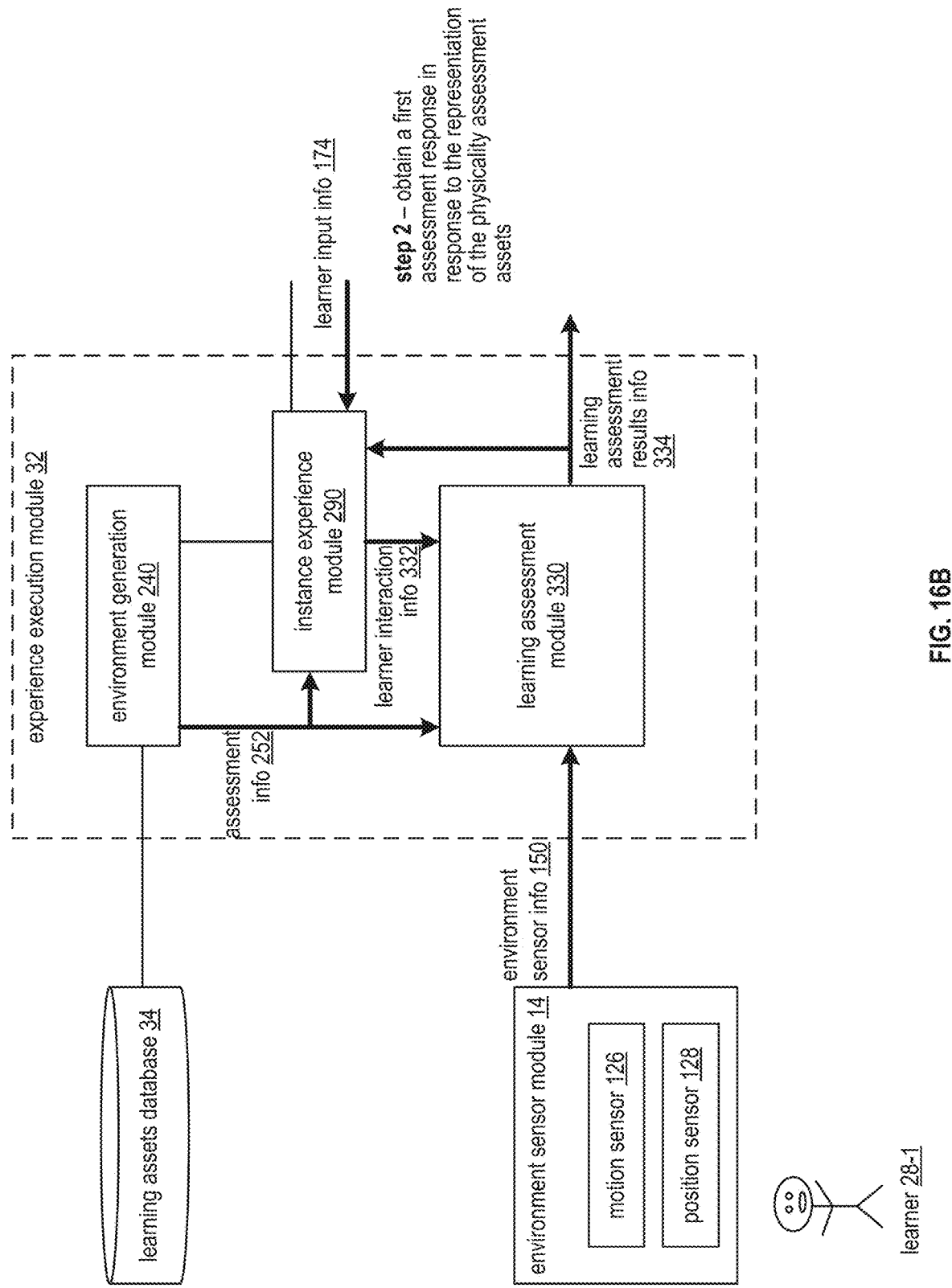
Figure 16C:
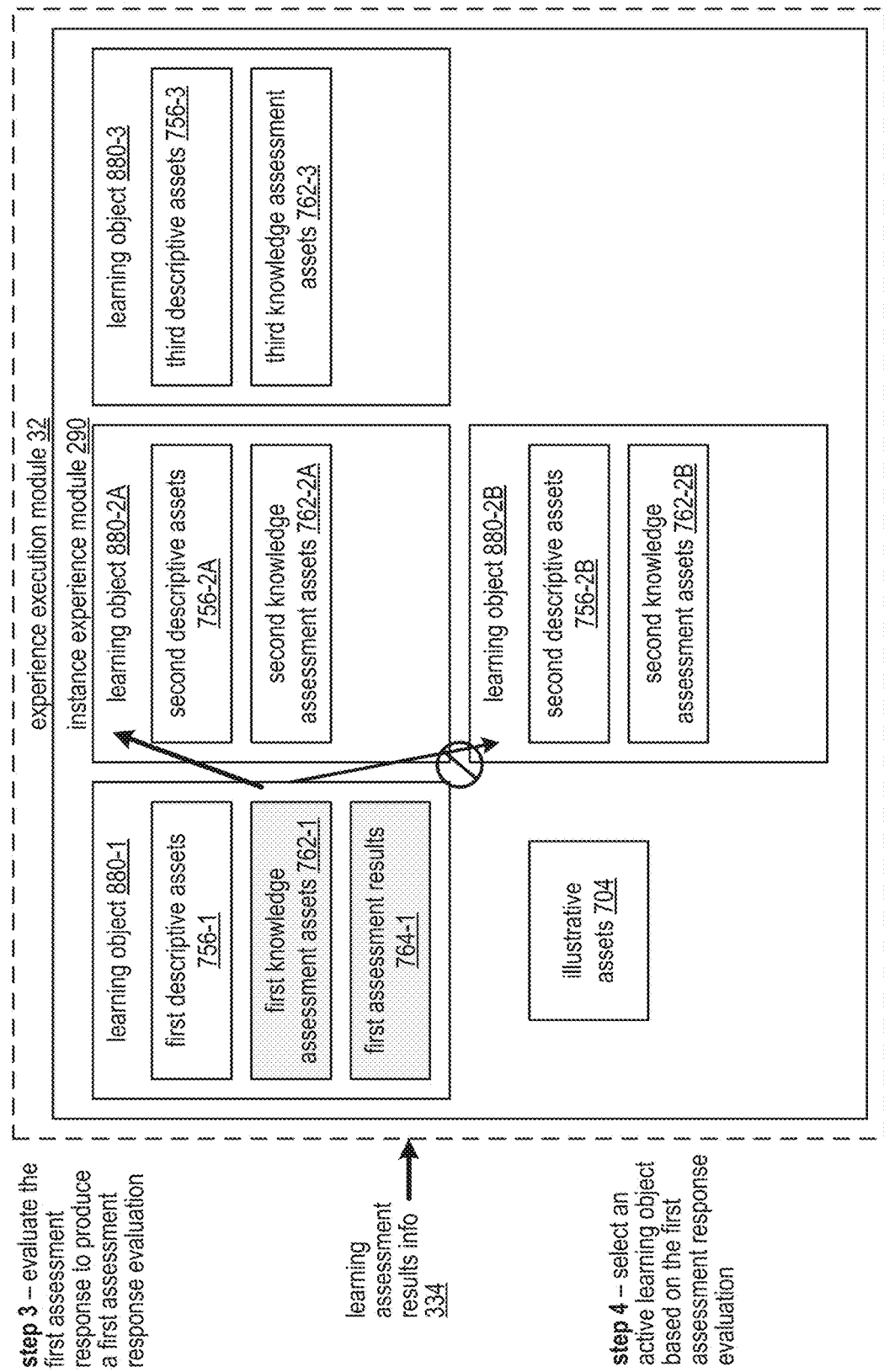

Turning to FIG. 16C, the plurality of learning objects includes a first learning object 880-1, a second learning object 880-2A and 880-2B, and a third learning object

880-3. The first learning object 880-1 includes a first set of knowledge bullet-points for a first piece of information regarding a topic. The second learning object 880-2A and 880-2B includes a second set of knowledge bullet-points for a second piece of information regarding the topic. The third learning object 880-3 includes a third set of knowledge bullet-points for a third piece of information regarding the topic.

The first learning object, the second learning object, and the third learning object further include an illustrative asset 704 that depicts an aspect regarding the topic pertaining to the first, the second, and the third pieces of information. The first learning object further includes at least one first descriptive asset of first descriptive asset 756-1 regarding the first piece of information based on the first set of knowledge bullet-points 756-1 and the illustrative asset 704. The second learning object further includes at least one second descriptive asset of second descriptive assets 756-2A and 756-2B regarding the second piece of information based on the second set of knowledge bullet-points and the illustrative asset 704. The third learning object further includes at least one third descriptive asset of third descriptive assets 756-3 regarding the third piece of information based on the third set of knowledge bullet-points and the illustrative asset 704.

Returning to FIG. 16A, the issuing of the representation of the first learning object further includes the instance experience module 290 generating the first descriptive asset for the first learning object utilizing the first set of knowledge bullet-points and the illustrative asset as previously discussed. The instance experience module 290 outputs a representation of the first descriptive asset to a computing entity associated with a learner 28-1. For example, the instance experience module 290 renders the first descriptive asset to produce a rendering and issues the rendering as learner output information 172 to a second computing entity (e.g., associated with the learner 28-1) as a representation of the first learning object.

The issuing of the representation of the first learning object further includes the instance experience module 290 issuing a representation of a first set of physicality assessment assets of the first learning object to the second computing entity (e.g., associated with the learner 28-1). The issuing of the representation of the first set of physicality assessment assets includes a series of sub-steps.

A first sub-step includes deriving a first set of knowledge test-points for the first learning object regarding the topic based on the first set of knowledge bullet-points, where a first knowledge test-point of the first set of knowledge test-points includes a physicality aspect. The physicality aspect includes at least one of performance of a physical activity to demonstrate command of a knowledge test-point and answering a question during physical activity to demonstrate cognitive function during physical activity. For instance, the instance experience module 290 generates the first knowledge test-point to include performing cardiopulmonary resuscitation (CPR) when the first set of knowledge bullet-points pertain to aspects of successful CPR.

A second sub-step includes generating the first set of physicality assessment assets utilizing the first set of knowledge test-points, the illustrative asset, and the first descriptive asset of the first learning object. For instance, the instance experience module 290 generates the first set of physicality assessment assets to include a CPR test device and an instruction to perform CPR.

A third sub-step of the issuing of the representation of the first set of physicality assessment assets includes rendering the first set of physicality assessment assets to produce the representation of the first set of physicality assessment assets. For instance, the instance experience module 290 renders the first set of physicality assessment assets to produce a rendering as the representation.

A fourth sub-step includes outputting the representation of the first set of physicality assessment assets to the second computing entity associated with the learner 28-1. For instance, the instance experience module 290 outputs learner output information 172 that includes the rendering of the first set of physicality assessment assets.

FIG. 16B further illustrates the example of operation of the method of selecting the lesson asset information based on the physicality assessment, where, having issued the representation of the first set of physicality assessment assets, in a second step of the method the experience execution module 32 obtains a first assessment response in response to the representation of the first set of physicality assessment assets. The obtaining of the first assessment response includes a variety of approaches.

A first approach includes receiving the first assessment response from the second computing entity in response to the representation of the first set of physicality assessment assets. For example, the instance experience module 290 receives learner input information 174 and extracts the first assessment response from the received learner input information 174.

A second approach includes receiving the first assessment response from a third computing entity. For example, the instance experience module receives the first assessment response from a computing entity associated with monitoring physicality aspects of the learner 28-1.

A third approach includes interpreting learner interaction information 332 to produce the first assessment response. For example, the instance experience module 290 interprets the learner input information 174 based on assessment information 252 to produce the learner interaction information 332. For instance, the assessment information 252 includes how to assess the learner input information 174 to produce the learner interaction information 332. The learning assessment module 330 interprets the learning interaction information 332 based on the assessment information 252 to produce learning assessment results information 334 as the first assessment response.

A fourth approach includes interpreting environment sensor information 150 to produce the first assessment response. For example, the learning assessment module 330 interprets the environment sensor information 150 from the environment sensor module 14 with regards to detecting physical manipulations of the CPR test device (e.g., as detected by the motion sensor 126 and/or the position sensor 128) to produce the learning assessment results information 334 as the first assessment response. For instance, the learning assessment module 330 generates the learning assessment results information 334 to indicate whether the learner 28-1 is applying an appropriate amount of pressure on the CPR test device and whether the learner 28-1 is producing a rhythm of compressions on the CPR test device within a desired range.

Alternatively, or in addition to, the learning assessment module 330 simultaneously analyzes the learner interaction information 332 (e.g., answers interpreted from learner input information 174) and the environment sensor information 150 to generate the learning assessment results information 334 indicating whether the learner 28-1 is answering questions correctly during a period of physical activity (e.g., applying CPR compressions and thinking about what medical options are available as time goes on).

FIG. 16C further illustrates the example of operation of the method of selecting the lesson asset information based on the physicality assessment, where, having obtained the first assessment response, in a third step of the method the instance experience module 290 evaluates the first assessment response to produce a first assessment response evaluation. For example, the instance experience module 290 extracts the first assessment response from the learning assessment results information 334 and compares a performance level (e.g., CPR test activity) of the first assessment response to an expected performance level (e.g., desired ranges) associated with the first knowledge assessment asset 762-1 to produce first assessment results 764-1 as the first assessment response evaluation.

Having produced the first assessment response evaluation, in a fourth step of the example method the instance experience module 290 selects one of the first learning object, the second learning object, and the third learning object as an active learning object based on the first assessment response evaluation. The selecting includes interpreting the first assessment response evaluation in accordance with a learning object selection approach to produce an active learning object requirement as previously discussed. The selecting further includes indicating which one of the first learning object, the second learning object, and the third learning object fulfills the active learning object requirement as previously discussed. For instance, the instance experience module 290 selects the learning object 880-2A as the active learning object when the first assessment response evaluation indicates that the learner 28-1 has performed the physical activities within desired ranges and the learning object 880-2A is a next module in accordance with a lesson plan when the learner 28-1 has successfully demonstrated such desired physical activities.

Figure 16D:
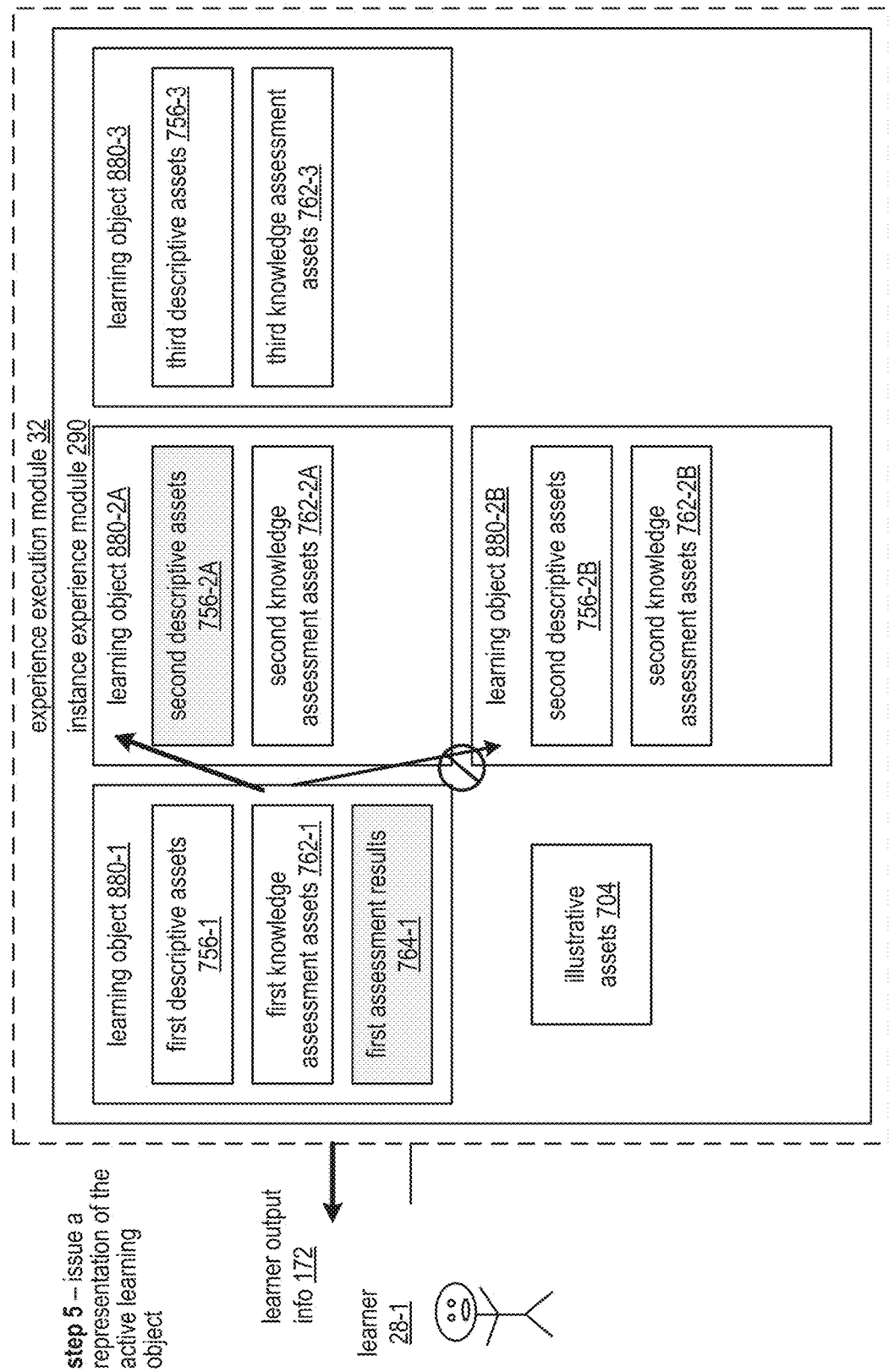

FIG. 16D further illustrates the example of operation of the method of selecting the lesson asset information based on the physicality assessment, where, having selected the active learning object, in a fifth step of the example method the instance experience module 290 issues a representation of the active learning object. For example, when the active learning object is the first learning object, the instance experience module 290 outputs learner output information 172 that includes a representation of the first descriptive assets 756-1 to the second computing entity associated with the learner 28-1. As another example, when the active learning object is the second learning object, the instance experience module 290 outputs learner output information 172 that includes a representation of one or more of the second descriptive assets 756-2A and the second descriptive asset 756-2B to the second computing entity. As yet another example, when the active learning object is the third learning object, the instance experience module 290 outputs learner output information 172 that includes a representation of the third descriptive assets 756-3 to the second computing entity.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 17A, 17B, 17C, and 17D are schematic block diagrams of an embodiment of a computing system illustrating an example of optimizing learning. The computing system includes the experience execution module 32 of FIG. 1, the learning assets database 34 of FIG. 1, and the environment sensor module 14. The experience execution module 32 includes the environment generation module 240, the instance experience module 290, and the learning assessment module 330. The environment sensor module 14 includes various sensors to detect physical activities and stress of the learner 28-1.

Figure 17A:
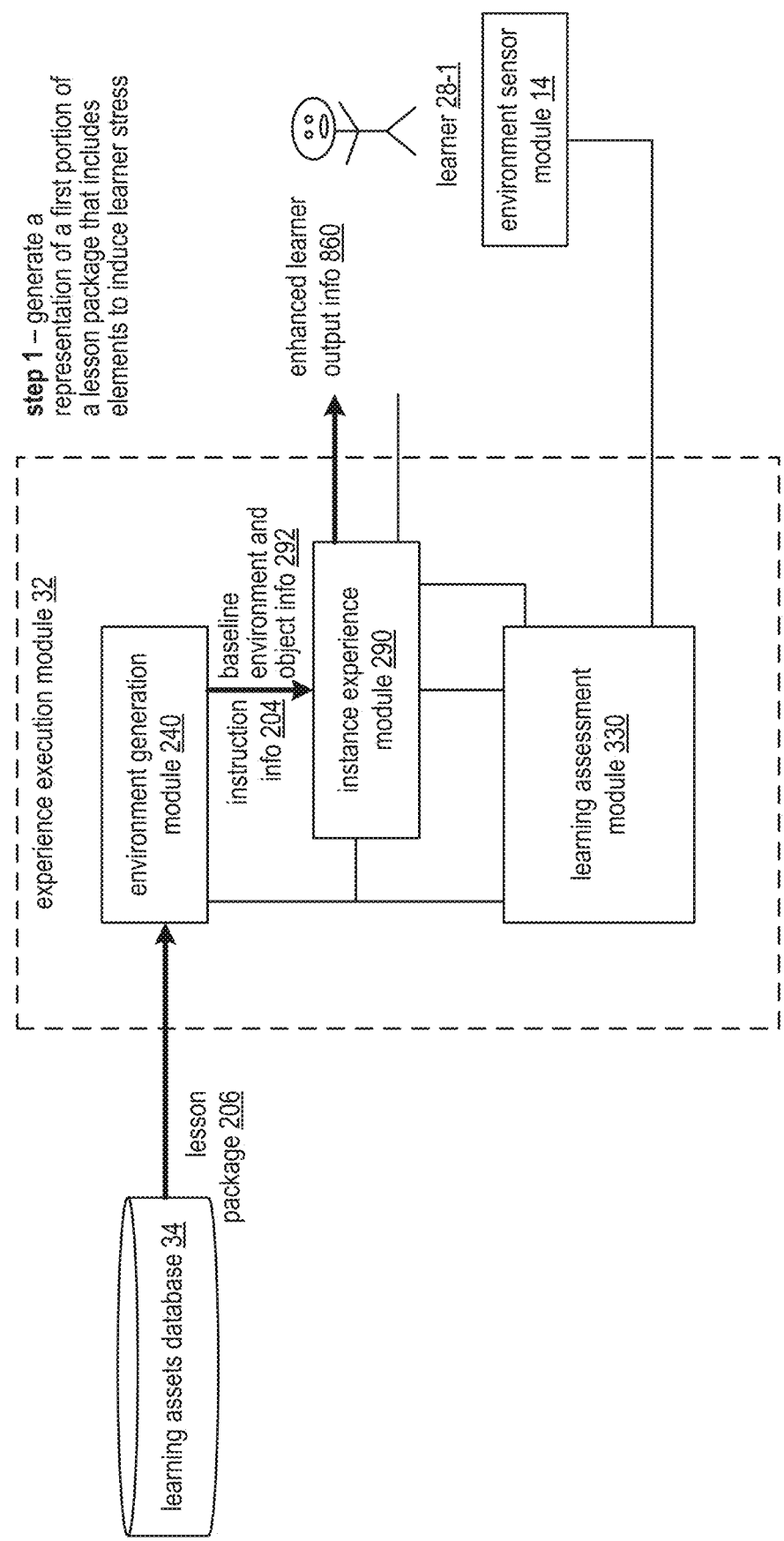

FIG. 17A illustrates an example of operation of a method to optimize learning, where in a first step the experience execution module 32 generates a representation of a first portion of a lesson package that includes elements to induce learner stress. The lesson package includes a default learning path of a sequence of execution of learning objects. For example, the environment generation module 240 generates instruction information 204 and baseline environment and object information 292 based on the lesson package 206 recovered from the learning assets database 34. The instance experience module 290 selects a learning object from the learning path of the first portion of the lesson package and issues enhanced learner output information 860 to the learner 28-1 as the representation of the first portion of the lesson package. The enhanced learner output information 860 includes a rendering of the learning object with modifications to induce the learner stress (e.g., modified visual rendering, modified background noises, modified volume levels, etc.). The issuing of the enhanced learner output information 860 further includes rendering assets of the learning object in accordance with the instruction information 204 and the baseline environment and object information 292.

Figure 17B:
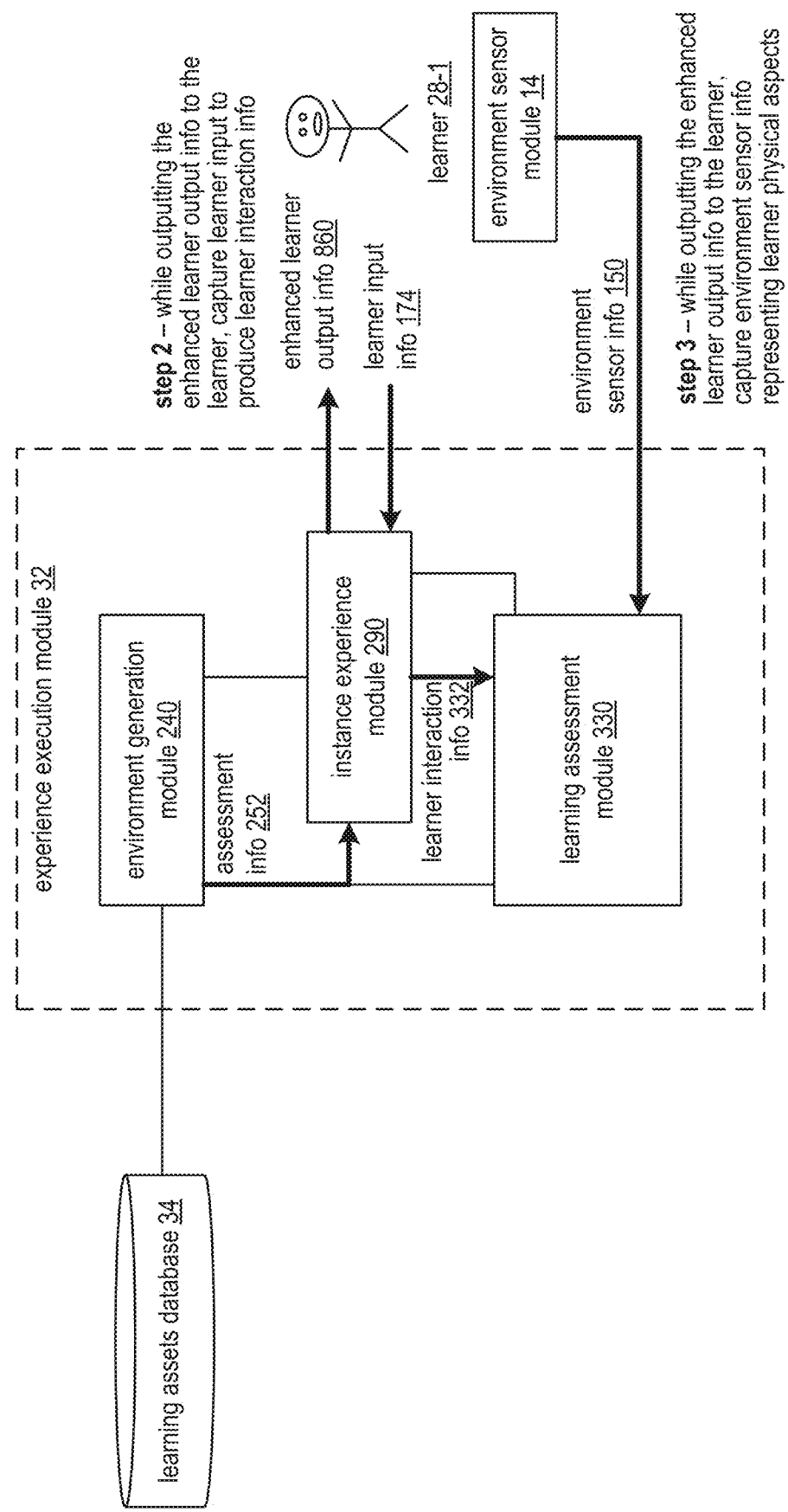

FIG. 17B further illustrates the example of operation of the method to optimize learning, where in a second step, while outputting the enhanced learner output information to the learner, experience execution module 32 captures learner input to produce learner interaction information. For example, the instance experience module 290 receives learner input information 174 from the learner 28-1 in response to the enhanced learner output information 860. The instance experience module 290 analyzes the learner input information 174 in accordance with assessment information 252 to create learner interaction information 332.

While outputting the enhanced learner output information to the learner, in a third step, the experience execution module 32 captures environment sensor information representing learner physical aspects. For example, the learning assessment module 330 receives environment sensor information 150 from the environment sensor module 14, where the environment sensor module 14 utilizes one or more sensors to detect the learner physical aspects of the learner 28-1. The physical aspects includes a physical condition of the learner and physical movements of the learner.

Figure 17C:
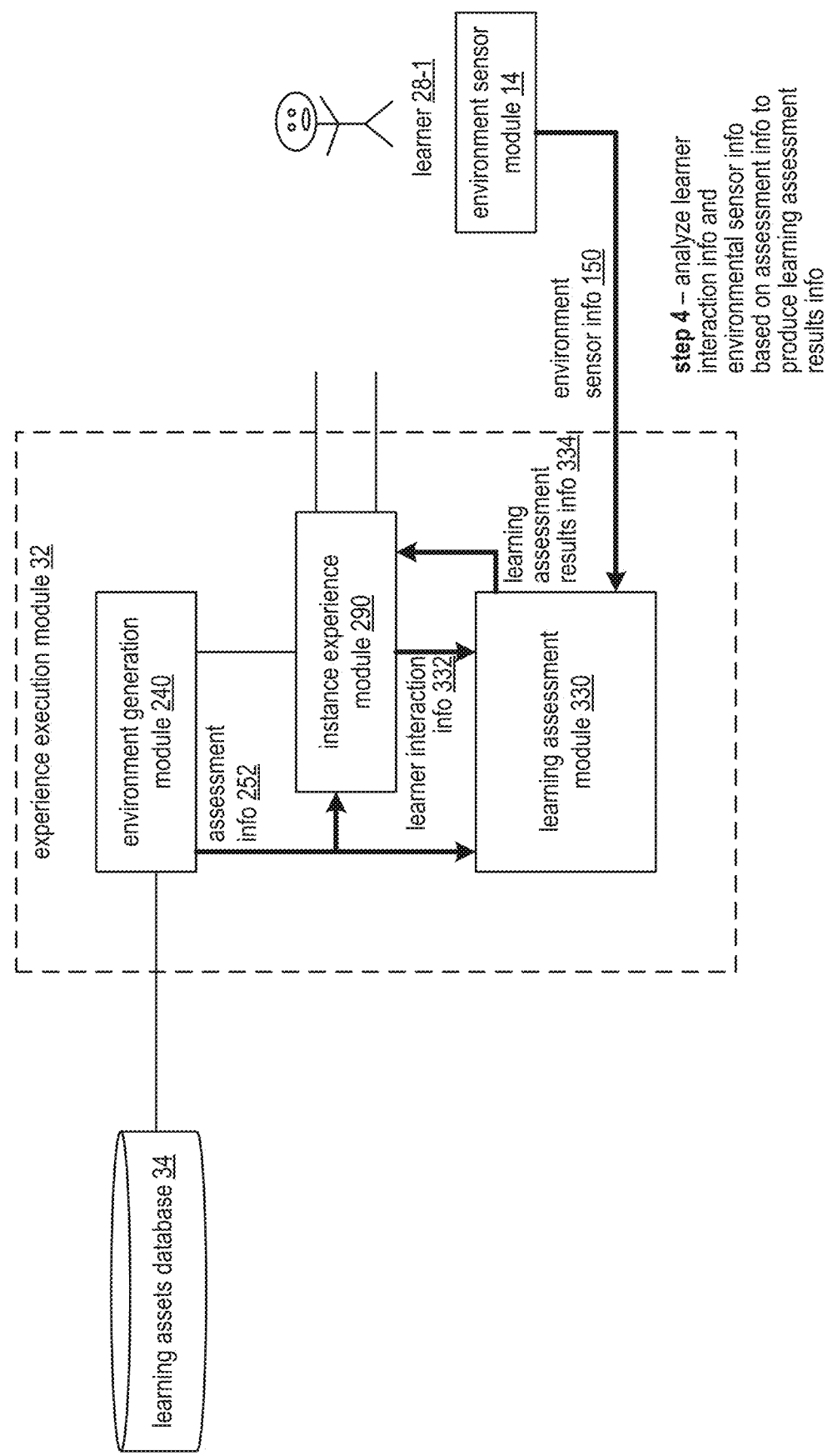

FIG. 17C further illustrates the example of operation of the method to optimize learning, where having received the environment sensor information and generated the learner interaction information, in a fourth step the experience execution module 32 analyzes the learner interaction information and the environmental sensor information based on the assessment information to produce learning asset results information. For example, the learning assessment module 330 analyzes the learner interaction information 332 and the environment sensor information 150 based on the assessment information 252 to produce learning assessment results information 334, where the learning assessment results information is correlated to the learner physical aspects. For instance, the learning assessment results information 334 indicates the effects of different levels of stress on answer correctness.

Figure 17D:
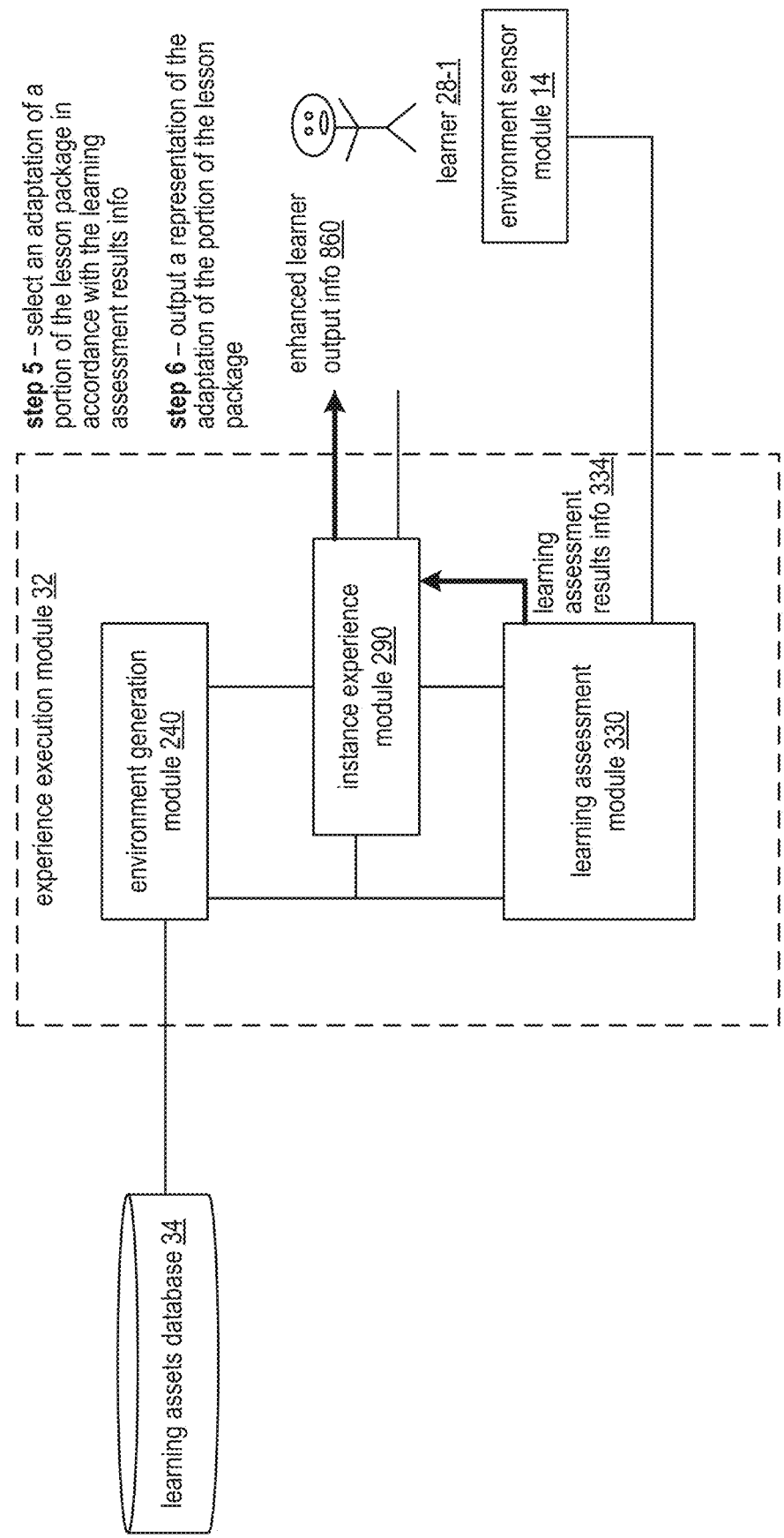

FIG. 17D further illustrates the example of operation of the method to optimize learning, where having produced the learning assessment results information, in a fifth step the experience execution module 32 selects an adaptation of a portion of the lesson package in accordance with the learning assessment results information. The adaptation includes re-selecting the first portion (e.g., a redo) with or without enhancement for a next learner, selecting a different portion (e.g., a next learning object along the sequence of the learning path) for the same learner, and selecting a different portion associated with another learning object along a different sequence of a variation to the learning path. The adaptation further includes providing an updated assessment question, changing the pace (e.g., slower when an assessment is unfavorable, faster when an assessment is favorable) of execution of the learning objects along the learning path.

Having selected the adaptation, in a sixth step the experience execution module 32 outputs a representation of the adaptation of the portion of the lesson package (e.g., to the same or a next learner). For example, the instance experience module 290 selects a different learning object from an alternative learning path, generates enhanced learner output information 860 based on assets of the different learning object, and outputs the enhanced learning output information 860 to the learner 28-1.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 18A, 18B, 18C, and 18D are schematic block diagrams of an embodiment of a computing system illustrating an example of optimizing learning. The computing system includes the experience execution module 32 of FIG. 1, the learning assets database 34 of FIG. 1, and the environment sensor module 14. The experience execution module 32 includes the environment generation module 240, the instance experience module 290, and the learning assessment module 330. The environment sensor module 14 includes various sensors to detect physical activities and stress of the learner 28-1.

Figure 18A:
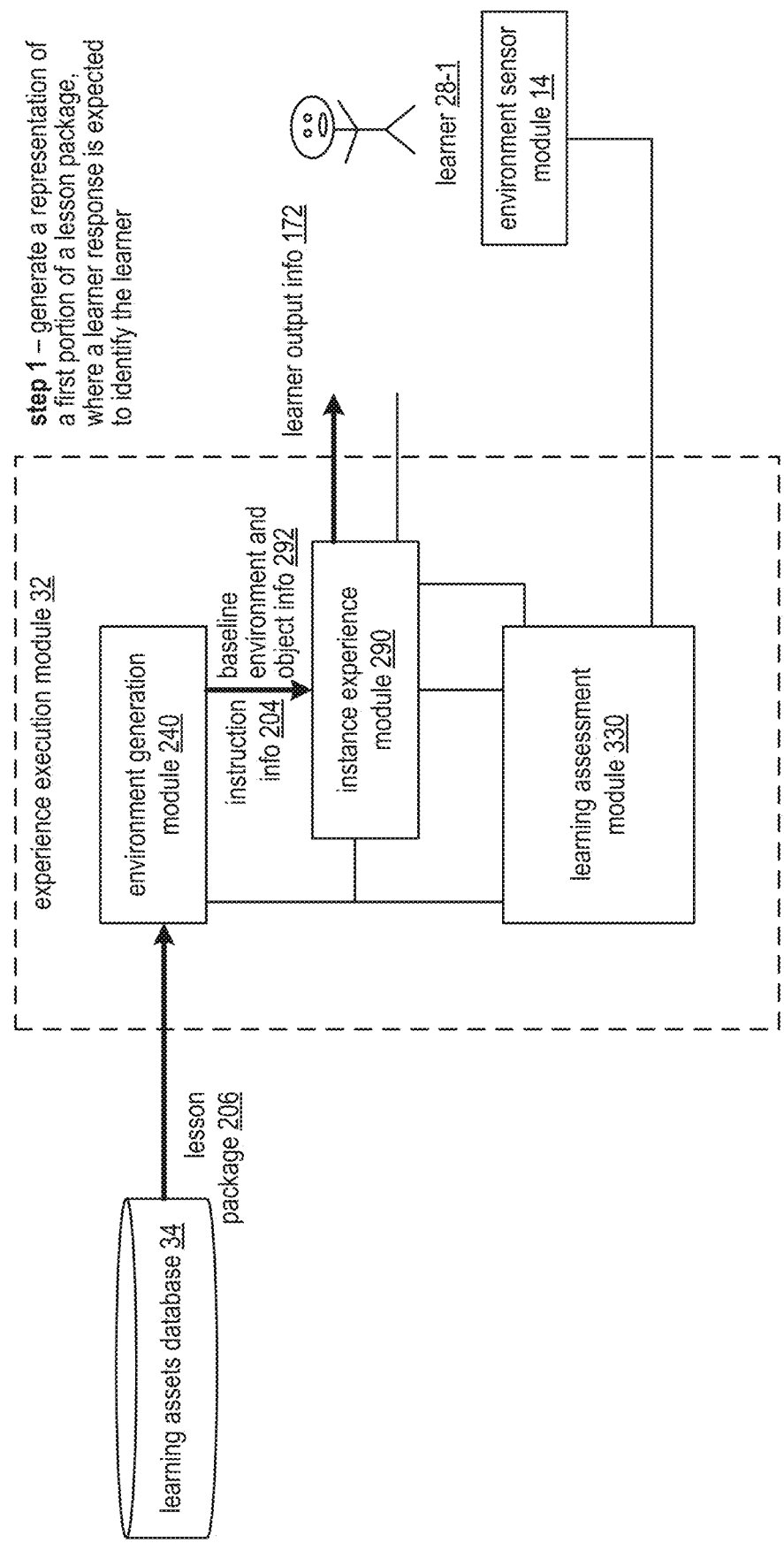

FIG. 18A illustrates an example of operation of a method to optimize learning, where in a first step the experience execution module 32 generates a representation of a first portion of a lesson package, where a subsequent learner response is expected to identify the learner. The lesson package includes a default learning path of a sequence of execution of learning objects. For example, the environment generation module 240 generates instruction information 204 and baseline environment and object information 292 based on the lesson package 206 recovered from the learning assets database 34. The instance experience module 290 selects a learning object from the learning path of the first portion of the lesson package and issues learner output information 172 to the learner 28-1 as the representation of the first portion of the lesson package. The issuing of the learner output information 172 includes rendering assets of the learning object in accordance with the instruction information 204 and the baseline environment and object information 292. In an embodiment, the instance experience module 290 generates the learner output information 172 to include elements to request the learner to perform physical activities that induce stress to help identify the learner.

Figure 18B:
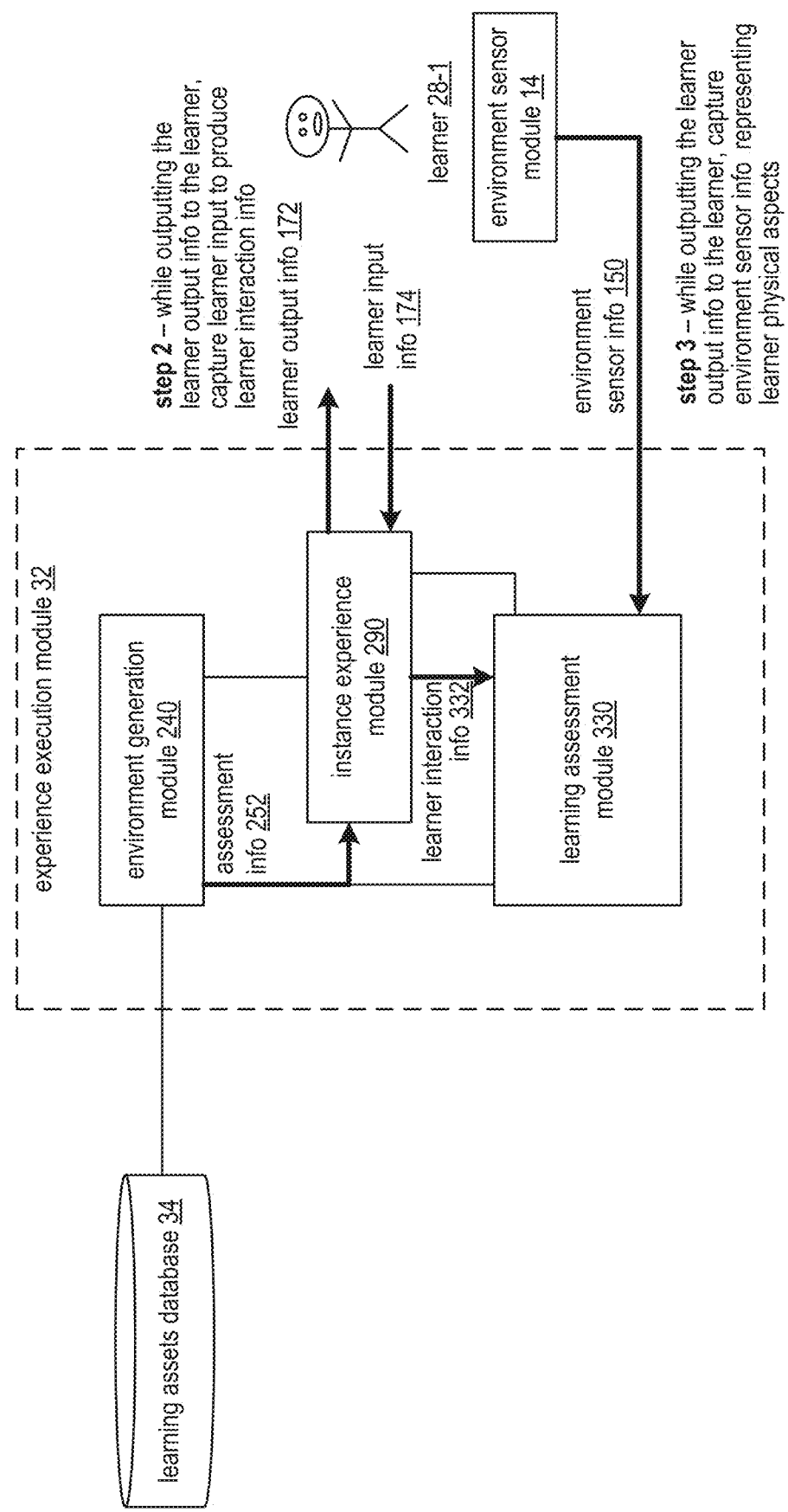

FIG. 18B further illustrates the example of operation of the method to optimize learning, where in a second step, while outputting the enhanced learner output information to the learner, experience execution module 32 captures learner input to produce learner interaction information. For example, the instance experience module 290 receives learner input information 174 from the learner 28-1 in response to the learner output information 172. The instance experience module 290 analyzes the learner input information 174 in accordance with assessment information 252 to create learner interaction information 332.

While outputting the enhanced learner output information to the learner, in a third step, the experience execution module 32 captures environment sensor information representing learner physical aspects. For example, the learning assessment module 330 receives environment sensor information 150 from the environment sensor module 14, where the environment sensor module 14 utilizes one or more sensors to detect the learner physical aspects of the learner 28-1. The physical aspects includes a physical condition of the learner and physical movements of the learner, including one or more of gait of walking information, pace of movement, range of movement, relative height, relative volume, any physical aspect, etc.

Figure 18C:
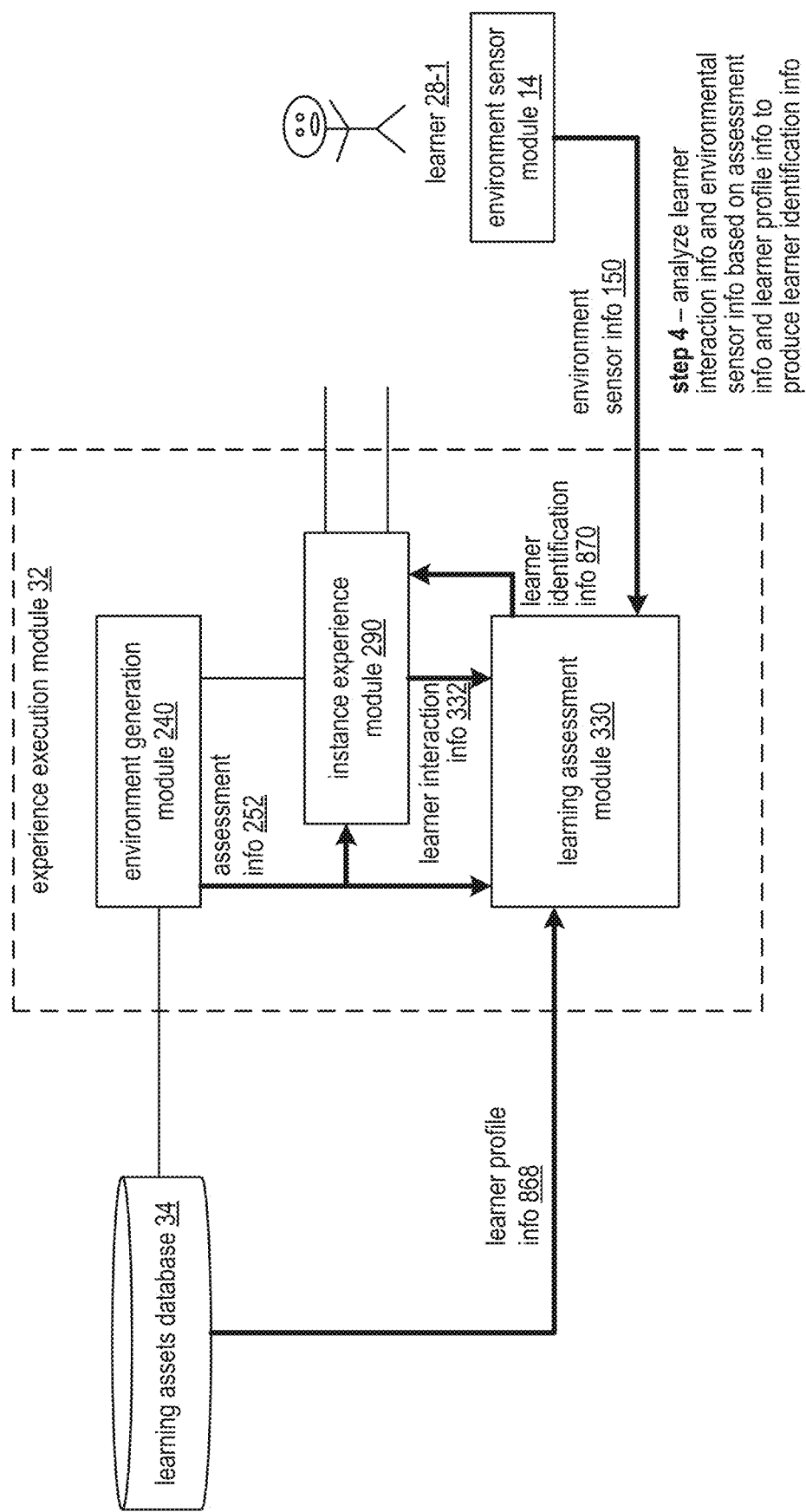

FIG. 18C further illustrates the example of operation of the method to optimize learning, where having received the environment sensor information and generated the learner interaction information, in a fourth step the experience execution module 32 analyzes the learner interaction information and the environmental sensor information based on the assessment information and learner profile information to produce learner identification information (e.g., who it really is). For example, the learning assessment module 330 analyzes the learner interaction information 332 and the environment sensor information 150 based on the assessment information 252 and the learner profile information 868 (e.g., guidance for movement patterns of various learners) to produce learner identification information 870. The learner identification information 870 is correlated to the learner physical aspects. For instance, the learner identification information 870 identifies the learner 28-1 versus a multitude of other potential learners based on the physical aspects of the learner 28-1 while reacting to the execution of the learning path.

Figure 18D:
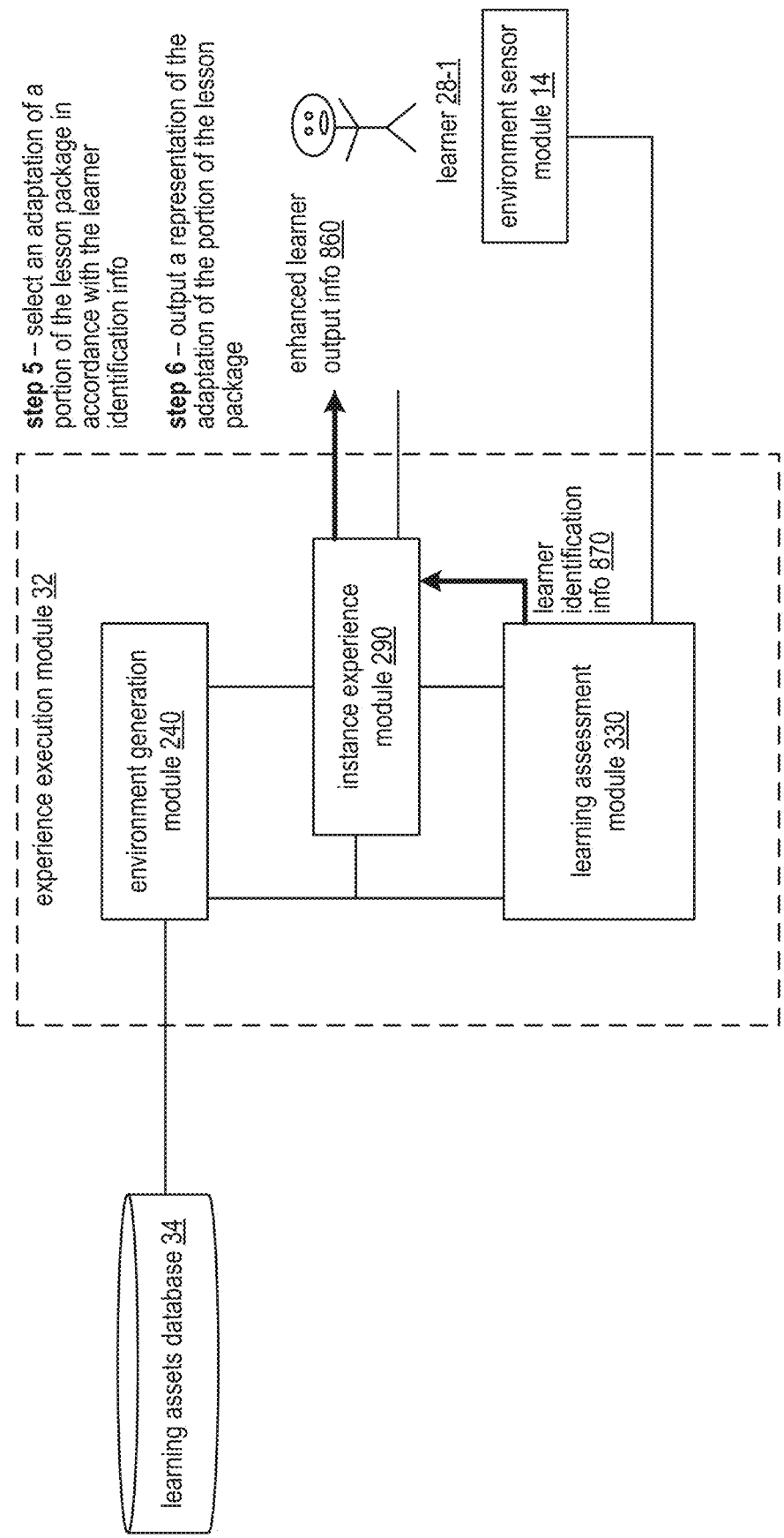

FIG. 18D further illustrates the example of operation of the method to optimize learning, where having produced the learner identification information, in a fifth step the experience execution module 32 selects an adaptation of a portion of the lesson package in accordance with the learner identification information. The adaptation includes re-selecting the first portion (e.g., a redo) with or without enhancement for the present learner, selecting a different portion (e.g., a next learning object along the sequence of the learning path) for the present learner, and selecting a different portion associated with another learning object along a different sequence of a variation to the learning path. The adaptation further includes providing an updated assessment question, changing the pace (e.g., slower when the present learner has a more effective learning experience at a slower pace, faster when the present learner has a more effective learning experience at a faster pace) of execution of the learning objects along the learning path.

Having selected the adaptation, in a sixth step the experience execution module 32 outputs a representation of the adaptation of the portion of the lesson package (e.g., to the same learner). For example, the instance experience module 290 selects a different learning object from an alternative learning path, generates enhanced learner output information 860 based on assets of the different learning object, and outputs the enhanced learning output information 860 to the learner 28-1.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computer-implemented method of using a computing system, the method comprises:

identifying, by a computing entity of the computing system, an illustrative asset that is common to a first set of assets, a second sets of assets, a third set of assets, and a first set of physicality assessment assets, wherein the first set of assets represents a first learning object that includes a first set of knowledge bullet-points for a first piece of information regarding a topic, wherein the second set of assets represents a second learning object that includes a second set of knowledge bullet-points for a second piece of information regarding the topic, wherein the third set of assets represents a third learning object that includes a third set of knowledge bullet-points for a third piece of information regarding the topic;

rendering, by the computing entity, a three-dimensional (3-D) model of the illustrative asset and a three-dimensional (3-D) model of the first set of physicality assessment assets with regards to a first set of knowledge test-points associated with the first set of physicality assessment assets to transform the first set of knowledge test-points into 3-D frames representing the physicality assessment assets;

issuing, by the computing entity, the 3-D frames representing the first set of physicality assessment assets to a second computing entity of the computing system;

obtaining, by the computing entity, a first assessment response in response to the 3-D frames representing the first set of physicality assessment assets; and selecting, by the computing entity, one of the first learning object, the second learning object, and the third learning object as an active learning object based on the first assessment response.

2. The method of claim 1 further comprises:

rendering, by the computing entity, the 3-D model of the illustrative asset and a three-3-D model of the first set of assets utilizing the first set of knowledge bullet-points to transform the first set of knowledge bullet-points into 3-D frames of a first descriptive asset, wherein the first descriptive asset represents the first learning object; and outputting, by the computing entity, the 3-D frames of the first descriptive asset to the second computing entity.

3. The method of claim 1 further comprises:

when the active learning object is the first learning object:
outputting, by the computing entity, 3-D frames representing the first learning object to the second computing entity;

when the active learning object is the second learning object:
outputting, by the computing entity, 3-D frames representing the second learning object to the second computing entity; and when the active learning object is the third learning object:
outputting, by the computing entity, 3-D frames representing the third learning object to the second computing entity.

4. The method of claim 1 further comprises:

deriving the first set of knowledge test-points associated with the first set of physicality assessment assets regarding the topic based on the first set of knowledge bullet-points for the first piece of information regarding the topic, wherein a first knowledge test-point of the first set of knowledge test-points includes a physicality aspect.

5. The method of claim 1, wherein the obtaining the first assessment response in response to the 3-D frames representing the first set of physicality assessment assets comprises at least one of:

receiving the first assessment response from the second computing entity in response to the 3-D frames representing the first set of physicality assessment assets;

receiving the first assessment response from a third computing entity;

interpreting learner interaction information to produce the first assessment response; and interpreting environment sensor information to produce the first assessment response.

6. The method of claim 1, wherein the selecting the one of the first learning object, the second learning object, and the third learning object as the active learning object based on the first assessment response comprises:

evaluating the first assessment response to produce a first assessment response evaluation;

interpreting the first assessment response evaluation in accordance with a learning object selection approach to produce an active learning object requirement; and indicating which one of the first learning object, the second learning object, and the third learning object fulfills the active learning object requirement.

7. A computing device comprises:

an interface;

a local memory; and a processing module operably coupled to the interface and the local memory, wherein the processing module functions to:

identify an illustrative asset that is common to a first set of assets, a second sets of assets, a third set of assets, and a first set of physicality assessment assets, wherein the first set of assets represents a first learning object that includes a first set of knowledge bullet-points for a first piece of information regarding a topic, wherein the second set of assets represents a second learning object that includes a second set of knowledge bullet-points for a second piece of information regarding the topic, wherein the third set of assets represents a third learning object that includes a third set of knowledge bullet-points for a third piece of information regarding the topic;

render a three-dimensional (3-D) model of the illustrative asset and a three-dimensional (3-D) model of the first set of physicality assessment assets with regards to a first set of knowledge test-points associated with the first set of physicality assessment assets to transform the first set of knowledge test-points into 3-D frames representing the physicality assessment assets;

issue the 3-D frames representing the first set of physicality assessment assets to a second computing entity;

obtain a first assessment response in response to the 3-D frames representing the first set of physicality assessment assets; and select one of the first learning object, the second learning object, and the third learning object as an active learning object based on the first assessment response.

8. The computing device of claim 7, wherein the processing module further functions to:

render the 3-D model of the illustrative asset and a three-3-D model of the first set of assets utilizing the first set of knowledge bullet-points to transform the first set of knowledge bullet-points into 3-D frames of a first descriptive asset, wherein the first descriptive asset represents the first learning object; and output, via the interface, the 3-D frames of the first descriptive asset to the second computing entity.

9. The computing device of claim 7, wherein the processing module further functions to:

when the active learning object is the first learning object:
output, via the interface, 3-D frames representing the first learning object to the second computing entity;

when the active learning object is the second learning object:
output, via the interface, 3-D frames representing the second learning object to the second computing entity; and when the active learning object is the third learning object:
output, via the interface, 3-D frames representing the third learning object to the second computing entity.

10. The computing device of claim 7, wherein the processing module further functions to:

derive the first set of knowledge test-points associated with the first set of physicality assessment assets regarding the topic based on the first set of knowledge bullet-points for the first piece of information regarding the topic, wherein a first knowledge test-point of the first set of knowledge test-points includes a physicality aspect.

11. The computing device of claim 7, wherein the processing module functions to obtain the first assessment response in response to the 3-D frames representing the first set of physicality assessment assets by at least one of:

receiving, via the interface, the first assessment response from the second computing entity in response to the 3-D frames representing the first set of physicality assessment assets;

receiving, via the interface, the first assessment response from a third computing device;

interpreting learner interaction information to produce the first assessment response; and interpreting environment sensor information to produce the first assessment response.

12. The computing device of claim 7, wherein the processing module functions to select the one of the first learning object, the second learning object, and the third learning object as the active learning object based on the first assessment response by:

evaluating the first assessment response to produce a first assessment response evaluation;

interpreting the first assessment response evaluation in accordance with a learning object selection approach to produce an active learning object requirement; and indicating which one of the first learning object, the second learning object, and the third learning object fulfills the active learning object requirement.

13. A non-transitory computer readable memory comprises:

a first memory element that stores operational instructions that, when executed by a processing module of a first computing device, causes the processing module to:

identify an illustrative asset that is common to a first set of assets, a second sets of assets, a third set of assets, and a first set of physicality assessment assets, wherein the first set of assets represents a first learning object that includes a first set of knowledge bullet-points for a first piece of information regarding a topic, wherein the second set of assets represents a second learning object that includes a second set of knowledge bullet-points for a second piece of information regarding the topic, wherein the third set of assets represents a third learning object that includes a third set of knowledge bullet-points for a third piece of information regarding the topic;

render a three-dimensional (3-D) model of the illustrative asset and a three-dimensional (3-D) model of the first set of physicality assessment assets with regards to a first set of knowledge test-points associated with the first set of physicality assessment assets to transform the first set of knowledge test-points into 3-D frames representing the physicality assessment assets; and issue the 3-D frames representing the first set of physicality assessment assets to a second computing device;

a second memory element that stores operational instructions that, when executed by the processing module, causes the processing module to:

obtain a first assessment response in response to the 3-D frames representing the first set of physicality assessment assets; and a third memory element that stores operational instructions that, when executed by the processing module, causes the processing module to:

select one of the first learning object, the second learning object, and the third learning object as an active learning object based on the first assessment response.

14. The non-transitory computer readable memory of claim 13 further comprises:

a fourth memory element stores operational instructions that, when executed by the processing module, causes the processing module to:

render the 3-D model of the illustrative asset and a three-3-D model of the first set of assets utilizing the first set of knowledge bullet-points to transform the first set of knowledge bullet-points into 3-D frames of a first descriptive asset, wherein the first descriptive asset represents the first learning object; and output the 3-D frames of the first descriptive asset to the second computing device.

15. The non-transitory computer readable memory of claim 13 further comprises:

a fifth memory element stores operational instructions that, when executed by the processing module, causes the processing module to:

when the active learning object is the first learning object:
output 3-D frames representing the first learning object to the second computing device;

when the active learning object is the second learning object:
output 3-D frames representing the second learning object to the second computing device; and when the active learning object is the third learning object:
output 3-D frames representing the third learning object to the second computing device.

16. The non-transitory computer readable memory of claim 13 further comprises:

a sixth memory element stores operational instructions that, when executed by the processing module, causes the processing module to:
derive first set of knowledge test-points associated with the first set of physicality assessment assets regarding the topic based on the first set of knowledge bullet-points for the first piece of information regarding the topic, wherein a first knowledge test-point of the first set of knowledge test-points includes a physicality aspect.

17. The non-transitory computer readable memory of claim 13, wherein the processing module functions to execute the operational instructions stored by the second memory element to cause the processing module to obtain the first assessment response in response to the 3-D frames representing the first set of physicality assessment assets by at least one of:
receiving the first assessment response from the second computing entity in response to the 3-D frames representing the first set of physicality assessment assets;
receiving the first assessment response from a third computing device;
interpreting learner interaction information to produce the first assessment response; and
interpreting environment sensor information to produce the first assessment response.

18. The non-transitory computer readable memory of claim 13, wherein the processing module functions to execute the operational instructions stored by the third memory element to cause the processing module to select the one of the first learning object, the second learning object, and the third learning object as the active learning object based on the first assessment response by:
evaluating the first assessment response to produce a first assessment response evaluation;
interpreting the first assessment response evaluation in accordance with a learning object selection approach to produce an active learning object requirement; and
indicating which one of the first learning object, the second learning object, and the third learning object fulfills the active learning object requirement.

\* \* \* \* \*